(12) United States Patent
Mun

(10) Patent No.: US 9,881,339 B2
(45) Date of Patent: Jan. 30, 2018

(54) PROJECT ECONOMICS ANALYSIS TOOL

(71) Applicant: Johnathan Mun, Dublin, CA (US)

(72) Inventor: Johnathan Mun, Dublin, CA (US)

( * ) Notice: Subject to any disclaimer, the term of this patent is extended or adjusted under 35 U.S.C. 154(b) by 366 days.

(21) Appl. No.: 14/520,042

(22) Filed: Oct. 21, 2014

(65) Prior Publication Data

US 2016/0110812 A1 Apr. 21, 2016

Related U.S. Application Data

(63) Continuation of application No. 13/719,203, filed on Dec. 18, 2012, now Pat. No. 8,892,409.

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
CPC ..................................................... G06Q 40/00
USPC ....................................................... 705/36 R
See application file for complete search history.

(56) References Cited

U.S. PATENT DOCUMENTS

| | | | | |
|---|---|---|---|---|
| 5,687,968 A * | 11/1997 | Tarantino | ................. | A63F 3/081 273/139 |
| 5,692,233 A * | 11/1997 | Garman | ................. | G06Q 40/00 705/35 |
| 6,098,051 A * | 8/2000 | Lupien | ................... | G06Q 40/00 705/30 |
| 6,278,982 B1 * | 8/2001 | Korhammer | ........... | G06Q 40/06 705/36 R |
| 6,965,867 B1 * | 11/2005 | Jameson | ................ | G06Q 10/06 700/100 |
| 7,010,510 B1 * | 3/2006 | Schellhorn | ......... | G06Q 10/0635 705/35 |
| 7,315,840 B1 * | 1/2008 | Keith | ..................... | G06Q 40/00 705/35 |
| 7,392,213 B2 * | 6/2008 | Merkoulovitch | ...... | G06Q 40/06 705/36 R |
| 7,831,494 B2 * | 11/2010 | Sloan | ..................... | G06Q 40/00 705/35 |
| 7,877,308 B1 * | 1/2011 | Padgette | ................ | G06Q 10/04 705/35 |
| 8,073,763 B1 * | 12/2011 | Merrin | .................... | G06Q 40/00 705/35 |
| 8,359,260 B2 * | 1/2013 | Merrin | .................... | G06Q 40/04 705/35 |
| 8,392,313 B2 * | 3/2013 | Mun | ....................... | G06Q 40/04 705/26.1 |
| 8,606,550 B2 * | 12/2013 | Mun | ....................... | G06Q 10/04 703/2 |
| 8,713,543 B2 * | 4/2014 | Mun | ........................ | G06F 8/44 717/120 |

(Continued)

*Primary Examiner* — Kirsten Apple
(74) *Attorney, Agent, or Firm* — James M. Smedley LLC; James Michael Smedley, Esq.

(57) ABSTRACT

The present invention is applicable in the field of corporate finance, corporate capital investments, economics, math, risk analysis, simulation, decision analysis, and business statistics, and relates to the modeling and valuation of investment decisions under uncertainty and risk within all companies, allowing these firms to properly identify, assess, quantify, value, diversify, and hedge their corporate capital investment decisions and their associated risks.

3 Claims, 43 Drawing Sheets

(56) References Cited

U.S. PATENT DOCUMENTS

| | | | | |
|---|---|---|---|---|
| 8,892,409 B2* | 11/2014 | Mun | G06Q 40/06 | 703/2 |
| 9,020,857 B2* | 4/2015 | Mun | G06Q 10/06 | 705/348 |
| 9,118,429 B2* | 8/2015 | Bourakov | H04H 20/61 | |
| 9,389,840 B2* | 7/2016 | Mun | G06F 8/70 | |
| 2002/0147671 A1* | 10/2002 | Sloan | G06Q 40/00 | 705/36 R |
| 2002/0194099 A1* | 12/2002 | Weiss | G06Q 40/08 | 705/36 R |
| 2003/0078878 A1* | 4/2003 | Opsahl-Ong | G06Q 40/02 | 705/38 |
| 2004/0015376 A1* | 1/2004 | Zhu | G06Q 40/08 | 705/7.28 |
| 2004/0024692 A1* | 2/2004 | Turbeville | G06Q 40/08 | 705/38 |
| 2004/0044613 A1* | 3/2004 | Murakami | G06Q 40/04 | 705/37 |
| 2004/0073466 A1* | 4/2004 | Norquist | G06Q 20/108 | 705/70 |
| 2004/0073505 A1* | 4/2004 | Wright | G06Q 40/08 | 705/36 R |
| 2004/0078309 A1* | 4/2004 | Norquist | G06Q 40/00 | 705/35 |
| 2005/0027645 A1* | 2/2005 | Lui | G06Q 40/08 | 705/38 |
| 2005/0080703 A1* | 4/2005 | Chiesa | G06Q 40/00 | 705/36 R |
| 2005/0124408 A1* | 6/2005 | Vlazny | G06Q 20/363 | 463/28 |
| 2005/0197936 A1* | 9/2005 | Berstis | G06Q 10/0631 | 705/35 |
| 2007/0033120 A1* | 2/2007 | Sparaggis | G06Q 40/04 | 705/35 |
| 2008/0015871 A1* | 1/2008 | Eder | G06Q 10/067 | 706/21 |
| 2008/0154679 A1* | 6/2008 | Wade | G06Q 10/0635 | 705/7.28 |
| 2009/0006270 A1* | 1/2009 | Penello | G06Q 40/00 | 705/36 R |
| 2009/0106140 A1* | 4/2009 | De La Motte | G06Q 20/10 | 705/37 |
| 2009/0307149 A1* | 12/2009 | Markov | G06Q 40/06 | 705/36 R |
| 2010/0010847 A1* | 1/2010 | Cantor | G06Q 10/06313 | 705/7.23 |
| 2010/0088210 A1* | 4/2010 | Gardner | G06Q 40/00 | 705/35 |
| 2010/0205042 A1* | 8/2010 | Mun | G06Q 10/06 | 705/59 |
| 2012/0323753 A1* | 12/2012 | Norman | G06Q 40/00 | 705/37 |
| 2013/0103615 A1* | 4/2013 | Mun | G06Q 40/06 | 705/36 R |
| 2013/0275334 A1* | 10/2013 | Andersen | G06Q 40/06 | 705/36 R |
| 2014/0200953 A1* | 7/2014 | Mun | G06Q 10/04 | 705/7.28 |
| 2014/0324521 A1* | 10/2014 | Mun | G06Q 10/06393 | 705/7.28 |
| 2015/0088783 A1* | 3/2015 | Mun | G06Q 10/04 | 705/36 R |
| 2015/0187002 A1* | 7/2015 | Guccione | G06Q 40/04 | 705/37 |
| 2016/0027027 A1* | 1/2016 | Anderson | G06Q 10/04 | 705/7.31 |
| 2016/0110812 A1* | 4/2016 | Mun | G06Q 40/06 | 705/36 R |

* cited by examiner

FIGURE 5

| Year | 2013 | 2014 | 2015 | 2016 | 2017 | 2018 | 2019 | 2020 | 2021 |
|---|---|---|---|---|---|---|---|---|---|
| Revenues | | | | | | | | | |
| Revenue Line Item 1 | | | | | | | | | |
| Revenue Line Item 2 | | | | | | | | | |
| Revenue Line Item 3 | | | | | | | | | |
| Direct Costs | | | | | | | | | |
| Direct Cost 1 | | | | | | | | | |
| Direct Cost 2 | | | | | | | | | |
| Gross Profit | | | | | | | | | |
| Indirect Costs | | | | | | | | | |
| Indirect Cost 1 | | | | | | | | | |
| Indirect Cost 2 | | | | | | | | | |
| EBITDA | | | | | | | | | |
| Depreciation & Amortization | | | | | | | | | |
| EBIT | | | | | | | | | |
| Interest | | | | | | | | | |
| Earnings Before Taxes | | | | | | | | | |
| Taxes | | | | | | | | | |
| NET INCOME | | | | | | | | | |
| Total Noncash Expenses | | | | | | | | | |
| Change in NWC | | | | | | | | | |
| Capital Expenditures | | | | | | | | | |
| CAPITAL INVESTMENTS | | | | | | | | | |
| NOPAT | | | | | | | | | |
| Net Cash Flow (NCF) | | | | | | | | | |
| Operating Cash Flow (OCF) | | | | | | | | | |
| Free Cash Flow (FCF) | | | | | | | | | |

029 — Indirect Cost 2

FIGURE 14

ROV PROJECT ECONOMICS ANALYSIS TOOL (PEAT)

File  Edit  Options  Settings  Report  Help

| Project Economics | Applied Analytics | Risk Simulation | Options Strategies | Options Valuation | Forecast Prediction | Portfolio Optimization | Knowledge Center |

Global Settings | Custom Calculations
1. Input Assumptions | 2. Escalation & Depreciation | 3. Cash Flow Model | 4. Economic Results | 5. Information & Details Project or Option Name: [_____]

Enter the required inputs for this current Option. You can enter additional Option as required to provide an analysis of alternatives and to generate an investment portfolio. When done, proceed to the next step to view the escalation/depreciation results, cash flow model, and economic results.

Description and Notes: [_____]

Option ERA:
Option ERC:
Option Economic Lifespan (Years): [___]  Option's Final Year or Cash Flow Model:  2032

Investments: [3 ▲▼] Rows  Revenues: [3 ▲▼] Rows  Corporate Discount Rate [▼]

☐ Revenues: Auto-Fill the Same Values   Escalation %   Corporate Tax Rate Used in the Model:  25.00%

☐ Expenses: Auto-Fill the Same Values   [Copy Grid]  [View Full Grid]

| CAPITAL INVESTMENTS ($M): | Depreciation % | Escalation % | 2012 | 2013 | 1 2014 | 2 2015 | 3 2016 | 4 2017 | 5 2018 | 6 2019 | 7 2020 | 8 |
|---|---|---|---|---|---|---|---|---|---|---|---|---|

TOTAL

REVENUES ($M)

TOTAL

EXPENSES ($M)

TOTAL

REPORT SETTINGS

1. Project Economics

■ All Options — 267
☐ Portfolio Analysis

2. Applied Analytics

☐ Static Tornado
☐ Scenario Output Table

3. Risk Simulation

☐ Simulation Results
☐ Overlay Results
☐ Analysis of Alternatives
☐ Dynamic Sensitivity ☐ Select All — 268

Run Report — 269       Cancel

PROJECT ECONOMICS ANALYSIS TOOL

FIELD OF THE INVENTION

The present invention is in the field of corporate finance, corporate capital investments, economics, math, risk analysis, simulation, decision analysis, and business statistics, and relates to the modeling and valuation of investment decisions under uncertainty and risk within all companies, allowing these firms to properly identify, assess, quantify, value, diversify, and hedge their corporate capital investment decisions and their associated risks.

CROSS REFERENCE TO RELATED APPLICATION

This present application claims the benefit of U.S. patent application Ser. No. 13/719,203 entitled Project Economics Analysis Tool, filed on Dec. 18, 2012, which is hereby incorporated by reference herein in its entirety.

COPYRIGHT AND TRADEMARK NOTICE

A portion of the disclosure of this patent document contains materials subject to copyright and trademark protection. The copyright and trademark owner has no objection to the facsimile reproduction by anyone of the patent document or the patent disclosure as it appears in the U.S. Patent and Trademark Office patent files or records, but otherwise reserves all copyrights whatsoever.

BACKGROUND OF INVENTION

In today's competitive global economy, companies are faced with many difficult decisions. These decisions include allocating financial resources, building or expanding facilities, managing inventories, and determining product-mix strategies. Such decisions might involve thousands or millions of potential alternatives. Considering and evaluating each of them would be impractical or even impossible. A model can provide valuable assistance in incorporating relevant variables when analyzing decisions and in finding the best solutions for making decisions. Models capture the most important features of a problem and present them in a form that is easy to interpret. Additionally, models can often provide insights that intuition alone cannot.

Currently available methods require the user to understand advanced statistics, financial modeling, and mathematics in order to know what analysis to run on some existing data or to have the ability to interpret the raw numerical results. Furthermore, currently available methods do not automatically run the relevant analyses in an integrated fashion nor do they provide detailed descriptions in its reports coupled with the numerical results and charts for easy interpretation.

Therefore, there is need in the art for a system and method that can automatically run an intelligent set of statistical and analytical tests and compile those tests into an easily interpreted set of reports and charts. These and other features and advantages of the present invention will be explained and will become obvious to one skilled in the art through the summary of the invention that follows.

SUMMARY OF THE INVENTION

Accordingly, it is an aspect of the present invention to provide a system and method encapsulated within Project Economics Analysis Tool (PEAT) software, incorporates advanced analytical techniques and algorithms (Monte Carlo risk simulation, stochastic forecasting, business statistics, optimization, flexibility analysis, and strategic real options techniques, providing a novel way to analyze a user's existing set of input assumptions to extract valuable and important information) and compiles them in a unique and novel way to facilitate business risk analysis through an intelligent set of statistical and analytical tests of a user's existing set of input assumptions to analyze and extract valuable information that otherwise cannot be obtained manually.

According to an embodiment of the present invention, a computer-implemented system comprising for providing project economics analysis includes: a project economics analysis tool (PEAT) module comprising physical memory storing instructions that cause the PEAT module to: provide a user, via said PEAT module, a user interface for integrated risk management integration; present said user with one or more integrated risk management methodologies from a group of risk management methodologies comprising Monte Carlo risk simulation, strategic real options, stochastic forecasting, business analytics, and portfolio optimization, wherein said one or more integrated risk management methodologies project and portfolio economics and financial analysis; receive user input from said user, wherein said user input comprises one or more entries to one or more open fields of said one or more integrated risk management methodologies; process said user input from said user, wherein said user input is analyzed using said one or more integrated risk management methodologies, wherein said PEAT module automatically causes said user input to be analyzed by said one or more integrated risk management methodologies consecutively, wherein in output from a first integrated risk management methodology becomes input to a second integrated risk management methodology; generate a result, wherein said result is determined after being processed by a final integrated risk management methodology of said group of risk management methodologies; and create a report, wherein said report allows said user to numerically and graphically interpret said result.

According to an embodiment of the present invention, the user interface of said PEAT module is organized in a tri-level tabular format.

According to an embodiment of the present invention, the PEAT module further comprise an industry-specific module.

According to an embodiment of the present invention, the industry-specific module is programmed for oil and gas project economics.

According to an embodiment of the present invention, the PEAT module further comprises an application-specific module.

According to an embodiment of the present invention, the application-specific module is programmed for discounted cash flow modeling.

According to an embodiment of the present invention, the report can be extracted to a word processor program.

According to an embodiment of the present invention, the report can be extracted to a spread-sheet application.

According to an embodiment of the present invention, the said report can be extracted to a presentation program.

According to an embodiment of the present invention, a computer-implemented method for providing integrated risk management integration via a project economics analysis tool (PEAT) module, the method including the steps of: providing a user, via said PEAT module, a user interface for integrated risk management integration; presenting said user with one or more integrated risk management methodologies from a group of risk management methodologies comprising Monte Carlo risk simulation, strategic real options, stochastic forecasting, business analytics, and portfolio optimization, wherein said one or more integrated risk management methodologies project and portfolio economics and financial analysis; receiving user input from said user, wherein said user input comprises one or more entries to one or more open fields of said one or more integrated risk management methodologies; processing said user input from said user, wherein said user input is analyzed using said one or more integrated risk management methodologies, wherein said PEAT module automatically causes said user input to be analyzed by said one or more integrated risk management methodologies consecutively, wherein in output from a first integrated risk management methodology becomes input to a second integrated risk management methodology; generating a result, wherein said result is determined after being processed by a final integrated risk management methodology of said group of risk management methodologies; and creating a report, wherein said report allows said user to numerically and graphically interpret said result.

According to an embodiment of the present invention, the method includes the step of extracting said report to a word processor program.

According to an embodiment of the present invention, the method includes the step of extracting said report to a spread-sheet application.

According to an embodiment of the present invention, the method includes the step of extracting said report to a presentation program.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 5 illustrates the Full Screen grid pop-up.
FIG. 14 illustrates the Input Assumptions for an oil and gas model.
FIG. 33 illustrates the Portfolio Optimization's Optimization Settings tab.
FIG. 42 illustrates the Report Settings setup.

DETAILED DESCRIPTION OF THE INVENTION

The present invention is applicable in the fields of corporate finance, corporate capital investments, economics, math, risk analysis, simulation, decision analysis, and business statistics, and relates to the modeling and valuation of investment decisions under uncertainty and risk within all companies, allowing these firms to properly identify, assess, quantify, value, diversify, and hedge their corporate capital investment decisions and their associated risks.

According to an embodiment of the present invention, the computer-implemented system and methods herein described may comprise one or more separate and individually executable applications.

Figure 1:
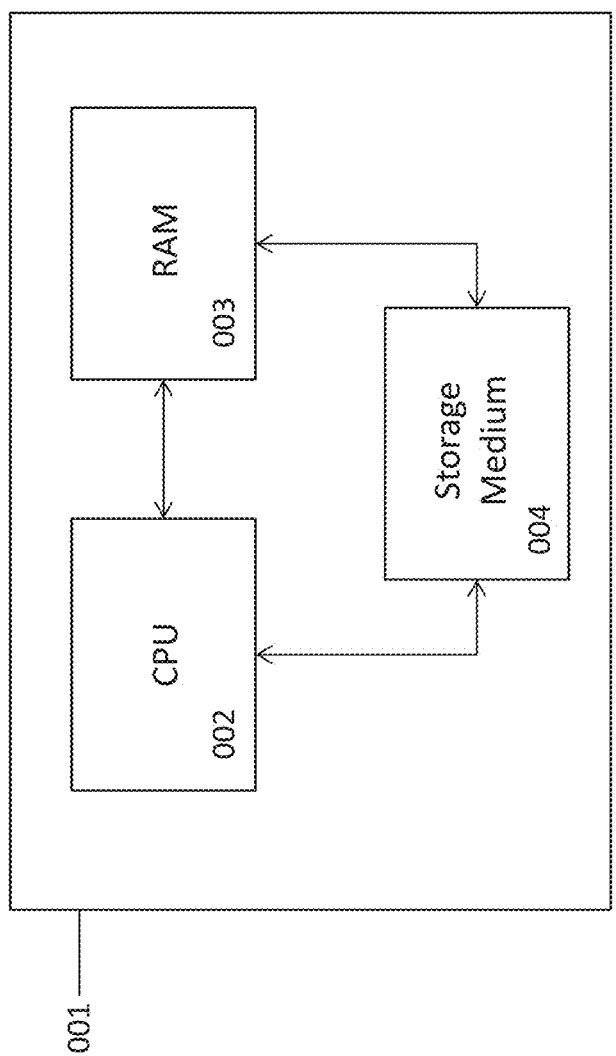
FIG. 1 illustrates a schematic overview of a computing device.

According to an embodiment of the present invention, the system and method are accomplished through the use of one or more computing devices. As shown in FIG. 1, one of ordinary skill in the art would appreciate that a computing device 001 appropriate for use with embodiments of the present application may generally comprise one or more central processing units (CPU) 002, random access memory (RAM) 003, and a storage medium (e.g., hard disk drive, solid state drive, flash memory, cloud storage) 004.

Examples of computing devices usable with embodiments of the present invention include, but are not limited to, personal computers, smartphones, laptops, mobile computing devices, tablet PCs, and servers. The term "computing device" may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system, and provided by the system to users of the system across local area networks (LANs, e.g., office networks, home networks) or wide area networks (WANs, e.g., the Internet). In accordance with the previous embodiment, the system may comprise numerous servers communicatively connected across one or more LANs and/or WANs. One of ordinary skill in the art would appreciate that there are numerous manners in which the system could be configured, and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network; however, a user may be able to compose data offline that will be consumed by the system when the user is later connected to a network.

Figure 2:
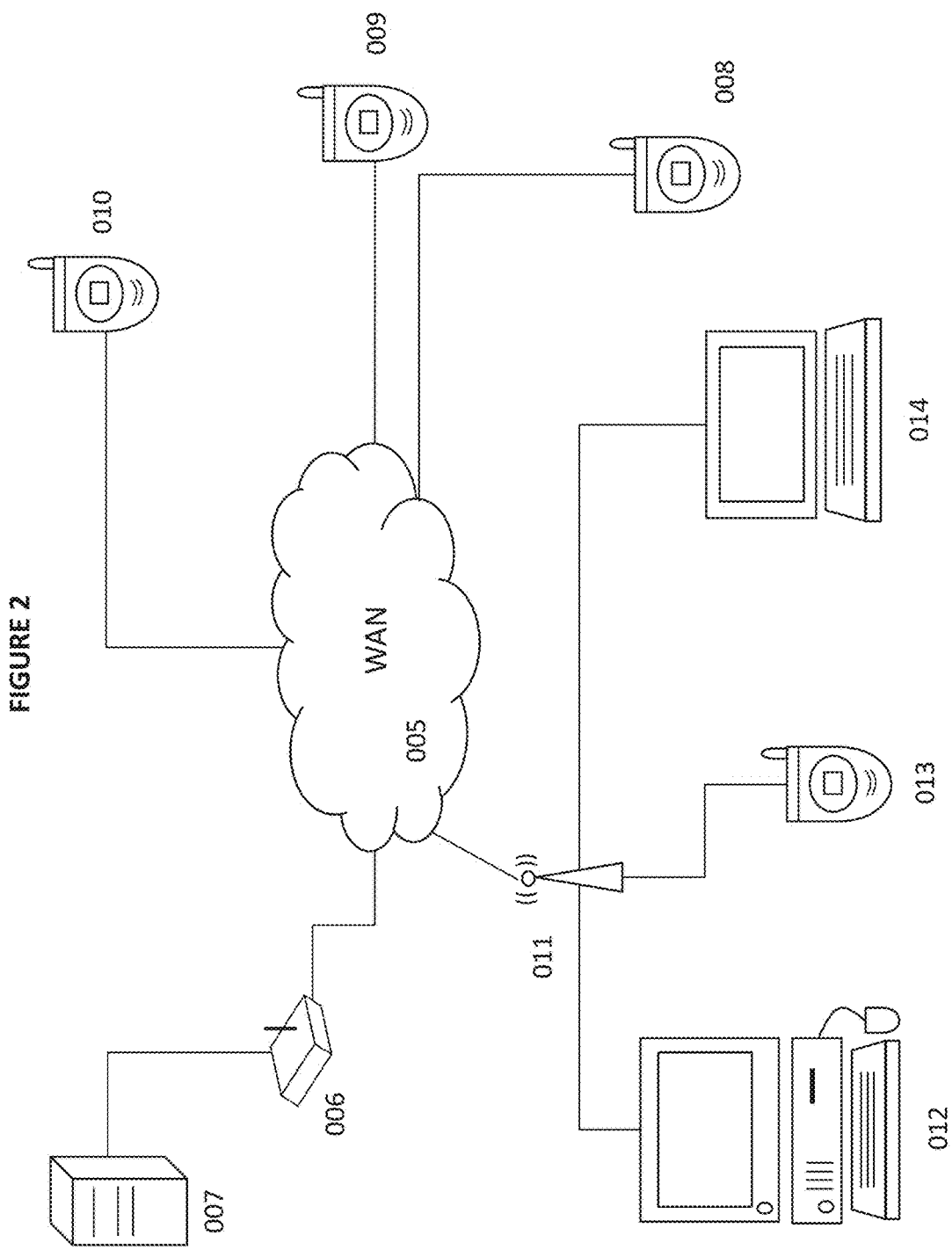
FIG. 2 illustrates a network schematic of a system.

Referring to FIG. 2, a schematic overview of a system in accordance with an embodiment of the present invention is shown. The system consists of one or more application servers 007 for electronically storing information used by the system. Applications in the application server 007 may retrieve and manipulate information in storage devices and exchange information through a WAN 005 (e.g., the Internet). Applications in a server 007 may also be used to manipulate information stored remotely and to process and analyze data stored remotely across a WAN 005 (e.g., the Internet).

According to an exemplary embodiment of the present invention, as shown in FIG. 2, exchange of information through the WAN 005 or other network may occur through one or more high-speed connections. In some cases, high-speed connections may be over-the-air (OTA), passed through networked systems, directly connected to one or more WANs 005, or directed through one or more routers 006. Router(s) 006 are completely optional, and other embodiments in accordance with the present invention may or may not utilize one or more routers 006. One of ordinary skill in the art would appreciate that there are numerous ways a server 007 may connect to a WAN 005 for the exchange of information, and embodiments of the present invention are contemplated for use with any method for connecting to networks for the purpose of exchanging information. Further, while this application refers to high-speed connections, embodiments of the present invention may be utilized with connections of any speed.

According to an embodiment of the present invention, components of the system may connect to a server 007 via a WAN 005 or other network in numerous ways. For instance, a component may connect to the system (i) through a computing device 008, 009, 010 directly connected to the WAN 005; (ii) through a computing device 007 connected to the WAN 005 through a routing device 006; (iii) through a computing device 012, 013, 014 connected to a wireless access point 011; or (iv) through a computing device 011 via a wireless connection (e.g., CDMA, GMS, 3G, 4G) to the WAN 005. One of ordinary skill in the art would appreciate that there are numerous ways that a component may connect to a server 007 via a WAN 005 or other network, and embodiments of the present invention are contemplated for use with any method for connecting to a server 007 via a WAN 005 or other network. Furthermore, a server 007 could be a personal computing device, such as a smartphone, tablet PC, or laptop or desktop computer, acting as a host for other computing devices to connect to.

Figure 3:
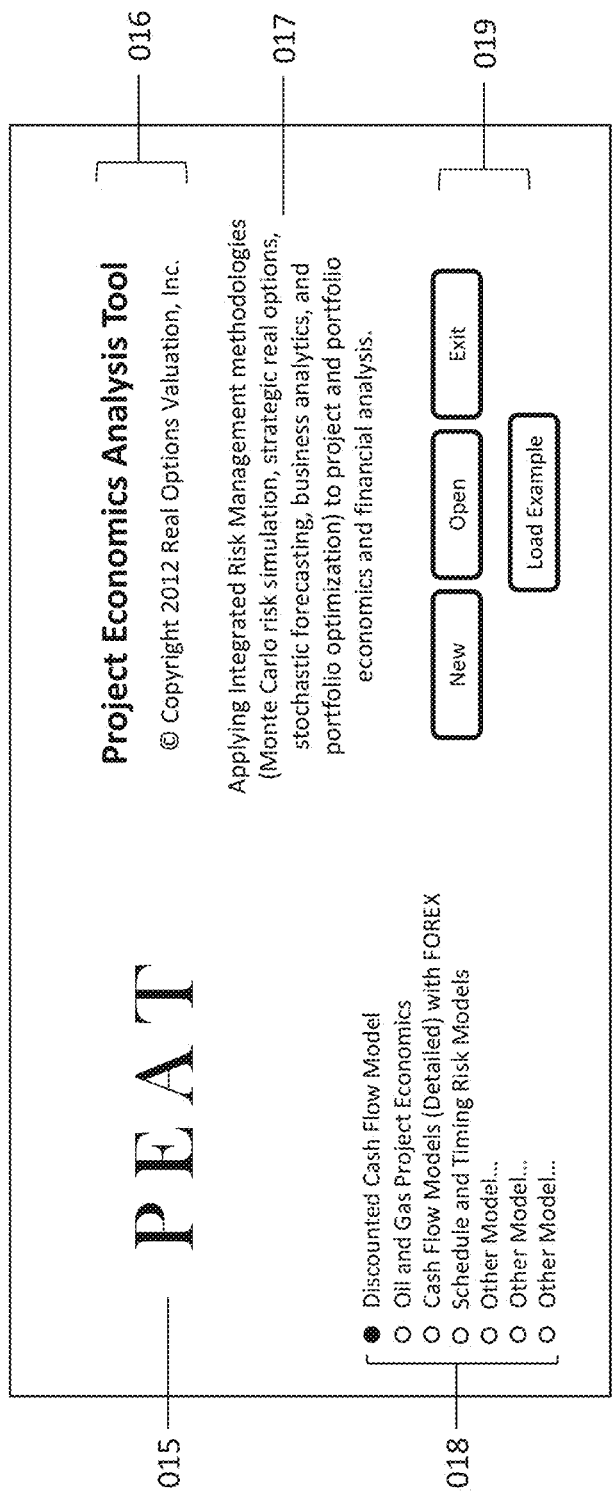
FIG. 3 illustrates the Project Economics Analysis Tool (PEAT) utility's starting screen.

According to an embodiment of the present invention, FIG. 3 illustrates the Project Economics Analysis Tool (PEAT) software utility 015 and 016. In a preferred embodiment, this utility is designed to apply Integrated Risk Management methodologies (Monte Carlo risk simulation, strategic real options, stochastic forecasting, business analytics, and portfolio optimization) to project and portfolio economics and financial analysis 017. The PEAT utility can house multiple industry-specific or application-specific modules 018 such as oil and gas industry models (industry specific) or discounted cash flow model (application specific). The utility can house multiple additional types of models (industry or application specific) as required. The user can choose the model desired and create a new model from scratch, open a previously saved model, load a predefined example, or exit the utility 019.

Figure 4:
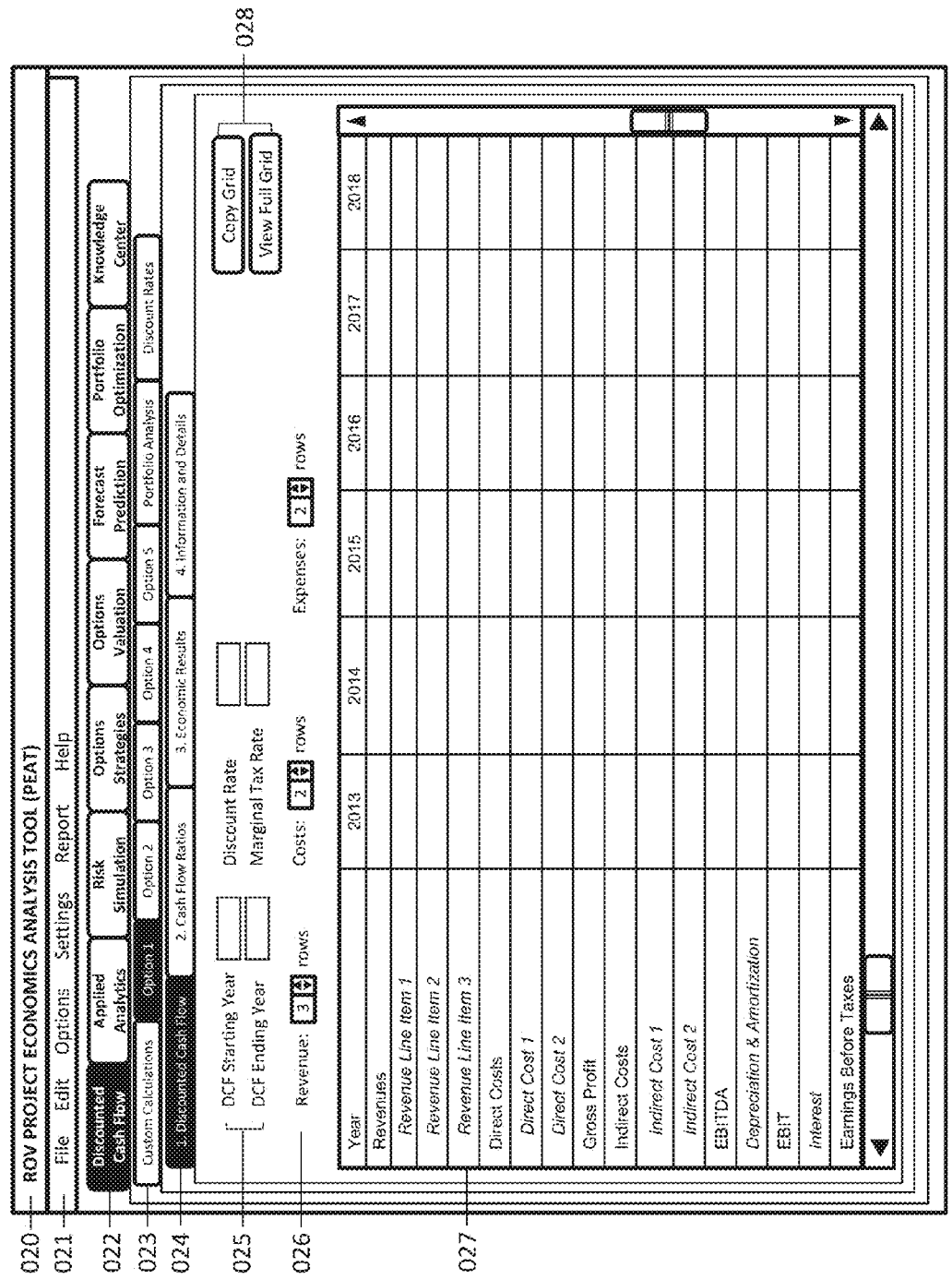
FIG. 4 illustrates the main PEAT utility.

In an exemplary embodiment according to the present invention, FIG. 4 illustrates the main PEAT utility 020 where its menu items 021 are fairly straightforward (e.g., File|New or File|Save items where one of ordinary skill in the art would understand that these are common knowledge and common in most desktop software applications). The software is also arranged in a tabular format. There are three tab levels 022, 023, 024 in the software, and a user would proceed from top to bottom and left to right when running analyses in the utility. Referring to FIG. 4, for instance, a user would start with the Discounted Cash Flow (Level 1) tab 022, select Custom Calculations or Option 1 in (Level 2) 023, and begin entering inputs in the 1. Discounted Cash Flow (Level 3) tab 024. The user would then proceed to the 2. Cash Flow Ratios (Level 3) 024, and then on to the 3. Economic Results (Level 3) subtab 024, and so forth. When the lowest level subtabs are completed, the user would proceed up one level and continue with Option 2 (Level 2), Option 3 (Level 2), Portfolio Analysis (Level 2) 023, and so forth. When these tabs at Level 2 are completed, the user would continue up a level to the Applied Analytics (Level 1) tab 022, and proceed in the same fashion. All Level 1 tabs are identical regardless of the Module (e.g., Discounted Cash Flow [DCF] Model or Oil and Gas [O&G] Model) chosen 018 as illustrated in FIG. 3, except for the first tab (Discounted Cash Flow) 022.

According to an embodiment of the present invention, FIG. 4's Discounted Cash Flow section is at the heart of the analysis' input assumptions. In a preferred embodiment, a user would enter his or her input assumptions such as starting and ending years of the analysis, the discount rate to use, and the marginal tax rate 025, and set up the project economics model (adding or deleting rows in each subcategory of the financial model 026). Additional time series inputs are entered in the data grid 027 as required, while some elements of this grid are intermediate computed values. The entire grid can be copied and pasted into another software application such as Microsoft Excel, Microsoft Word, or other third-party software applications, or can be viewed in its entirety as a full screen pop-up 028.

According to an embodiment of the present invention, the user can also identify and create the various Options 023, and compute the economic and financial results such as Net Present Value (NPV), Internal Rate of Return (IRR), Modified Internal Rate of Return (MIRR), Profitability Index (PI), Return on Investment (ROI), Payback Period (PP), and Discounted Payback (DPP). In a preferred embodiment, this section will also auto generate various charts, cash flow ratios and models 024, intermediate calculations 024, and comparisons of the user's Options within a portfolio view 023 as will be illustrated in the next few figures.

According to an embodiment of the present invention, when the user is in any of the Options tabs, the Options menu 021 will become available, ready for users to add, delete, duplicate, or rename an option or rearrange the order of the Option tabs by first clicking on any Option 023 tab and then selecting Options 021 and selecting Add, Delete, Duplicate, Rearrange, or Rename Option from the menu. In a preferred embodiment, all of the required functionalities such as input assumptions, adding or reducing the number of rows, selecting discount rate type, or copying the grid are available within each Option tab. The input assumptions entered in these individual Option tabs 023 are localized and used only within each tab, whereas input assumptions entered in the Global Settings (to be discussed later in FIG. 11) tab apply to all Option tabs simultaneously. Typically, the user will need to enter all the required inputs, and if certain cells are irrelevant, users will have to enter zeros. Users can also increase or decrease the number of rows for each category as required. The DCF Starting Year input is the discounting base year, where all cash flows will be present valued to this year. The main categories are in boldface, and the input boxes under the categories are for entering in the line item name/label 027. Users can click on Copy Grid 028 to copy the results into the Microsoft Windows clipboard in order to paste into another software application such as Microsoft Excel or Microsoft Word.

In an exemplary embodiment according to the present invention, FIG. 5 illustrates the Full Screen grid pop-up 029. This is to facilitate the viewing of the model in its entirety without the need to scroll to the left/right or up/down. The grid will be maximized to full view and also facilitates the taking of screenshots.

Figure 6:
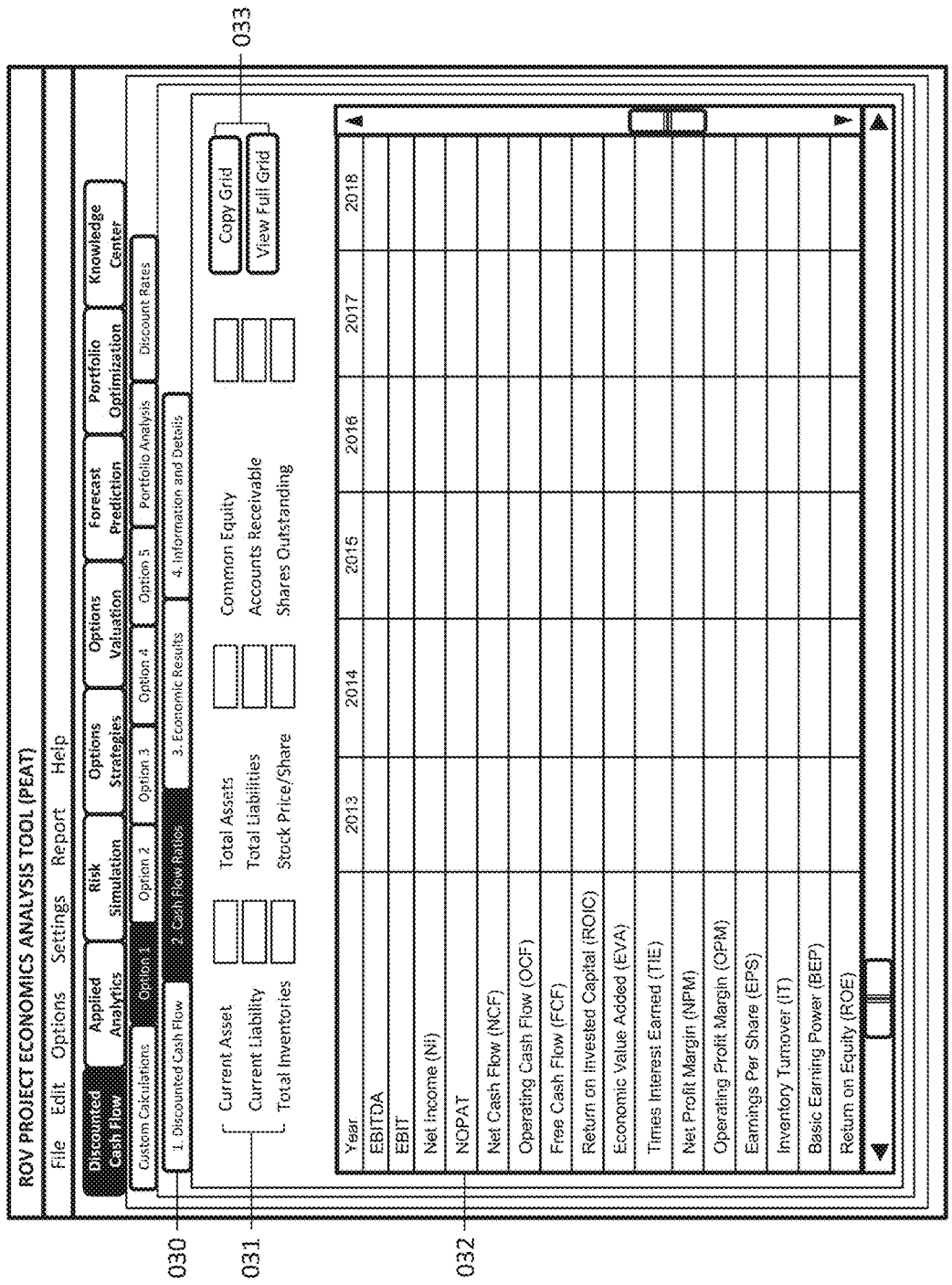
FIG. 6 illustrates the Cash Flow Ratios calculation.

In an exemplary embodiment according to the present invention, FIG. 6 illustrates the Cash Flow Ratios calculation 030. In a preferred embodiment, this tab is where additional balance sheet data can be entered 031 (e.g., current asset, shares outstanding, common equity, total debt, etc.) and the relevant financial ratios will be computed 032 (EBIT, Net Income, Net Cash Flow, Operating Cash Flow, Economic Value Added, Return on Invested Capital, Net Profit Margin, etc.). Computed results or intermediate calculations are shown as data grids. Data grid rows are color coded by alternate rows for easy viewing. As usual, Copy Grid 033 can be clicked to copy the computations to the Microsoft Windows clipboard from which the computations can then be pasted into another third-party software application such as Microsoft Excel.

According to an embodiment of the present invention, users can enter the input assumptions as best they can, or they can guess at some of these figures to get started. In a preferred embodiment, the inputs entered in this Cash Flow Ratios subtab will be used only in this subtab's balance sheet ratios. The results grid shows the time series of cash flow analysis for the Option for multiple years. These are the cash flows used to compute the NPV, IRR, MIRR, and so forth. As usual, users can Copy Grid or View Full Grid 033 of the results.

Figure 7:
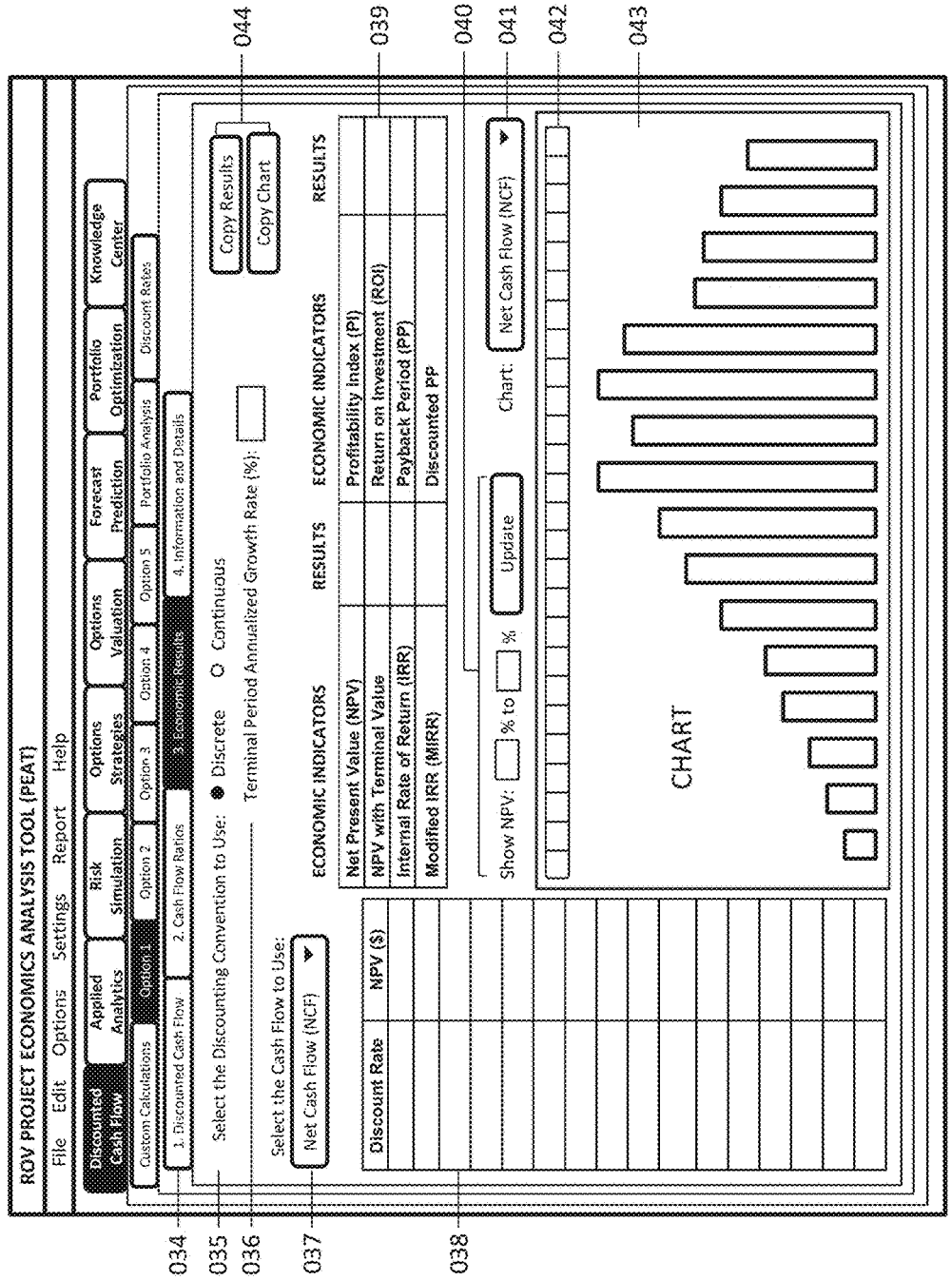
FIG. 7 illustrates the Economic Results of each option.

In an exemplary embodiment according to the present invention, FIG. 7 illustrates the Economic Results of each option 034. This Economic Results (Level 3) subtab shows the results from the chosen Option and returns the Net Present Value (NPV), Internal Rate of Return (IRR), Modified Internal Rate of Return (MIRR), Profitability Index (PI), Return on Investment (ROI), Payback Period (PP), and Discounted Payback Period (DPP) 039. These computed results are based on the user's selection of the discounting convention 035, if there is a constant terminal growth rate 036, and the cash flow 037 to use (e.g., net cash flow versus net income or operating cash flow). An NPV Profile table 038 and chart 043 are also provided, where different discount rates and their respective NPV results are shown and charted. Users can change the range of the discount rates to show/compute 040 by entering the "From/To" percent and clicking on Update, copy the results 044, and copy the NPV Profile chart, as well as use any of the chart icons 042 to manipulate the chart's look and feel (e.g., change the chart's line/background color, chart type, chart view, or add/remove gridlines, show/hide labels, and show/hide legend). Users can also change the variable to display in the chart 041. For instance, users can change the chart from displaying the NPV Profile to the time-series charts of net cash flows, taxable income, operating cash flows, cumulative final cash flows, present value of the final cash flows, and so forth. Users can then click on the Copy Results or Copy Chart buttons 044 to take a screenshot of the modified chart that can then be pasted into another software application such as Microsoft Excel or Microsoft PowerPoint.

Economic Results are for each individual Option, whereas the Portfolio Analysis tab (FIG. 9) compares the economic results of all Options at once. The Terminal Value Annualized Growth Rate 036 is applied to the last year's cash flow to account for a perpetual constant growth rate cash flow model, and these future cash flows, depending on which cash flow type chosen 037, are discounted back to the base year and added to the NPV to arrive at the NPV with Terminal Value result 039. Users can change the Show NPV percentages and click Update 040 to change the NPV Profile results grid and chart (assuming the user had previously selected the NPV Profile chart). As usual, there are chart icons users have access to in order to modify the chart (bar chart color, chart type, chart view, background color, rotation, show/hide labels and legends, show/hide gridlines and data labels, etc.). Also available are the Copy Results and Copy Chart functionalities 044. In the Oil and Gas module, there are multiple discount rates, and these rates and their respective NPV results are highlighted in the data grid, as well as the discount rate equivalent to the IRR (i.e., the discount rate where NPV equals zero) 038.

Figure 8:
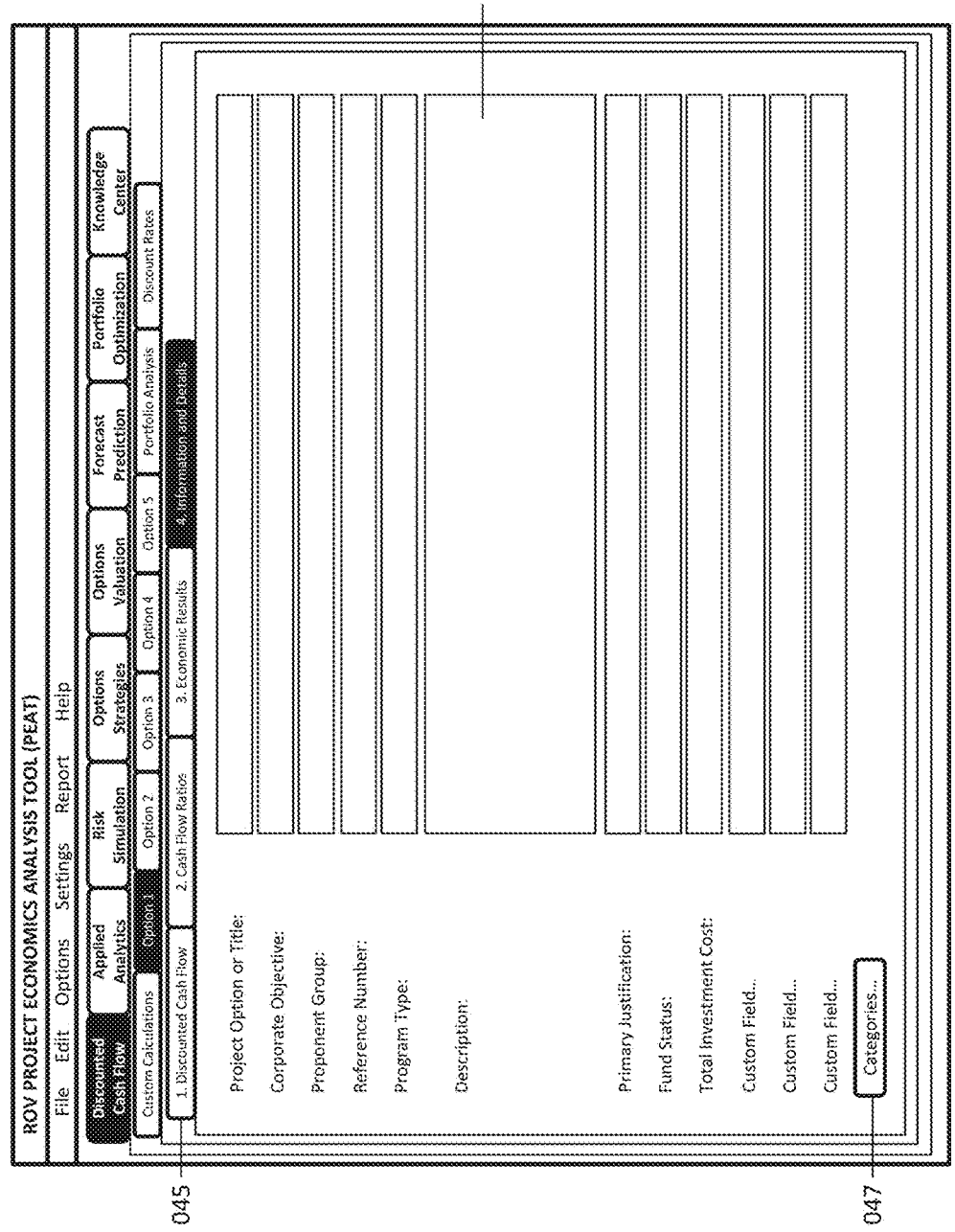
FIG. 8 illustrates the Information and Details tab.

In an exemplary embodiment according to the present invention, FIG. 8 illustrates the Information and Details 045 tab. Users would apply this tab for entering justifications for the input assumptions used as well as any notes on each of the Options. For numerical calculations and notes, use the Custom Calculations tab (FIG. 10) instead. Users can also change the labels and Categories 047 of the Information and Details tab by clicking on Categories and editing the default labels. The formatting of entered text can be performed in the Description 046 box by clicking on the various text formatting icons.

Figure 9:
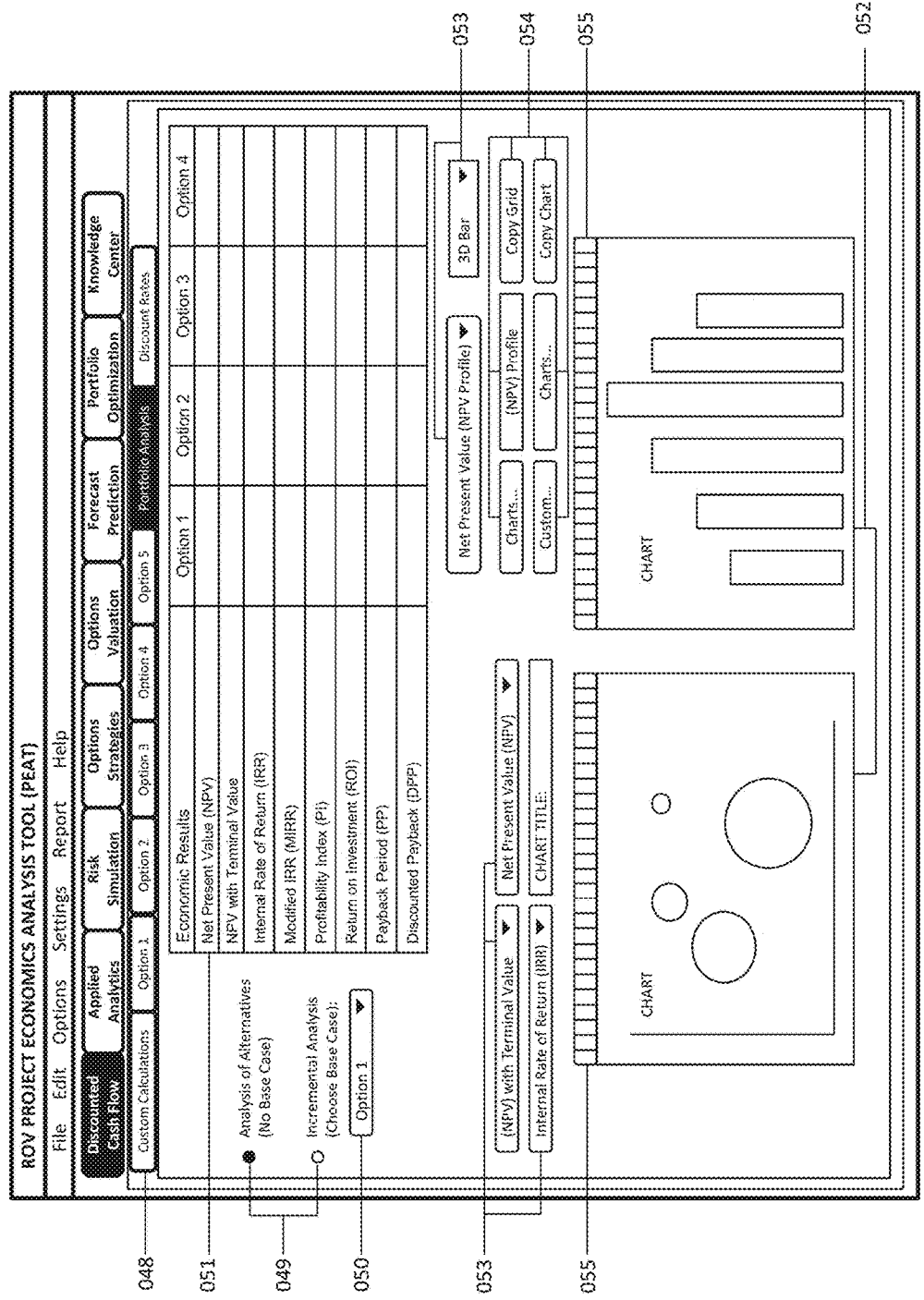
FIG. 9 illustrates the Portfolio Analysis of multiple Options.

In an exemplary embodiment according to the present invention, FIG. 9 illustrates the Portfolio Analysis 048 of multiple Options. This Portfolio Analysis tab returns the computed economic and financial indicators such as NPV, IRR, MIRR, PI, ROI, PP, and DPP 051 for all the Options combined into a portfolio view (these results can be stand-alone with no base case or computed as incremental 049 values above and beyond the chosen base case 050). The Economic Results (Level 3) subtabs show the individual Option's economic and financial indicators, whereas this Level 2 Portfolio Analysis 048 view shows the results of all Options' indicators and compares them side by side. There are also two charts 052 available for comparing these individual Options' results. The Portfolio Analysis tab is used to obtain a side-by-side comparison of all the main economic and financial indicators of all the Options at once. For instance, users can compare all the NPVs from each Option in a single results grid. The bubble chart on the left provides a visual representation of up to three chosen variables 053 at once (e.g., the y-axis shows the IRR, the x-axis represents the NPV, and the size of the bubble may represent the capital investment; in such a situation, one would prefer a smaller ball that is in the top right quadrant of the chart). These charts have associated icons 055 that can be used to modify their settings (chart type, color, legend, and so forth). As usual, chart icons, Copy Grid, and Copy Chart 054 are available for use in this tab.

Figure 10:
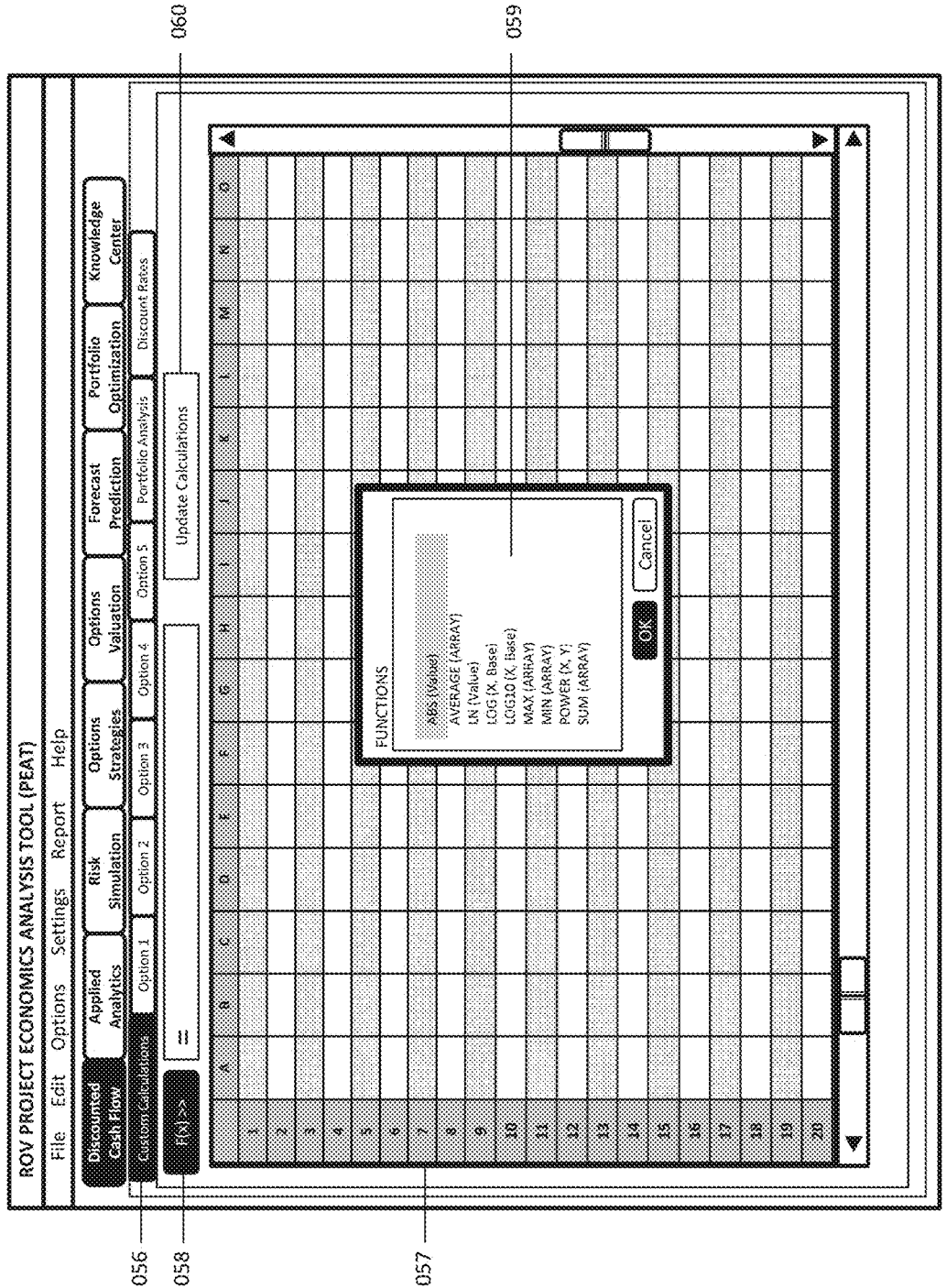
FIG. 10 illustrates the Customs Calculation tab.

In an exemplary embodiment according to the present invention, FIG. 10 illustrates the Customs Calculation tab 056 also available for making the user's own custom calculations 057 just as users would in a Microsoft Excel spreadsheet. Clicking on the Function F(x) button 058 will provide users with a list of the supported functions 059 that can be used in this tab. A manual Update Calculations 060 can be clicked to update the worksheet's calculations. Other basic mathematical functions are also supported, such as =, +, −, /, *, ˆ. If users use this optional Custom Calculations tab and wish to link some cells to the input tabs (e.g., Option 1), they can select the cells in the Custom Calculations tab, right-click, and select Link To. Then they would proceed to the location in the Option tabs and highlight the location of the input cells they wish to link to, right-click, and select Link From. Any subsequent changes users make in the Custom Calculations tab will be updated in the linked input assumption cells.

As an illustrative example, in the Custom Calculations tab, a user may enter the following: 1, 2, 3, into cells A1, B1, C1, respectively. Then in cell D1, enter=A1+B1+C1 and click on any other cell and it will update the cell and return the value 6. Similarly, users type in =SUM(A1:C1) to obtain the same results. The preset functions can be seen by clicking on the F(x) the button.

As an illustrative example, in the Custom Calculations tab, a user may enter the following: 1, 2, 3, into cells A1, B1, C1, respectively. Then, select these three cells, right-click, and select Link To. Proceed to any one of the Option tabs, and in the Discounted Cash Flow or Input Assumptions subtabs, select three cells across (e.g., on the Revenue line item), right-click, and select Link From. The values of cells A1, B1, C1 in the Custom Calculations tab will be linked to this location. Users can go back to the Custom Calculations tab and change the values in the original three cells and they will see the linked cells in the Discounted Cash Flow or Input Assumptions subtabs change and update to reflect the new values.

Figure 11:
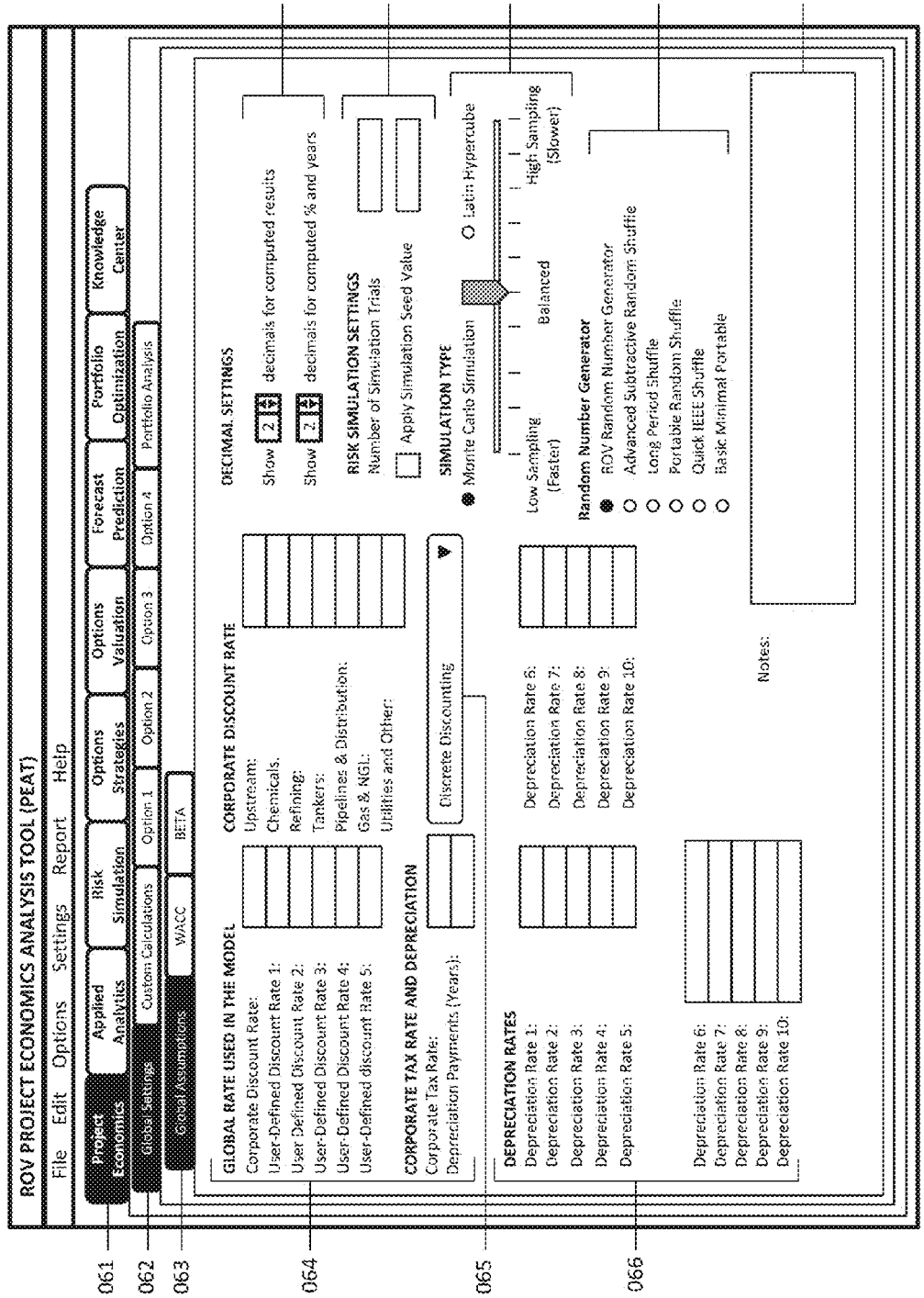
FIG. 11 illustrates the Global Settings section.

In an exemplary embodiment according to the present invention, FIG. 11 illustrates the Global Settings 062 section within the Project Economics module 061, which is only available in the Oil and Gas module and which comprises three subtabs. In preferred embodiment, the Global Assumptions 063 subtab requires users to enter the global inputs that apply across all Options to be analyzed later, including, but not limited to, the various discount rates 064, discounting convention 065, depreciation rates 066, precision decimal settings 067, simulation settings 068, 069, 070, and model notes 071.

Figure 12:
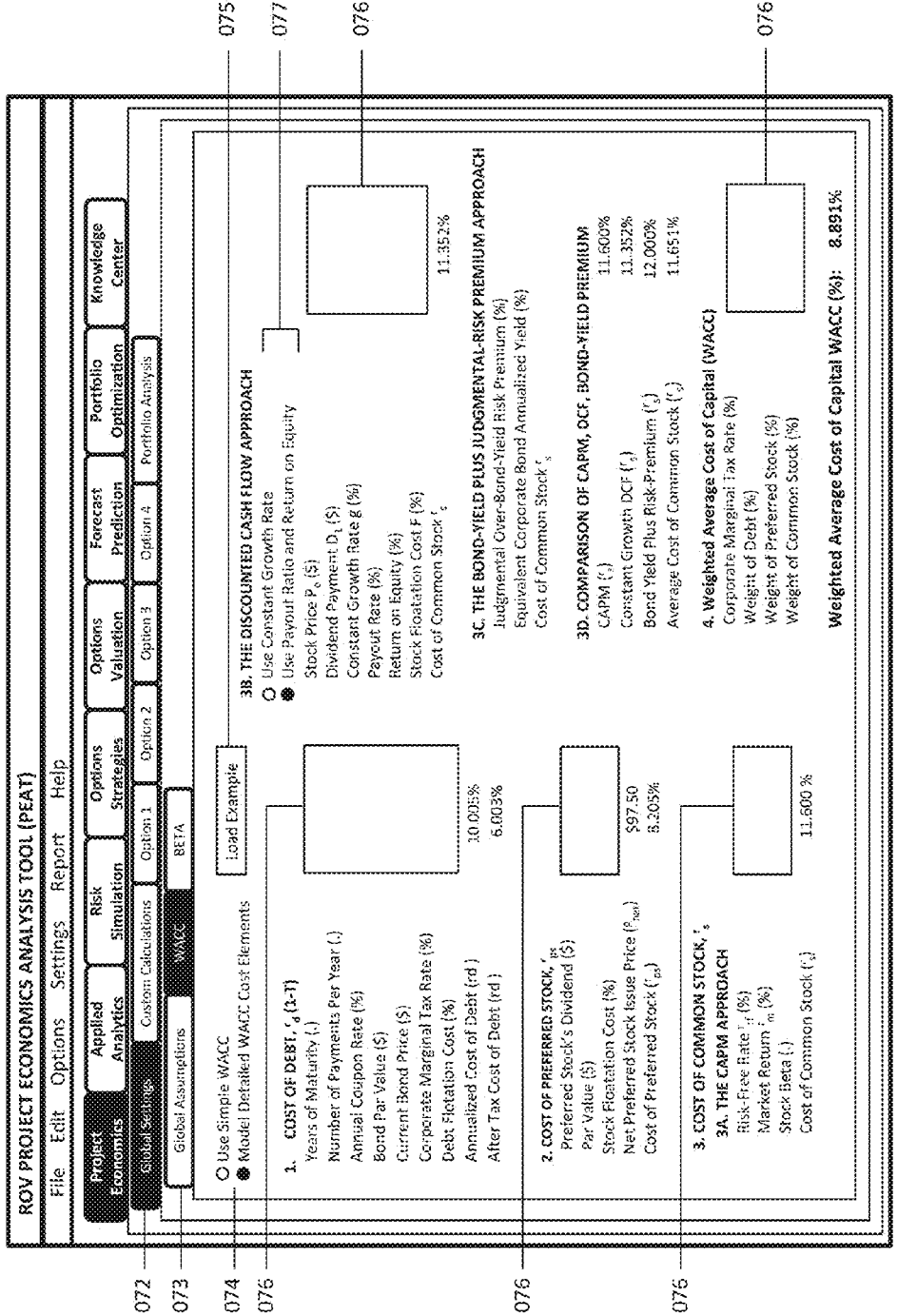
FIG. 12 illustrates the Weighted Average Cost of Capital or WACC calculations.

In an exemplary embodiment according to the present invention, FIG. 12 illustrates the Global Settings 072 tab where the Weighted Average Cost of Capital or WACC 073 calculations are housed. In a preferred embodiment, this is an optional set of analytics whereby users can compute the firm's WACC to use as a discount rate. Users start by selecting either the Simple WACC or Detailed WACC Cost Elements 074. Then, they can either enter the required inputs or click on the Load Example 075 button to load a sample set of inputs that can then be used as a guide to entering their own set of assumptions 076 and additional settings 077.

Figure 13:
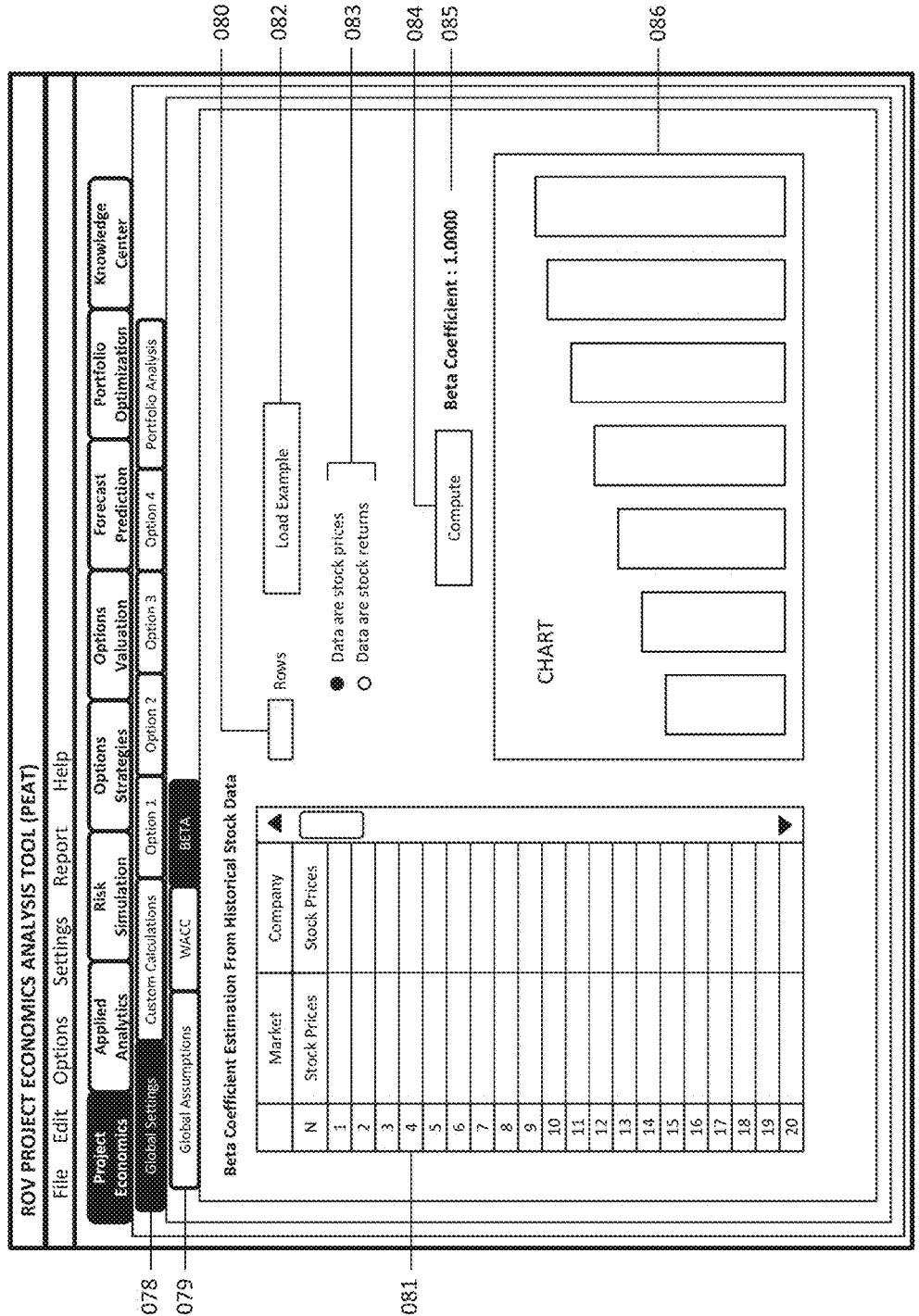
FIG. 13 illustrates the Beta calculations.

In an exemplary embodiment according to the present invention, FIG. 13 illustrates the Beta calculations 079 within the Global Settings 078 tab. This is another optional subtab used for computing the Beta risk coefficient by pasting in historical stock prices or stock returns to compute the Beta 081, and a time-series chart 086 provides a visual for the data entered. The resulting Beta is used in the Capital Asset Pricing Model (CAPM), one of the main inputs into the WACC model. Users start by selecting whether they have historical Stock Prices or Stock Returns 083, then enter the number of Rows (periods) 080 of historical data they have, and Paste the data into the relevant columns and click Compute 084. Users can also click on Load Example 082 to open a sample dataset. The Beta coefficient result 085 will update and users can use this Beta as an input into the WACC model. In the Discounted Cash Flow module, the WACC and BETA calculations are available under the Discount Rate subtab of the main DCF tab.

In an exemplary embodiment according to the present invention, FIG. 14 illustrates the input assumptions 088 for an oil and gas module. The module can contain multiple Options 087 where each Option is considered to either be a stand-alone capital investment strategy or related to other Options. Project or Option Name 089, starting and ending years for the cash flow model 090, project notes 091, discount rate selection 092, number of line items in each subcategory of capital investments, revenues, and expenses 093 are first entered or selected. The user would then enter the required inputs, such as revenues, expenses, and capital investments 096, not forgetting the special Depreciation % and Escalation % columns. The user will have to scroll to the right to continue entering input assumptions in the out-years. The Discount Rate drop-down list defaults to the Corporate Rate 092 entered in the Global Settings tab, but users can change the rate to use here for this Option. Each Option can have a different discount rate (e.g., if the Options have different risk structures, their respective discount rates should be allowed to differ, with the exception that when all Options are considered at par in terms of risk or a global corporate weighted average cost of capital is used). The user can select the Auto-Fill checkboxes 094 if required. The auto-fill function allows users to enter a single value on a line item and all subsequent years on the same line item will be automatically filled with the same value. As usual, the data grid can be copied or viewed full screen 097.

Figure 15:
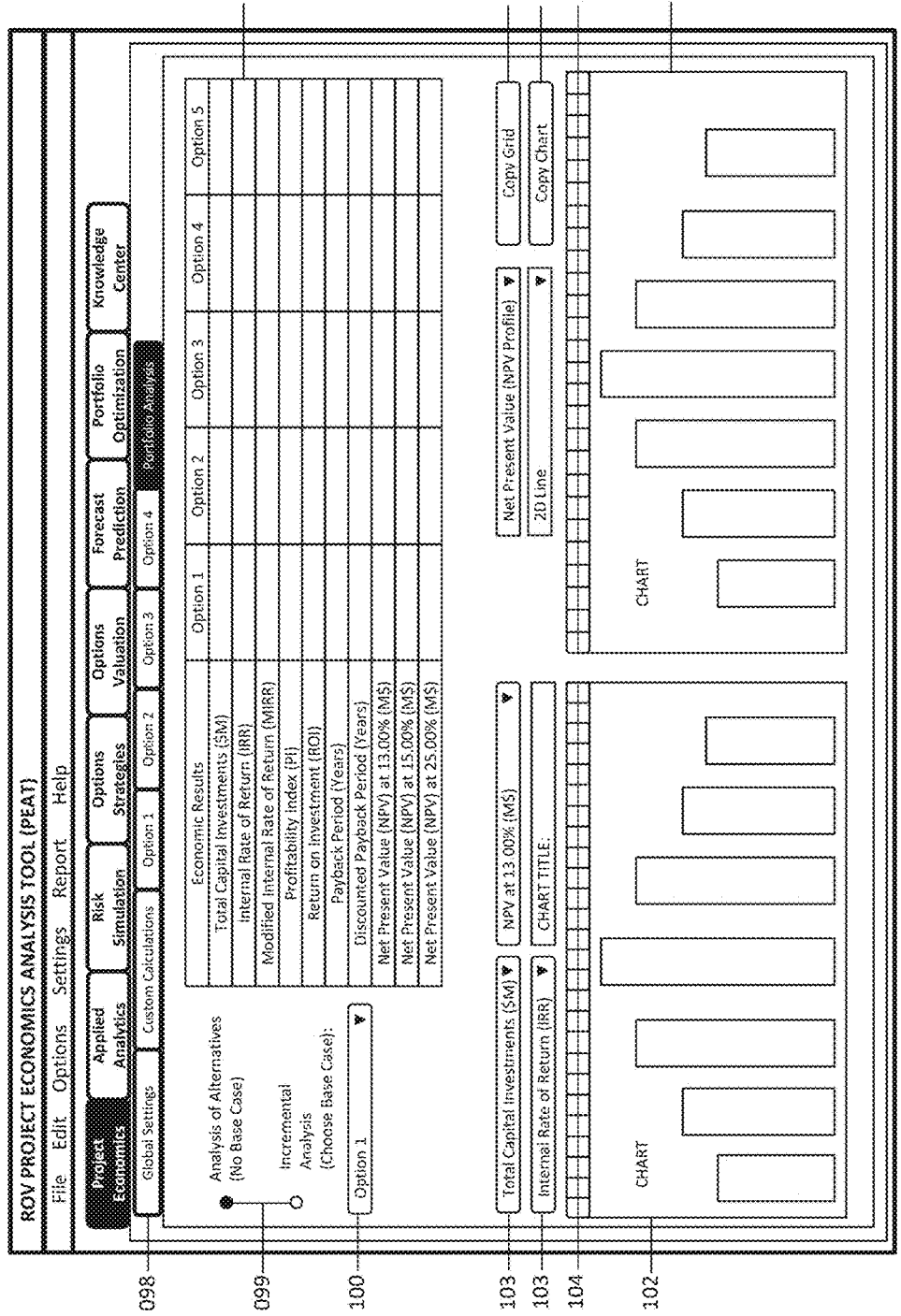
FIG. 15 illustrates the Portfolio Analysis calculations for the oil and gas module.

In an exemplary embodiment according to the present invention, FIG. 15 illustrates the Portfolio Analysis 098 calculations for the oil and gas module. In a preferred embodiment, this Portfolio Analysis tab returns the computed economic and financial indicators such as NPV, IRR, MIRR, PI, ROI, PP, and DPP for all the Options 101 combined into a portfolio view (these results can be stand-alone with no base case or computed as incremental 099 values above and beyond the chosen base case 100). The Economic Results (Level 3) subtabs show the individual Option's economic and financial indicators, whereas this Level 2 Portfolio Analysis view shows the results of all Options' indicators and compares them side by side. There are also two charts available for comparing these individual Options' results. The Portfolio Analysis tab is used to obtain a side-by-side comparison of all the main economic and financial indicators of all the Options at once. For instance, users can compare all the NPVs from each Option in a single results grid. The bubble chart on the left 102 provides a visual representation of up to three selected variables 103 at once (e.g., the y-axis shows the IRR, the x-axis represents the NPV, and the size of the bubble may represent the capital investment; in such a situation, one would prefer a smaller ball that is in the top right quadrant of the chart). As usual, chart icons 104, Copy Grid, and Copy Chart 103 are available for use in this tab.

Figure 16:
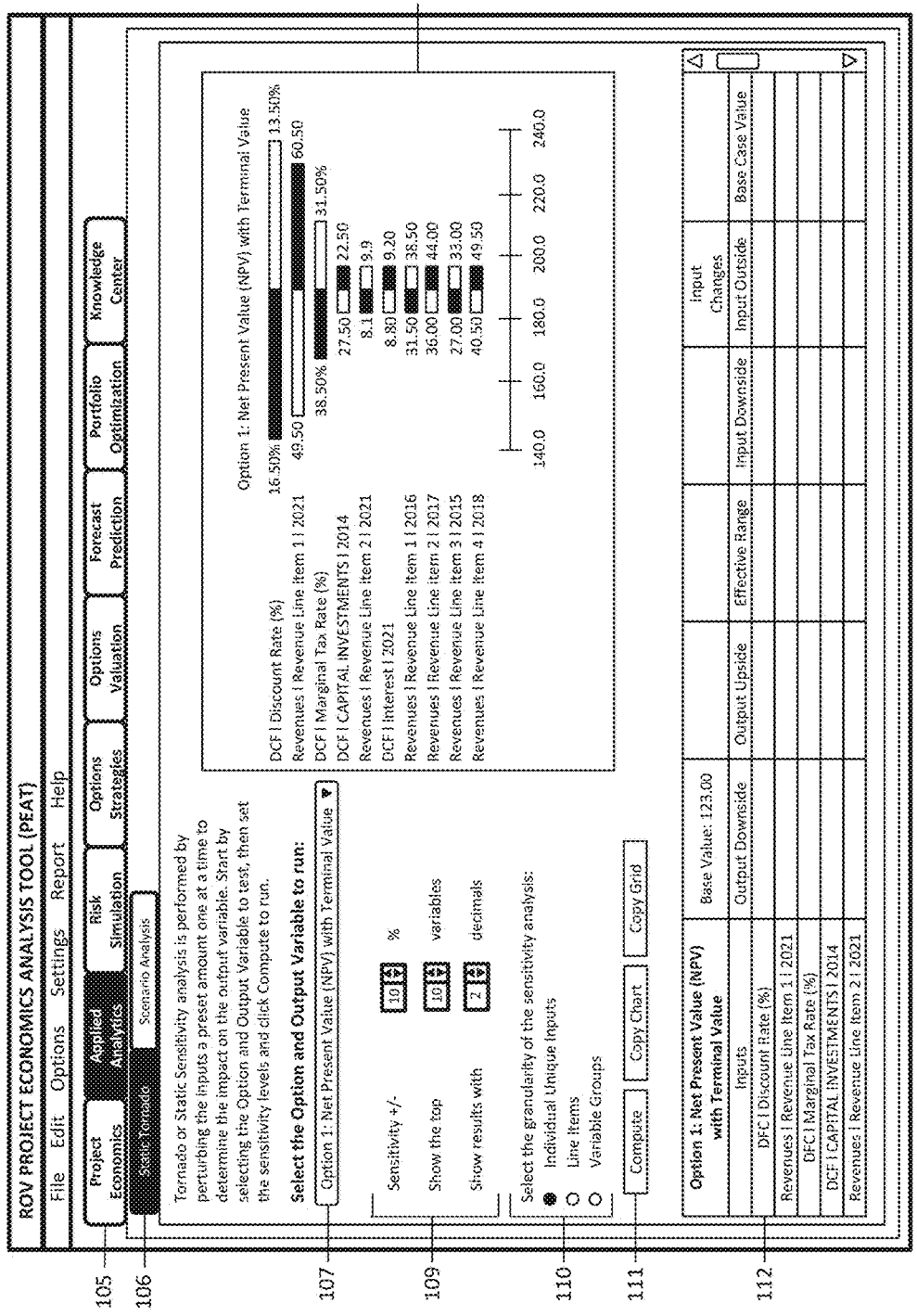
FIG. 16 illustrates the Applied Analytics section for running Tornado Analysis.

In an exemplary embodiment according to the present invention, FIG. 16 illustrates the Applied Analytics 105 section, which allows users to run Tornado Analysis and Scenario Analysis 106 on any one of the Options previously modeled—this analytics tab is on Level 1, which means it covers all of the various Options on Level 2. Users can, therefore, run Tornado or Scenario on any one of the Options. Tornado Analysis 108 is a static sensitivity analysis of the selected model's output to each input assumption, performed one at a time, and ranked from most impactful to the least. Users start the analysis by first choosing the output variable to test from the drop-down list 107.

According to an embodiment of the present invention, the user can change the default sensitivity settings 109 of each input assumption to test and decide how many input assumption variables to chart 109 (large models with many inputs may generate unsightly and less useful charts, whereas showing just the top variables reveals more information through a more elegant chart). Users can also choose to run the input assumptions as unique inputs, group them as a line item 110 (all individual inputs on a single line item are assumed to be one variable), or run as variable groups (e.g., all line items under Revenue will be assumed to be a single variable). Users will need to remember to click Compute 111 to update the analysis if they make any changes to any of the settings. The sensitivity results are also shown as a table grid 112 at the bottom of the screen (e.g., the initial base value of the chosen output variable, the input assumption changes, and the resulting output variable's sensitivity results). As usual, users can Copy Chart or Copy Grid results into the Microsoft Windows clipboard for pasting into another software application. The following illustrates the Tornado chart characteristics 108:

Each horizontal bar 108 indicates a unique input assumption that constitutes a precedent to the selected output variable 112.

The x-axis represents the values of the selected output variable. The wider the bar chart 108, the greater the impact/swing the input assumption has on the output 112.

A green bar on the right indicates that the input assumption has a positive effect on the selected output (conversely, a red bar indicates a negative effect).

Each of the precedent or input assumptions that directly affect the NPV with Terminal Value is tested ±10% by default (this setting can be changed); the top 10 variables are shown on the chart by default (this setting can be changed), with a 2 decimal precision setting 109; and each unique input is tested individually.

Figure 17:
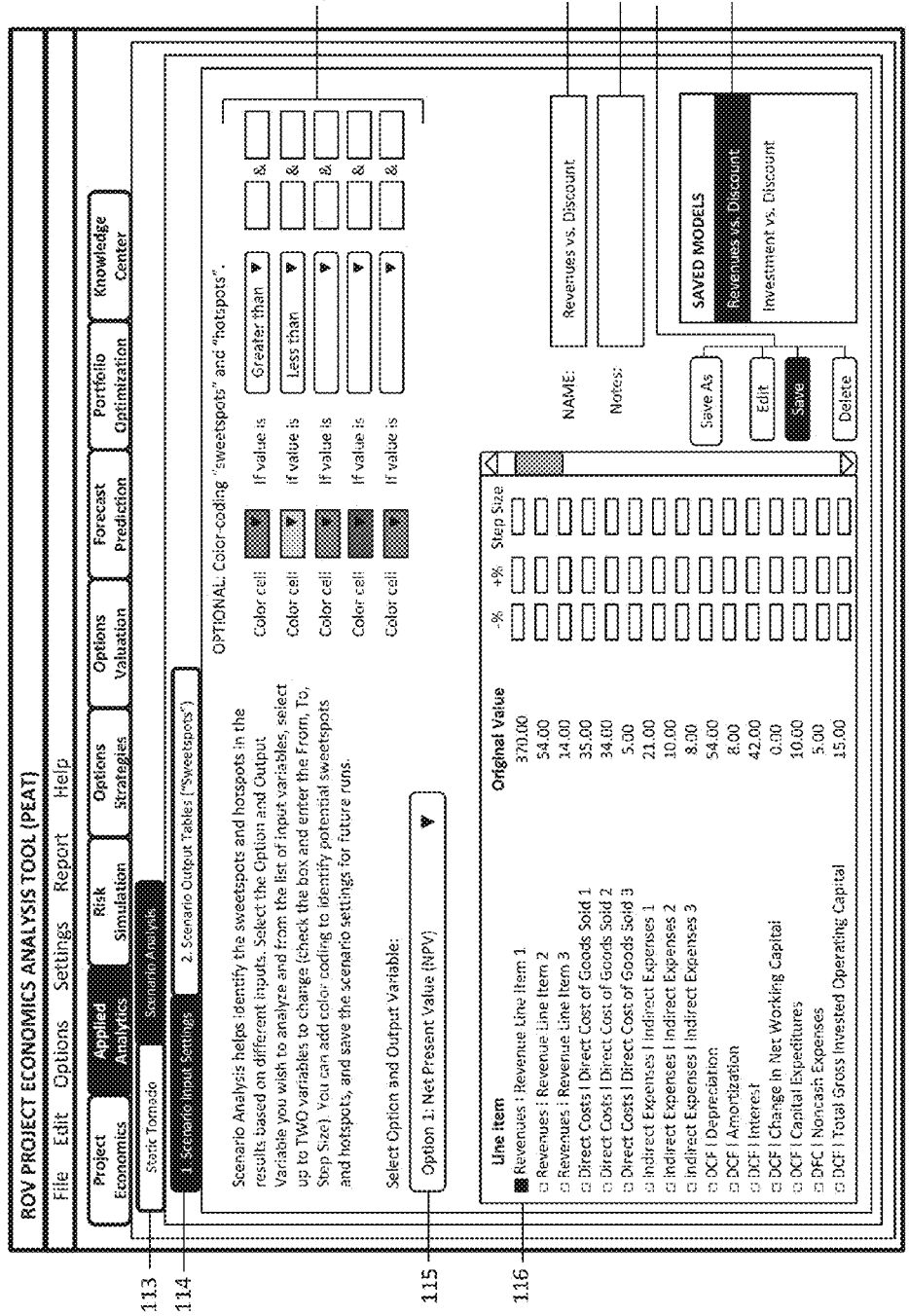
FIG. 17 illustrates the Scenario Analysis input settings.

In an exemplary embodiment according to the present invention, FIG. 17 illustrates the Scenario Analysis 113, which can be easily performed through a two-step process: identify the model input settings 114 and run the model to obtain scenario output tables 114. In the Scenario Input Settings 114 subtab, users start by selecting the output variable 115 they wish to test from the drop-down list. Then, based on the selection, the precedents of the output 116 will be listed under two categories (Line Item, which will change all input assumptions in the entire line item in the model simultaneously, and Single Item, which will change individual input assumption items). Users select one or two checkboxes 116 at a time and the inputs they wish to run scenarios on, and enter the plus/minus percentage to test and the number of steps between these two values to test. Users can also add color coding of sweetspots or hotspots 117 in the scenario analysis (values falling within different ranges have unique colors). Users can create multiple scenarios 120 and Save As 119 each one (enter a Name and model notes 118 for each saved scenario 120).

Figure 18:
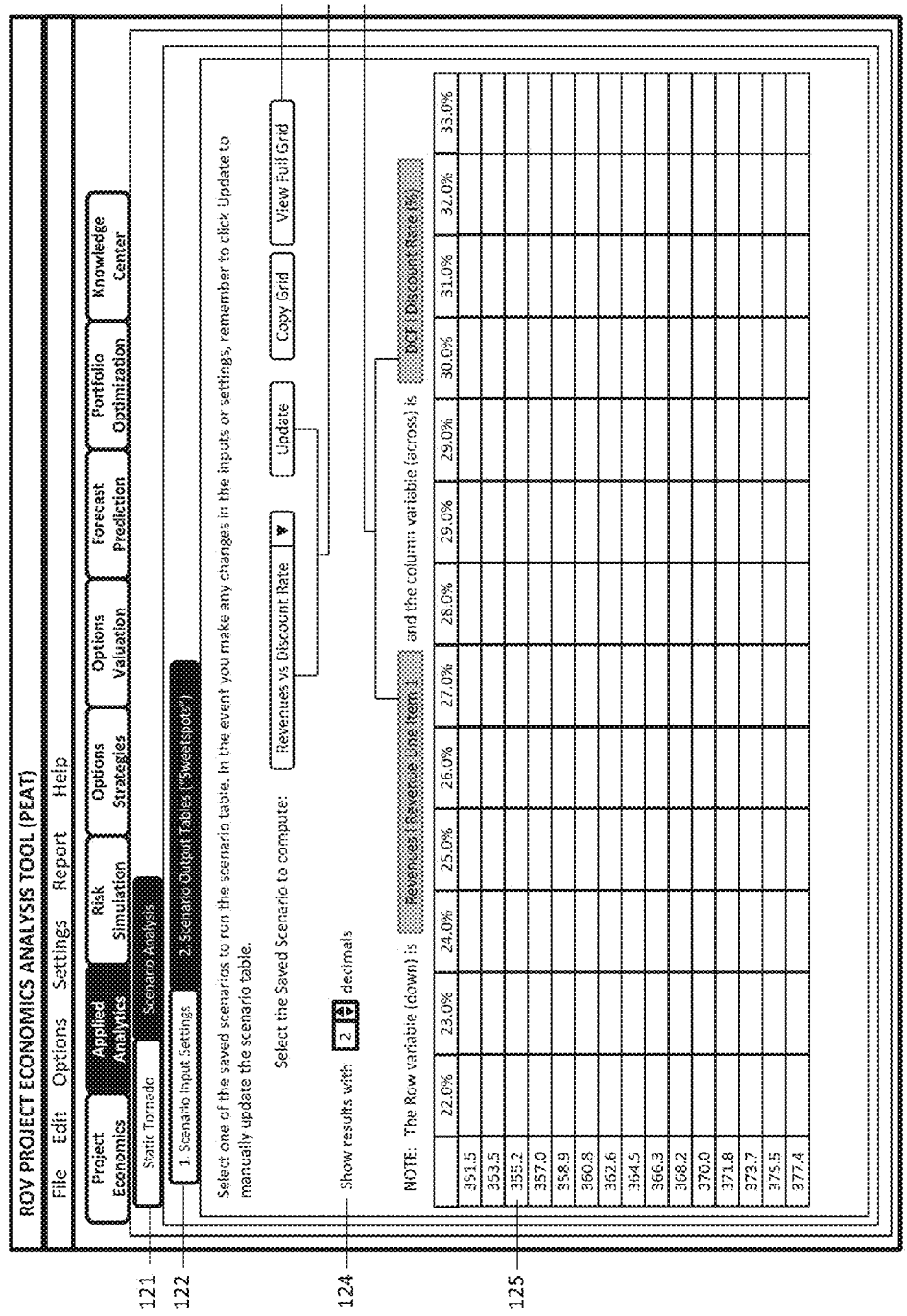
FIG. 18 illustrates the Scenario Analysis output tables and results.

In an exemplary embodiment according to the present invention, FIG. 18 illustrates the Scenario Output Tables 122 to run the saved Scenario Analysis 121 models. Users click on the drop-down list 123 to select the previously saved scenarios to Update 123 and run. The selected scenario table complete with sweetspot/hotspot color coding 125 will be generated. Decimals 124 can be increased or decreased as required, and users can Copy Grid or View Full Grid 127 as needed. To facilitate review of the scenario tables, a Note provides the information of which input variable is set as the rows versus columns 126. The following are some notes on using the Scenario Analysis methodology:

Users can create and run Scenario Analysis on either one or two input variables at once.

The scenario settings can be saved for retrieval in the future, which means users can modify any input assumptions in the Options models and come back to rerun the saved scenarios.

Users can also increase/decrease decimals in the scenario results tables, as well as change colors in the tables for easier visual interpretation (especially when trying to identify scenario combinations, or so-called sweetspots and hotspots).

Additional input variables are available by scrolling down the form.

Line Items can be changed using ±X % where all inputs in the line are changed multiple times within this specific range all at once. Individual Items can be changed ±Y units where each input is changed multiple times within this specific range.

Sweetspots and hotspots refer to specific combinations of two input variables that will drive the output up or down. For instance, suppose investments are below a certain threshold and revenues are above a certain barrier. The NPV will then be in excess of the expected budget (the sweetspots, perhaps highlighted in green). Or if investments are above a certain value, NPV will turn negative if revenues fall below a certain threshold (the hotspots, perhaps highlighted in red).

Figure 19:
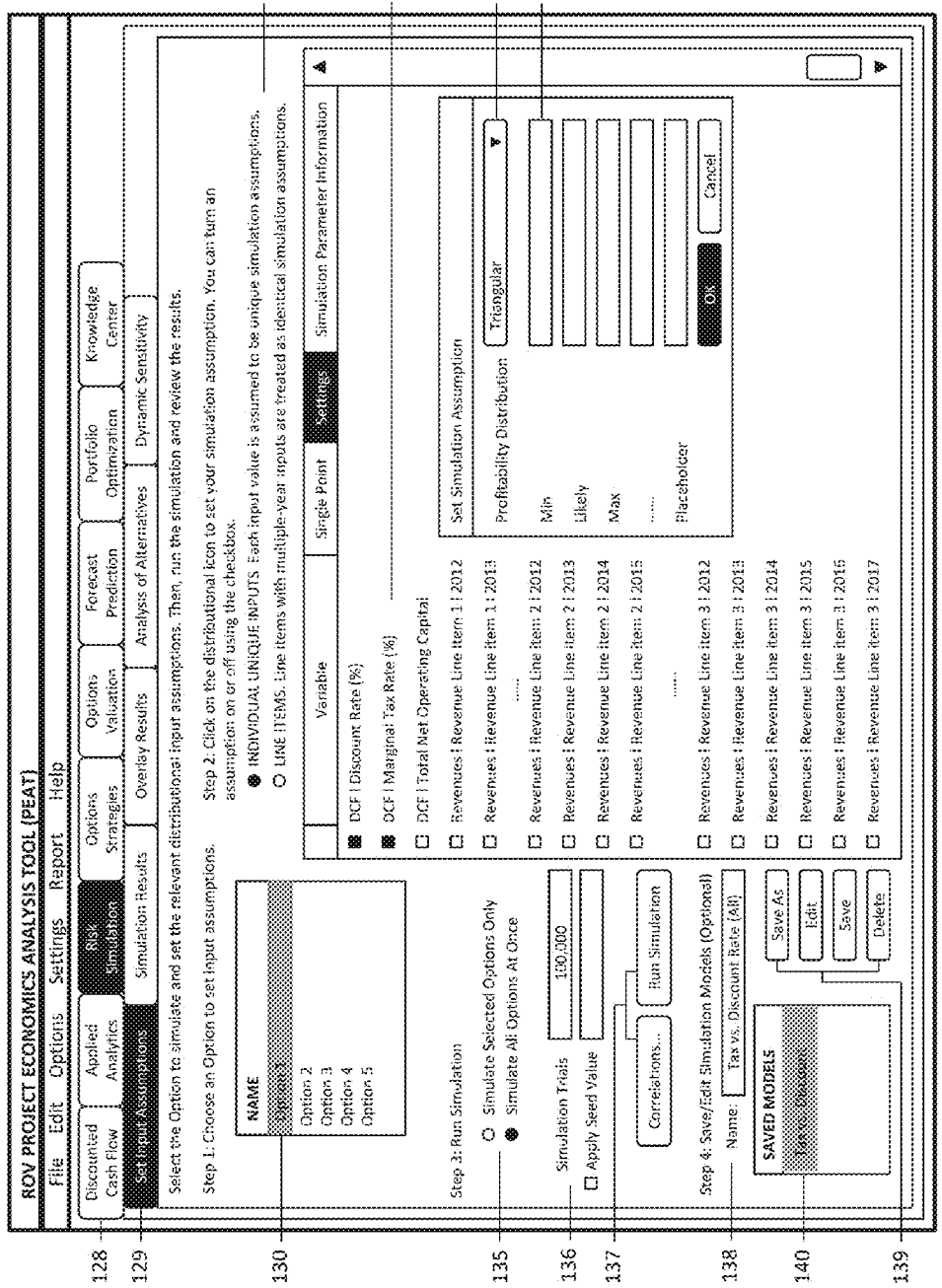
FIG. 19 illustrates the Risk Simulation tab for setting up Monte Carlo risk simulations.

In an exemplary embodiment according to the present invention, FIG. 19 illustrates the Risk Simulation 128 section, where Monte Carlo risk simulations can be set up and run. In a preferred embodiment, users can set up probability distribution assumptions on any combinations of inputs, run a risk simulation tens to hundreds of thousands of trials, and retrieve the simulated forecast outputs as charts, statistics, probabilities, and confidence intervals in order to develop comprehensive risk profiles of the Options. In the Set Input Assumptions 129 subtab, users start the simulation analysis by first setting simulation distributional inputs here (assumptions can be set to individual input assumptions in the model or as an entire line item 131). Users click on and choose one Option 130 at a time to list the available input assumptions. Users then click on the probability distribution icon under the Settings header for the relevant input assumption row 132, select the probability distribution 133 to use, and enter the relevant input parameters 134. Users continue setting as many simulation inputs as required (users can check/uncheck the inputs to simulate) 132. Users then enter the simulation trials to run (it is suggested to start with 1,000 as initial test runs and use 10,000 for the final run as a rule of thumb for most models) 136. Users can also Save As 139 the model (remembering to provide it a Name 138). Then they click on Run Simulation 137. Finally, in this tab, users can set simulation assumptions across multiple Options and Simulate All Options at Once 135, apply a Seed Value to replicate the exact simulation results each time it is run, apply pairwise Correlations 137 between simulation inputs, and Edit or Delete 139 a previously saved simulation model 140.

According to an embodiment of the present invention, although the software supports up to 50 probability distributions, in general, the most commonly used and applied distributions include Triangular, Normal, and Uniform 133. In a preferred embodiment, if the user has historical data available, he or she can use the Forecast Prediction (FIGS. 30-32) tab to perform a Distributional Fitting to determine the best-fitting distribution to use as well as to estimate the selected distribution's input parameters. Multiple simulation settings can be saved such that they can be retrieved, edited, and modified as required in the future. Users can select either Simulate All Options at Once or Simulate Selected Option Only, depending on whether they wish to run a risk simulation on all the Options that have predefined simulation assumptions or to run a simulation only on the current Option that is selected.

Figure 20:
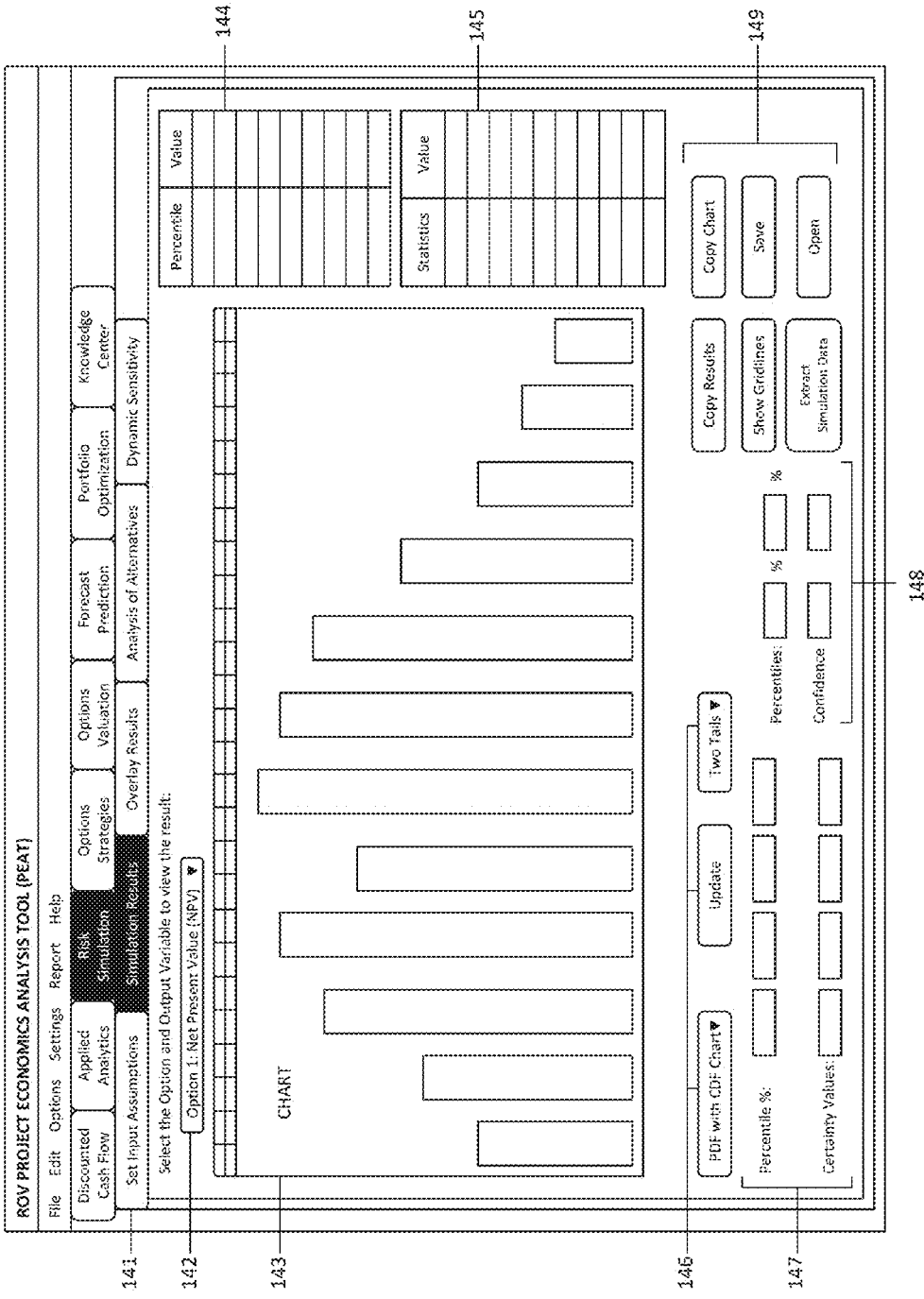
FIG. 20 illustrates the Risk Simulation results.

In an exemplary embodiment according to the present invention, FIG. 20 illustrates the Risk Simulation Results 141. After the simulation completes its run, the utility will automatically take the user to the Simulation Results tab. In a preferred embodiment, the first user selects the output variable 142 to display using the drop-down list. The simulation forecast chart 143 is shown on the left, while percentiles 144 and simulation statistics 145 are presented on the right. Users can change and update the chart type (e.g., PDF, CDF) 146, enter Percentiles (in %) or Certainty Values (in output units) 147 on the bottom left of the screen (remembering to click Update 146 when done) to show their vertical lines on the chart, or compute/show the Percentiles/Confidence levels 148 on the bottom right of the screen (selecting the type, Two Tail, Left Tail, Right Tail 146, then either entering the percentile values 148 to auto compute the confidence interval or entering the confidence 148 desired to obtain the relevant percentiles). Users can also Save 149 the simulated results and Open them at a later session, Copy Chart or Copy Results 149 to the clipboard for pasting into another software application, Extract Simulation Data to paste into Microsoft Excel for additional analysis, modify the chart using the chart icons, and so forth. The simulation forecast chart is highly flexible in the sense that users can modify its look and feel (e.g., color, chart type, background, gridlines, rotation, chart view, data labels, etc.) using the chart icons. Users can also Extract Simulation Data 149 when the risk simulation run is complete, and the extracted data can be used for additional analysis as required.

Figure 21:
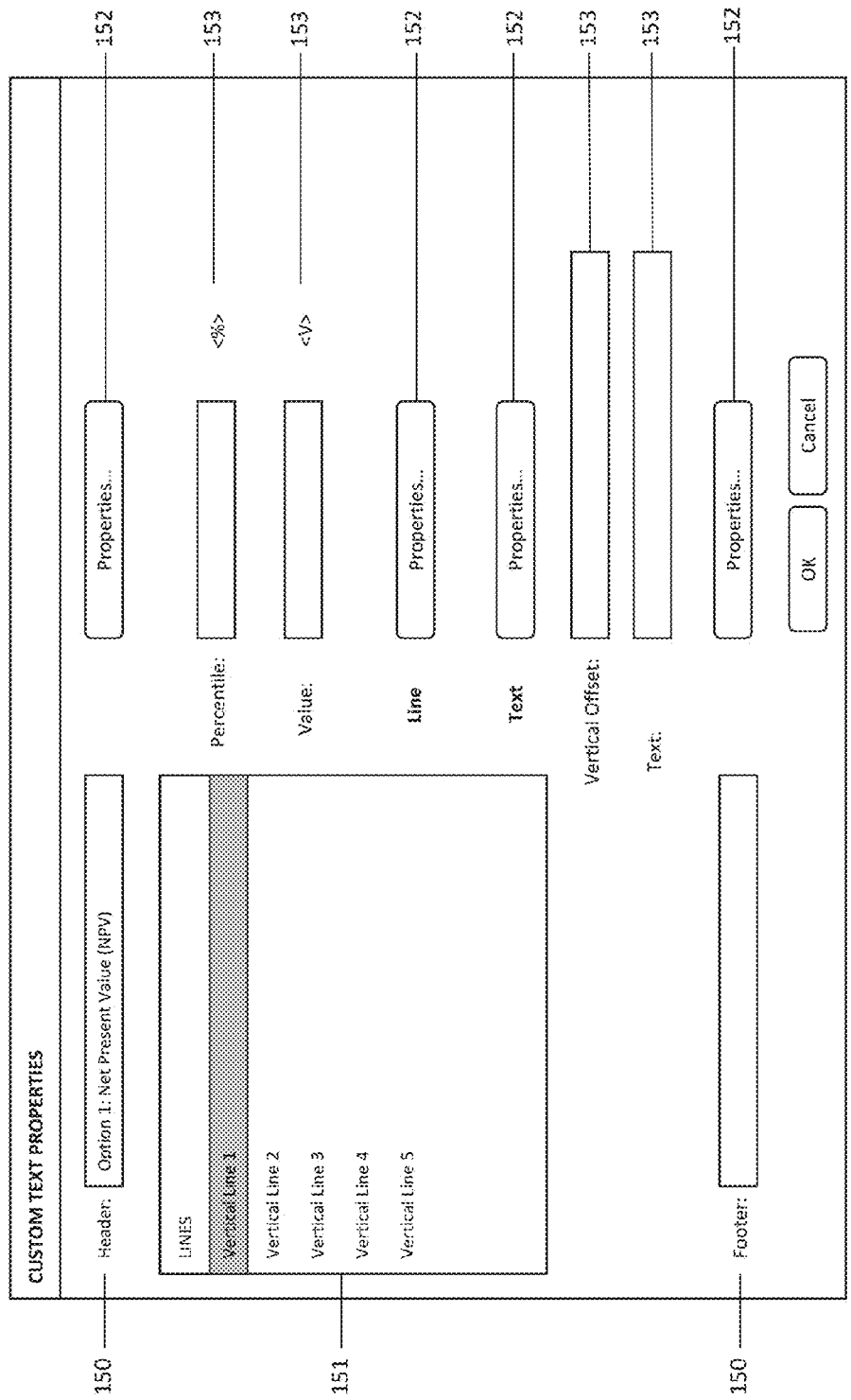
FIG. 21 illustrates the Custom Text properties.

In an exemplary embodiment according to the present invention, FIG. 21 illustrates the Custom Text Properties. To illustrate its functionality, if users entered either a Percentile or Certainty Value at the bottom left of the screen and clicked Update (FIG. 20), they can then click on Custom Text Properties in the chart icon (FIG. 20), select the Vertical Line 151, type in some custom texts 150, click on the Properties 152 button to change the font size/color/type, or use the icons to move the custom text's location. Users can also enter in custom percentile or numerical values 153 to show in the chart. As a side note, this Simulation Results forecast chart shows one output variable at a time, whereas the Overlay Results compares multiple simulated output forecasts at once.

Figure 22:
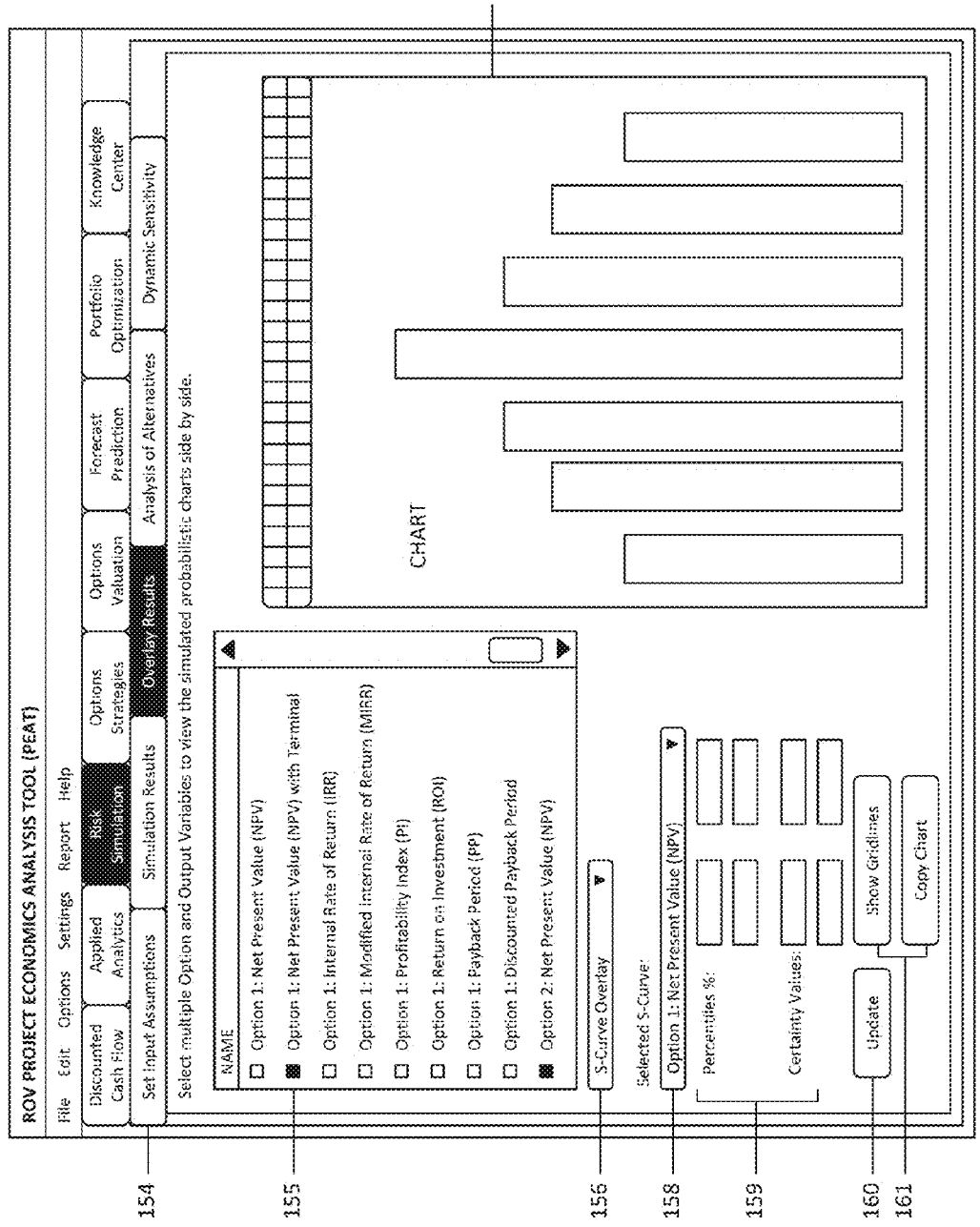
FIG. 22 illustrates the Overlay results.

In an exemplary embodiment according to the present invention, FIG. 22 illustrates the Overlay Results 154. Multiple simulation output variables 155 can be compared at once using the Overlay Results tab. Users simply check/uncheck the simulated outputs 155 they wish to compare and select the chart type to show (e.g., S-Curves, CDF, PDF) 156. Users can also add Percentile or Certainty lines 159 by first selecting the output chart 158, entering the relevant values 158, and clicking the Update 160 button. As usual, the generated charts are highly flexible in that users can modify the charts 157 using the included chart icons (as well as whether to show or hide gridlines 161) and the chart can be copied 161 into the Microsoft Windows clipboard for pasting into another software application. Typically, S-curves of CDF curves 156 are used in overlay analysis when comparing the risk profile of multiple simulated forecast results.

Figure 23:
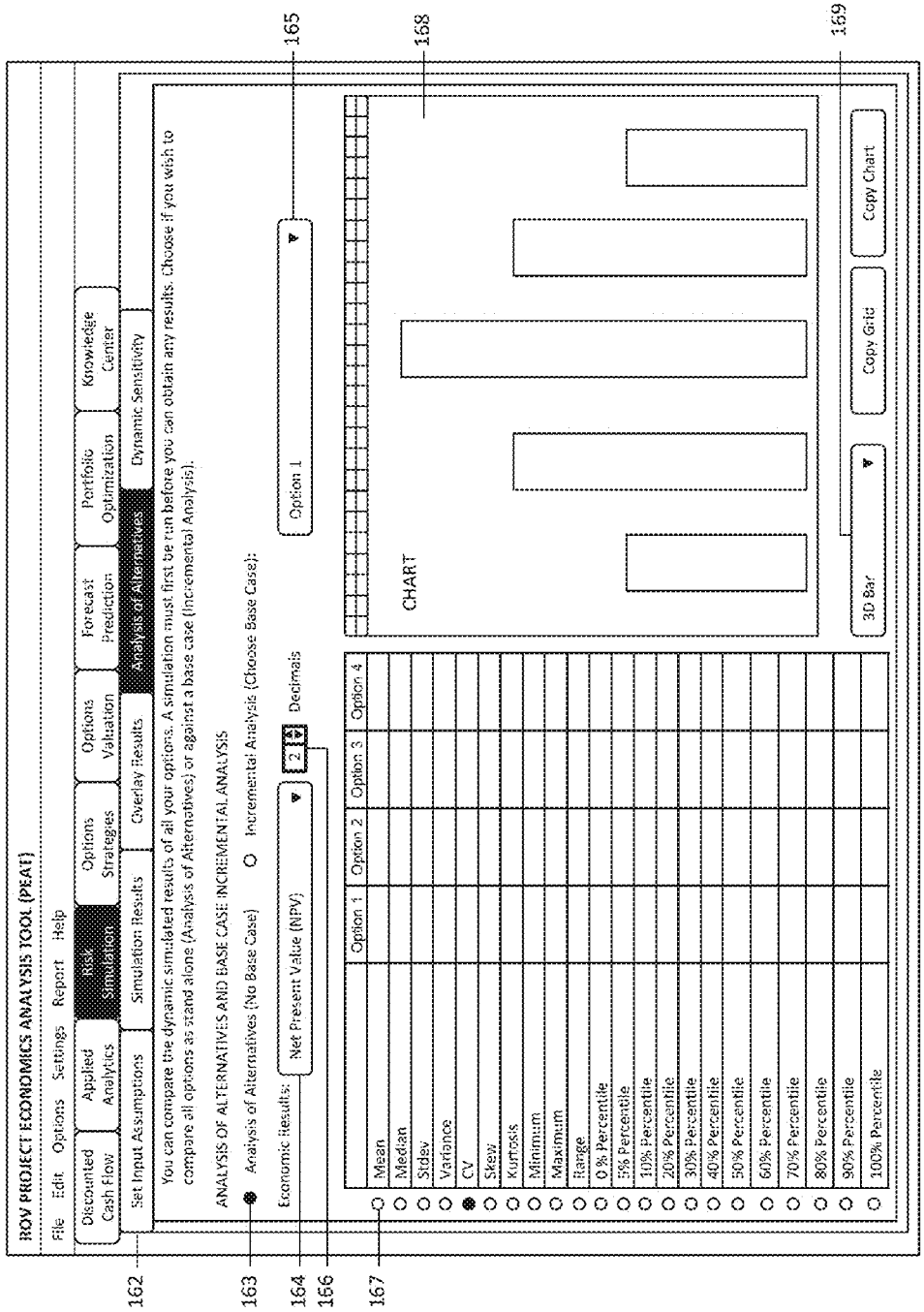
FIG. 23 illustrates the Analysis of Alternatives.

In an exemplary embodiment according to the present invention, FIG. 23 illustrates the Analysis of Alternatives 162. In a preferred embodiment, the Overlay Results show the simulated results as charts (PDF/CDF), the Analysis of Alternatives tab shows the results of the simulation statistics in a table format 167 as well as a chart 168 of the statistics such that one Option can be compared against another. The default is to run an Analysis of Alternatives to compare one Option versus another 163, but users can also choose the Incremental Analysis 163 option (remembering to choose the desired economic metric 164 to show, its precision in terms of decimals 166, the Base Case option 165 to compare the results to, and the chart display type 169).

Figure 24:
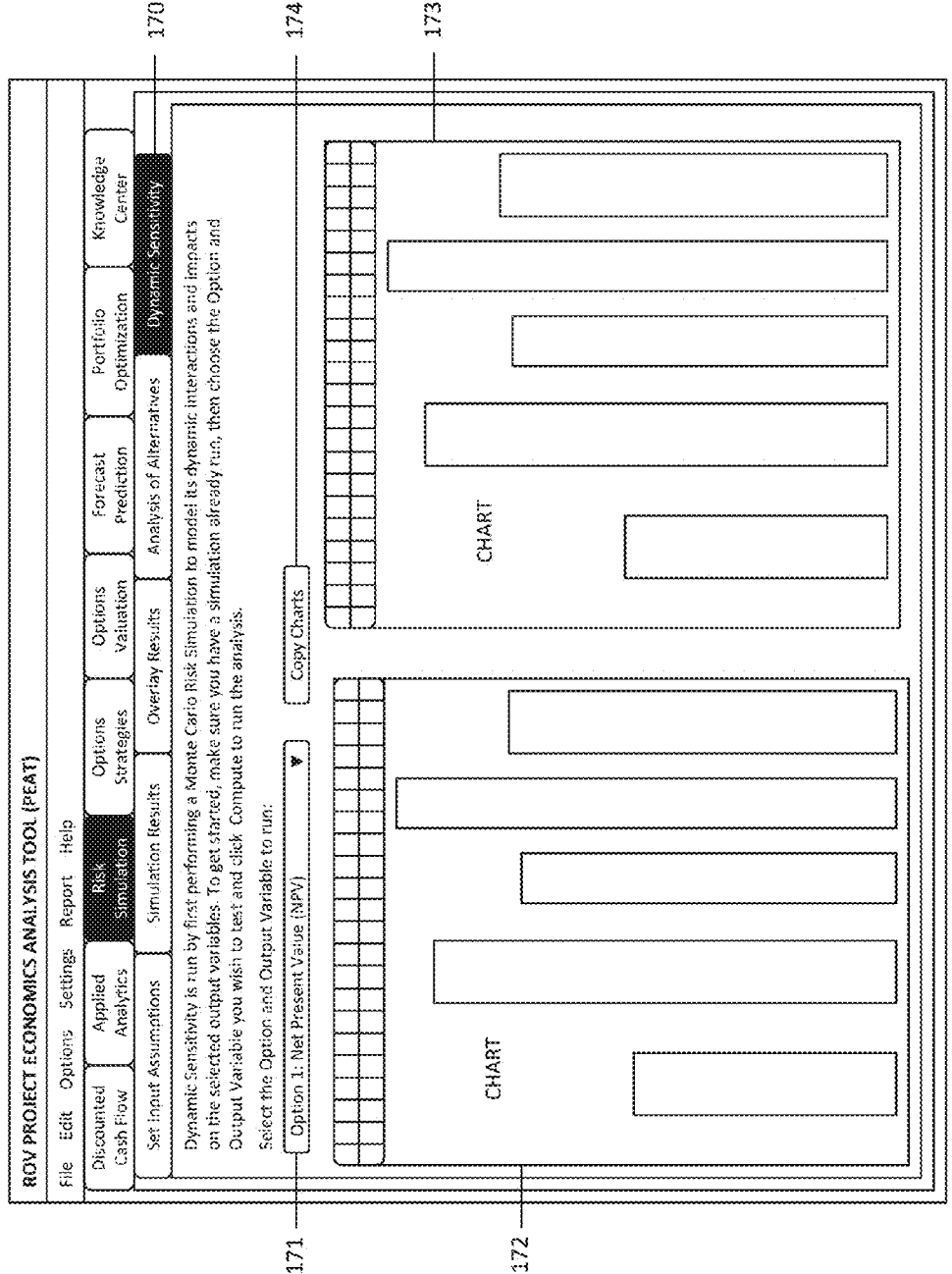
FIG. 24 illustrates the Dynamic Sensitivity Analysis computations.

In an exemplary embodiment according to the present invention, FIG. 24 illustrates the Dynamic Sensitivity Analysis 170 computations. Tornado analysis and Scenario analysis are both static calculations. Dynamic Sensitivity, in contrast, is a dynamic analysis, which can only be performed after a simulation is run. Users start by selecting the desired Option's economic output 171. Red bars on the Rank Correlation 172 chart indicate negative correlations and green bars indicate positive correlations for the left chart. The correlations' absolute values are used to rank the variables with the highest relationship to the lowest, for all simulation input assumptions. Contribution to Variance computations and chart 173 indicate the percentage fluctuation in the output variable that can be statistically explained by the fluctuations in each of the input variables. As usual, these charts can be copied and pasted into another software application 174.

Figure 25:
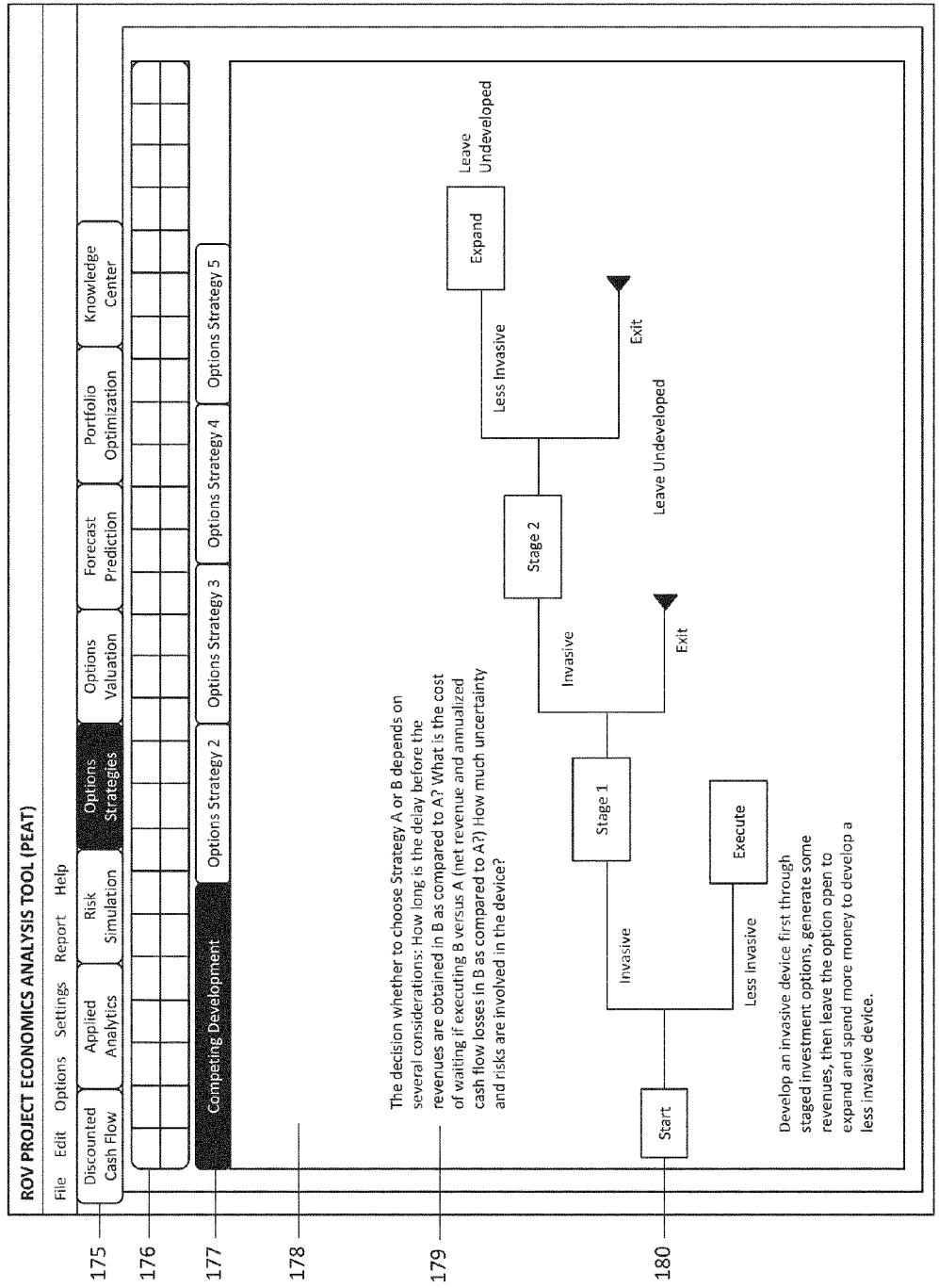
FIG. 25 illustrates the Options Strategies tab.

In an exemplary embodiment according to the present invention, FIG. 25 illustrates the Options Strategies 175 tab. In a preferred embodiment, Options Strategies is where users can draw their own custom strategic maps 177 and each map can have multiple strategic real options paths 180. This section allows users to draw and visualize these strategic pathways and does not perform any computations. (The next section, Options Valuation, actually performs the computations.) Users can explore this section's capabilities, but viewing the Video on Options Strategies to quickly get started on using this very powerful tool is recommended. Users can also explore some preset options strategies by clicking on the first icon and selecting any one of the Examples 176.

Below are details on this Options Strategies tab:

Users can Insert Option nodes or Insert Terminal nodes by first selecting any existing node and then clicking on the option node icon (square) or terminal node icon (triangle) 180.

Users can modify individual Option Node or Terminal Node properties by double-clicking on a node. Sometimes when users click on a node, all subsequent child nodes are also selected (this allows users to move the entire tree starting from that selected node). If users wish to select only that node, they may have to click on the empty background and click back on that node to select it individually. Also, users can move individual nodes or the entire tree started from the selected node depending on the current setting (right-click, or in the Edit menu, select Move Nodes Individually or Move Nodes Together).

The following are some quick descriptions of the things that can be customized and configured in the node properties user interface. It is simplest for the user to try different settings for each of the following to see its effects in the Strategy Tree:

Name. Name shown above the node.
Value. Value shown below the node.
Excel Link. Links the value from an Excel spreadsheet's cell.
Notes. Notes can be inserted above or below a node.
Show in Model. Show any combinations of Name, Value, and Notes.
Local Color versus Global Color. Node colors can be changed locally to a node or globally.
Label Inside Shape. Text can be placed inside the node (users may need to make the node wider to accommodate longer text).
Branch Event Name. Text can be placed on the branch leading to the node to indicate the event leading to this node.
Select Real Options. A specific real option type can be assigned to the current node. Assigning real options to nodes allows the tool to generate a list of required input variables.

Global Elements are all customizable, including elements of the Strategy Tree's Background, Connection Lines, Option Nodes, Terminal Nodes, and Text Boxes. For instance, the following settings can be changed for each of the elements:

Font settings on Name, Value, Notes, Label, Event names.
Node Size (minimum and maximum height and width).
Borders (line styles, width, and color).
Shadow (colors and whether to apply a shadow or not).
Global Color.
Global Shape.

Example Files are available in the first icon menu to help users get started on building
Strategy Trees.
Protect File from the first icon menu allows the Strategy Tree and the entire PEAT model to be encrypted with up to a 256-bit password encryption. Care must be taken when a file is being encrypted because if the password is lost, the file can no longer be opened.
Capturing the Screen or printing the existing model can be done through the first icon menu. The captured screen can then be pasted into other software applications.
Add, Duplicate, Rename, and Delete a Strategy Tree can be performed through right-clicking the Strategy Tree tab or the Edit menu 176, 177.
Users can also Insert File Link and Insert Comment on any option or terminal node, or Insert Text 179 or Insert Picture anywhere in the background or canvas area 178.
Users can Change Existing Styles or Manage and Create Custom Styles of their Strategy Tree (this includes size, shape, color schemes, and font size/color specifications of the entire Strategy Tree).

Figure 26:
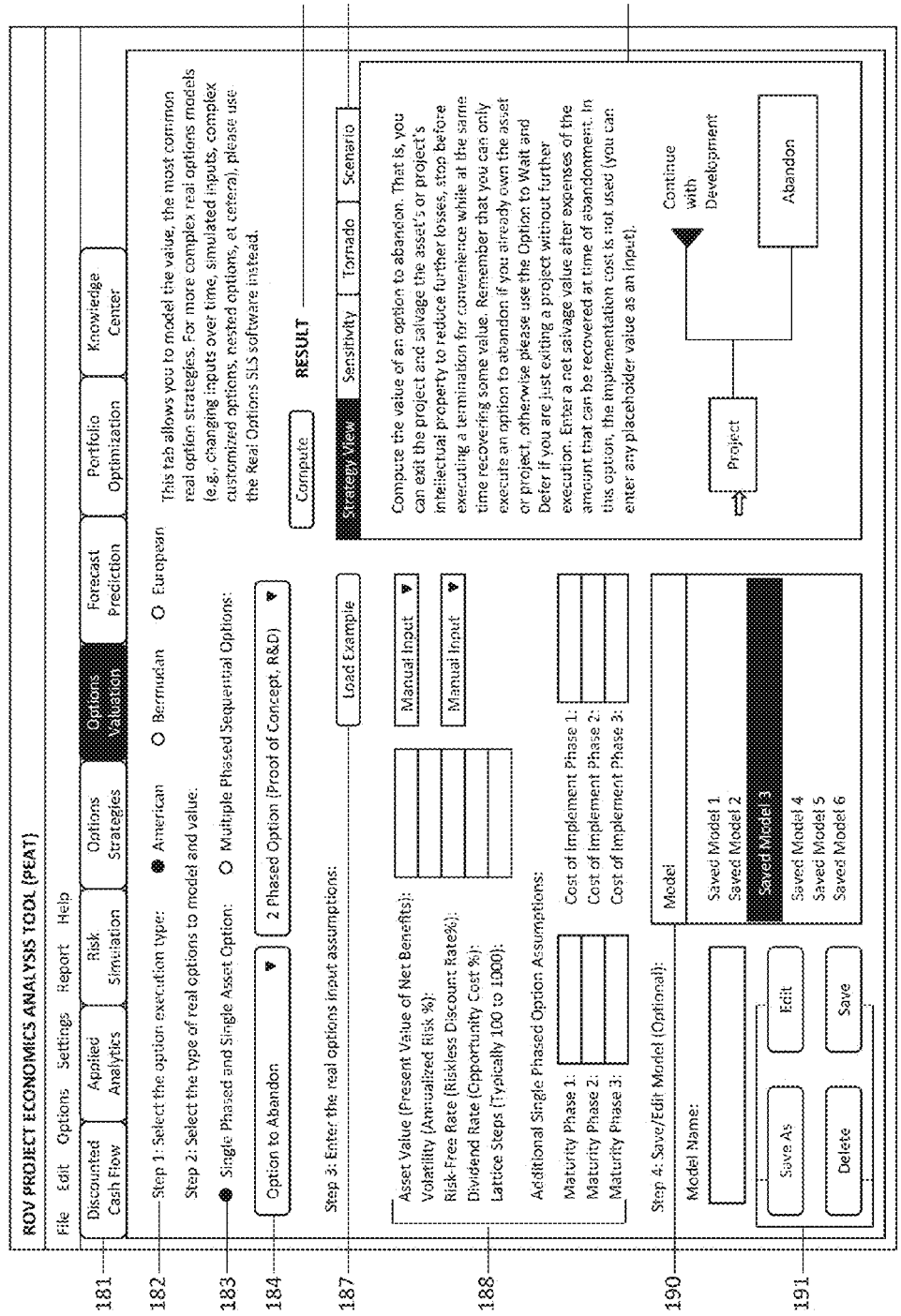
FIG. 26 illustrates the Options Valuation tab's inputs and settings.

In an exemplary embodiment according to the present invention, FIG. 26 illustrates the Options Valuation 181 tab and the Strategy View 185. This Options Valuation section performs the calculations of Real Options Valuation models. Users must understand the basic concepts of real options before proceeding. In a preferred embodiment, the user starts by choosing the option execution type 182 (e.g., American, Bermudan, or European), selecting an option to model 183 (e.g., single phased and single asset or multiple phased sequential options), and, based on the option types 184 selected, entering the required inputs 188 and clicking Compute to obtain the results 189. Users can also click on the Load Example 187 to load preset input assumptions based on the selected option type 183 and option model 184. Some basic information and a sample strategic path are shown on the right under Strategy View 186. Also, a Tornado analysis and Scenario analysis 185 can be performed on the option model and users can Save As (as well as Delete or Edit existing saved models) 191 the options models for future retrieval from the list of saved models 190.

Figure 27:
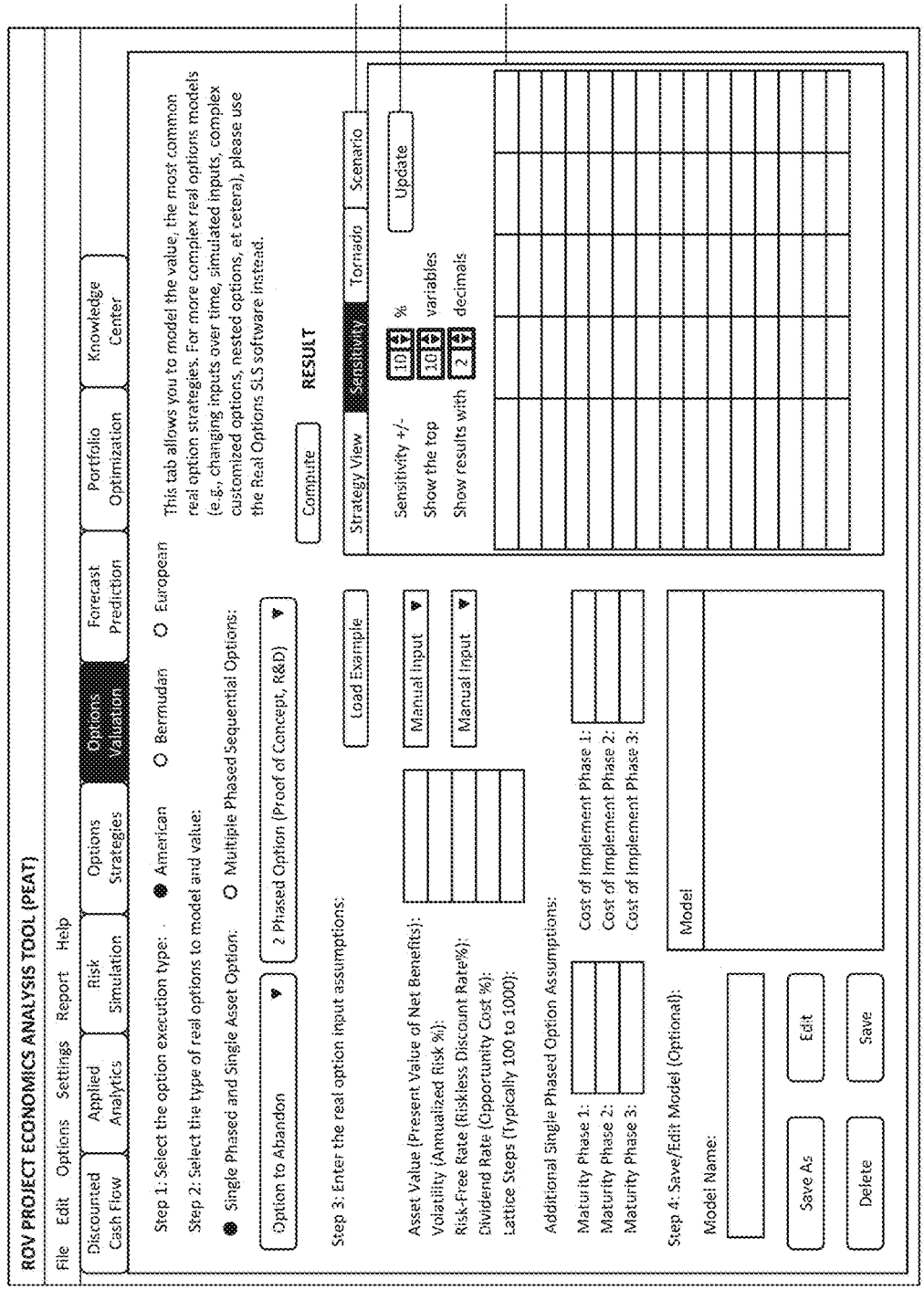
FIG. 27 illustrates the Options Valuation tab's Sensitivity analysis subtab.

In an exemplary embodiment according to the present invention, FIG. 27 illustrates the Options Valuation tab and its Sensitivity analysis 192 subtab. In a preferred embodiment, this tab runs a static sensitivity table 194 of the real options model based on updated user inputs and settings 193.

Figure 28:
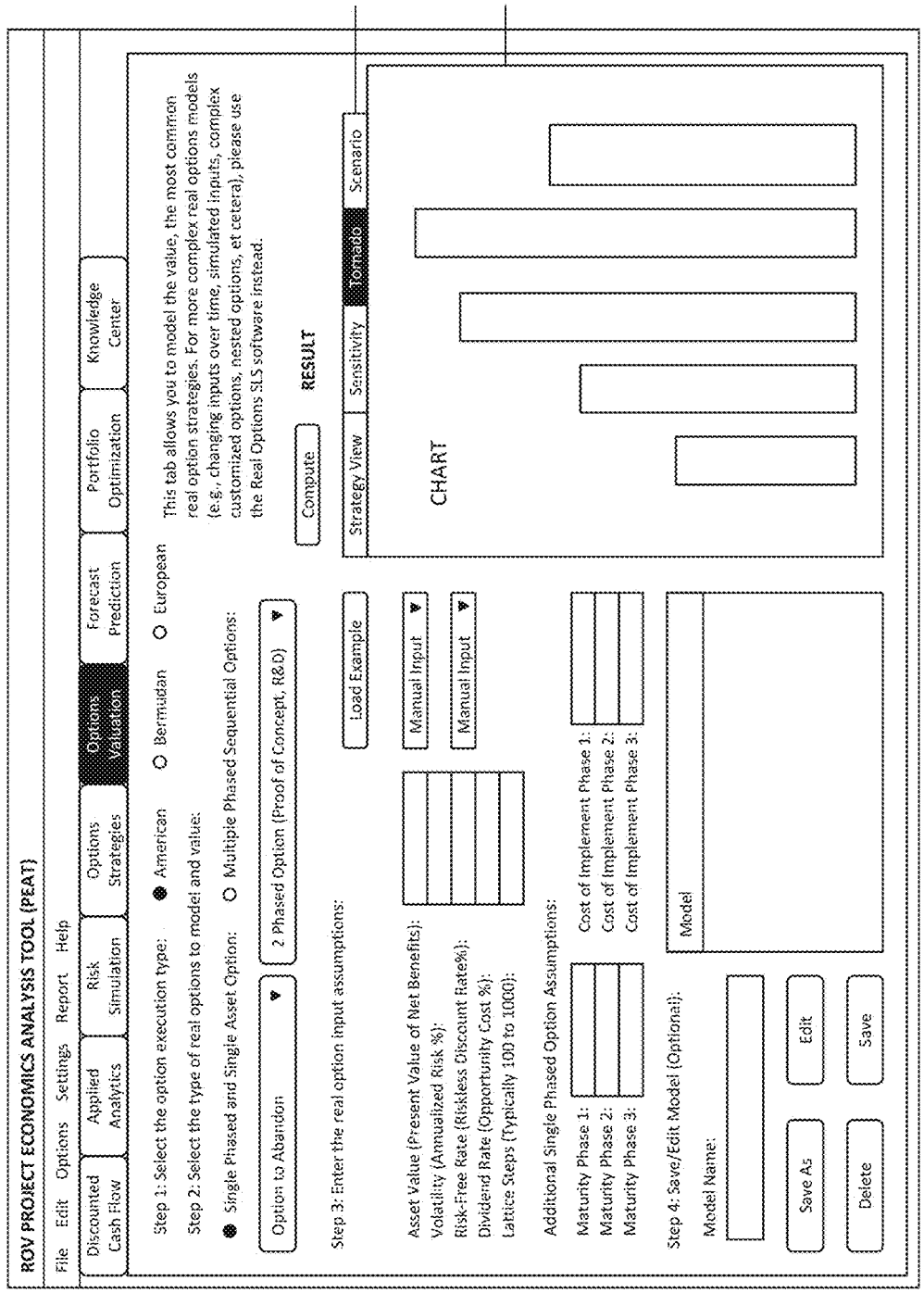
FIG. 28 illustrates the Options Valuation tab's Tornado analysis subtab.

In an exemplary embodiment according to the present invention, FIG. 28 illustrates the Options Valuation tab and its Tornado 195 analysis subtab. In a preferred embodiment, this tab develops the Tornado chart 196 of the real options model. The interpretation of this Tornado chart is identical to those previously described.

Figure 29:
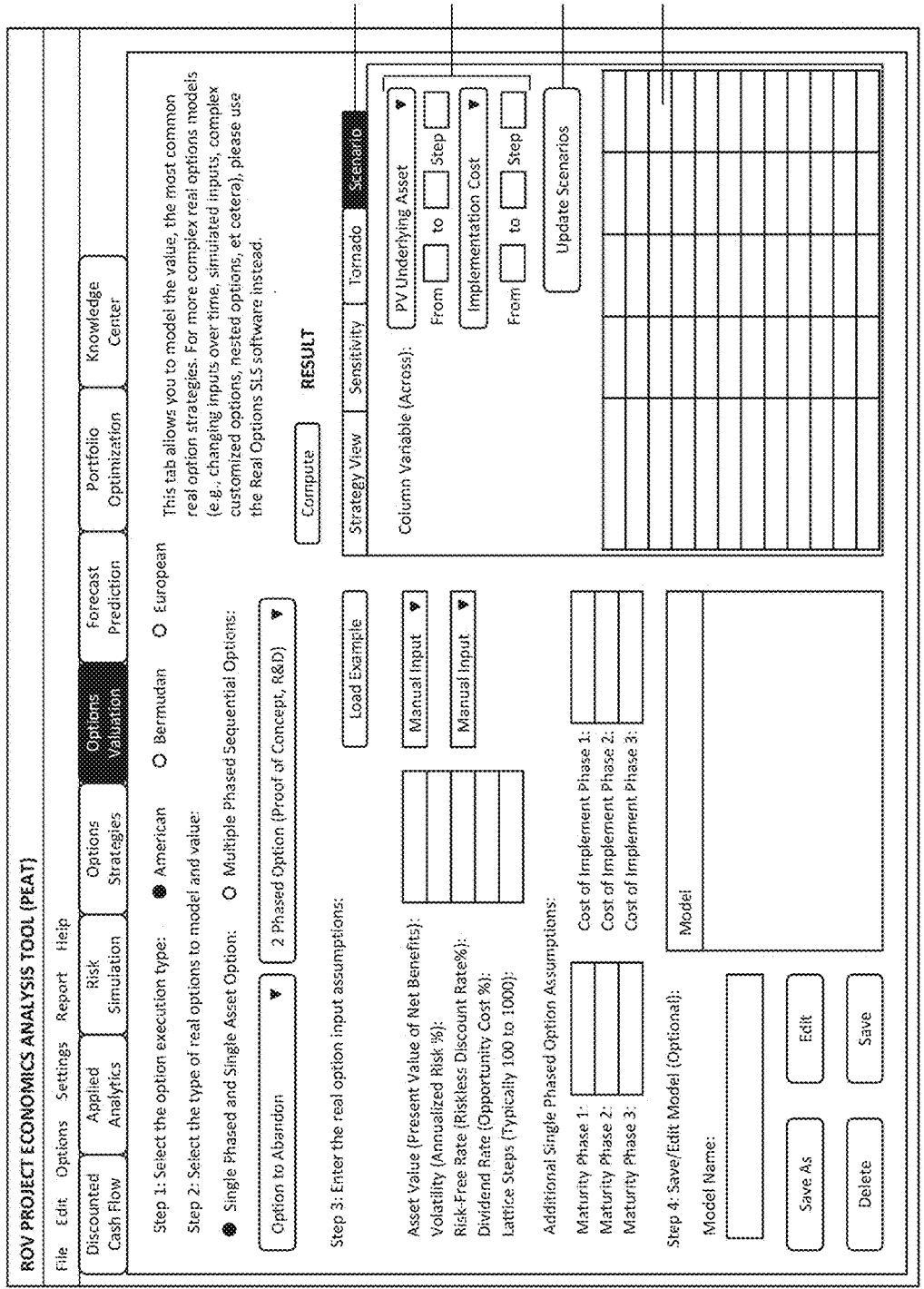
FIG. 29 illustrates the Options Valuation tab's Scenario analysis subtab.

In an exemplary embodiment according to the present invention, FIG. 29 illustrates the Options Valuation tab and its Scenario 197 analysis subtab. In a preferred embodiment, this tab runs a scenario table 200 of the real options model based on updated 199 user settings (input variables to analyze as well as the range and amount to perturb) 198.

Figure 30:
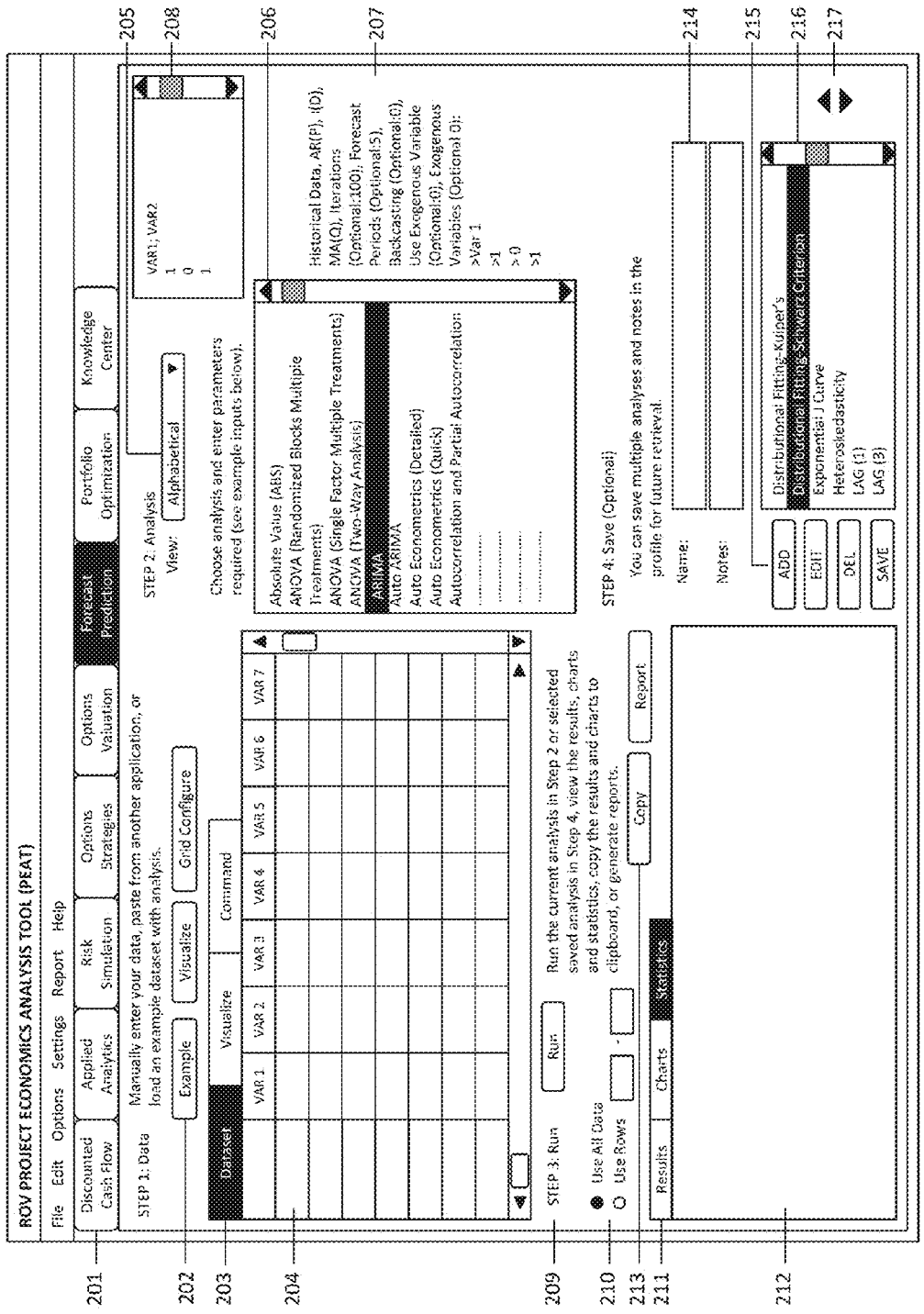
FIG. 30 illustrates the Forecast Prediction's Main Dataset and Statistics tabs.

In an exemplary embodiment according to the present invention, FIG. 30 illustrates the Forecast Prediction 201 module. This section on Forecast Prediction is a sophisticated Business Analytics and Business Statistics module with over 150 functionalities. In a preferred embodiment, the user starts by entering the data in Step 1's data grid 203 (user can copy and paste from Microsoft Excel or other ODBC-compliant data source, manually type in data 204, or click on the Example 202 button to load a sample dataset complete with previously saved models) 202. The user then chooses the analysis to perform in Step 2 205, 206 and, using the variables list provided 207, enters the desired variables to model 208 given the chosen analysis (if users previously clicked Example, users can double-click to use and run the saved models in Step 4 to see how variables are entered in Step 2, and use that as an example for their analysis). The user then clicks Run 209 in Step 3 when ready to obtain the Results, Charts, and Statistics 211 of the analysis 212 that can be copied 213 and pasted to another software application. Users can alternatively Save or Edit/Delete 215 their models in Step 4 by giving them a name 214 for future retrieval from a list of saved models 216, which can be sorted or rearranged accordingly 217. Users may also explore the power of this Forecast Prediction module by loading the preset Example, or they can watch the Getting Started Videos (FIG. 41) to quickly get started using the module and review the user manual for more details on the 150 analytical methods. The following steps are illustrative of the Forecast Prediction procedures:

- Users start at the Forecast Prediction 201 tab and click on Example 202 to load a sample data and model profile or type in their data or copy/paste from another software application such as Microsoft Excel or Microsoft Word/text file into the data grid 204 in Step 1. Users can add their own notes or variable names in the first Notes row.
- Users then select the relevant model to run in Step 2 and using the example data input settings 207, enter in the relevant variables 208. Users must separate variables for the same parameter using semicolons and use a new line (hit Enter to create a new line) for different parameters.
- Clicking Run 209 will compute the results. Users can view any relevant analytical results, charts, or statistics from the various tabs in Step 3.
- If required, users can provide a model name 214 to save 215 into the profile in Step 4. Multiple models can be saved in the same profile. Existing models 216 can be edited or deleted and rearranged in order of appearance, and all the changes can be saved.
- The data grid size can be set in the Grid Configure button 202, where the grid can accommodate up to 1,000 variable columns with 1 million rows of data per variable. The pop-up menu also allows users to change the language and decimal settings for their data.
- In getting started, it is always a good idea to load the example 202 file that comes complete with some data and precreated models. Users can double-click on any of these models to run them, and the results are shown in the report area, which sometimes can be a chart or model statistics. Using this example file, users can now see how the input parameters are entered 208 based on the model description, and users can proceed to create their own custom models.
- Users can click on the variable headers to select one or multiple variables at once, and then right-click to add, delete, copy, paste, or visualize the variables selected.
- Users can click on the data grid's column header(s) to select the entire column(s) or variable(s), and once selected, users can right-click on the header to Auto Fit the column, or to Cut, Copy, Delete, or Paste data. Users can also click on and select multiple column headers to select multiple variables and right-click and select Visualize to chart the data.
- If a cell has a large value that is not completely displayed, the user can click on and hover the mouse over that cell to see a pop-up comment showing the entire value, or simply resize the variable column (drag the column to make it wider, double-click on the column's edge to auto fit the column, or right-click on the column header and select Auto Fit).
- Users can use the up, down, left, and right keys to move around the grid, or use the Home and End keys on the keyboard to move to the far left and far right of a row. Users can also use combination keys such as Ctrl+Home to jump to the top left cell, Ctrl+End to the bottom right cell, Shift+Up/Down to select a specific area, and so forth.
- Users can enter short, simple notes for each variable on the Notes row.
- Users can try out the various chart icons on the Visualize 203 tab to change the look and feel of the charts (e.g., rotate, shift, zoom, change colors, add legend, etc.).
- The Copy 213 button is used to copy the Results, Charts, and Statistics 211 tabs in Step 3 after a model is run. If no models are run, then the Copy function will only copy a blank page.
- The Report 213 button will only run if there are saved models in Step 4 or if there are data in the grid; otherwise the report generated will be empty. Users will also need Microsoft Excel to be installed to run the data extraction and results reports, and have Microsoft PowerPoint available to run the chart reports.
- When in doubt about how to run a specific model or statistical method, the user should start the Example 202 profile and review how the data are set up in Step 1 or how the input parameters are entered in Step 2. Users can use these examples as getting started guides and templates for their own data and models.
- Users can click the Example 202 button to load a sample set of previously saved data and models. Then double-click on one of the Saved Models 216 in Step 4. Users can see the saved model that is selected and the input variables 208 used in Step 2. The results will be computed and shown in the Step 3 results 211 area, and users can view the Results, Charts, or Statistics 212 depending on what is available based on the model users chose and ran.
- The Grid Configure 202 button allows users to change the number of rows or columns of the data grid in Step 1.
- Users must click Report 213 only they truly mean it! That is, this function will run all of the saved models in Step 4 and extract the results to Microsoft Excel, Word, and PowerPoint.
- Users can select a variable in the data grid by clicking on the header(s). For instance, users can click on VAR1 and it will select the entire variable.
- Users can edit this XML file directly, save it, and when it opens in the Forecast Prediction module, the changes users made would be available.

Figure 31:
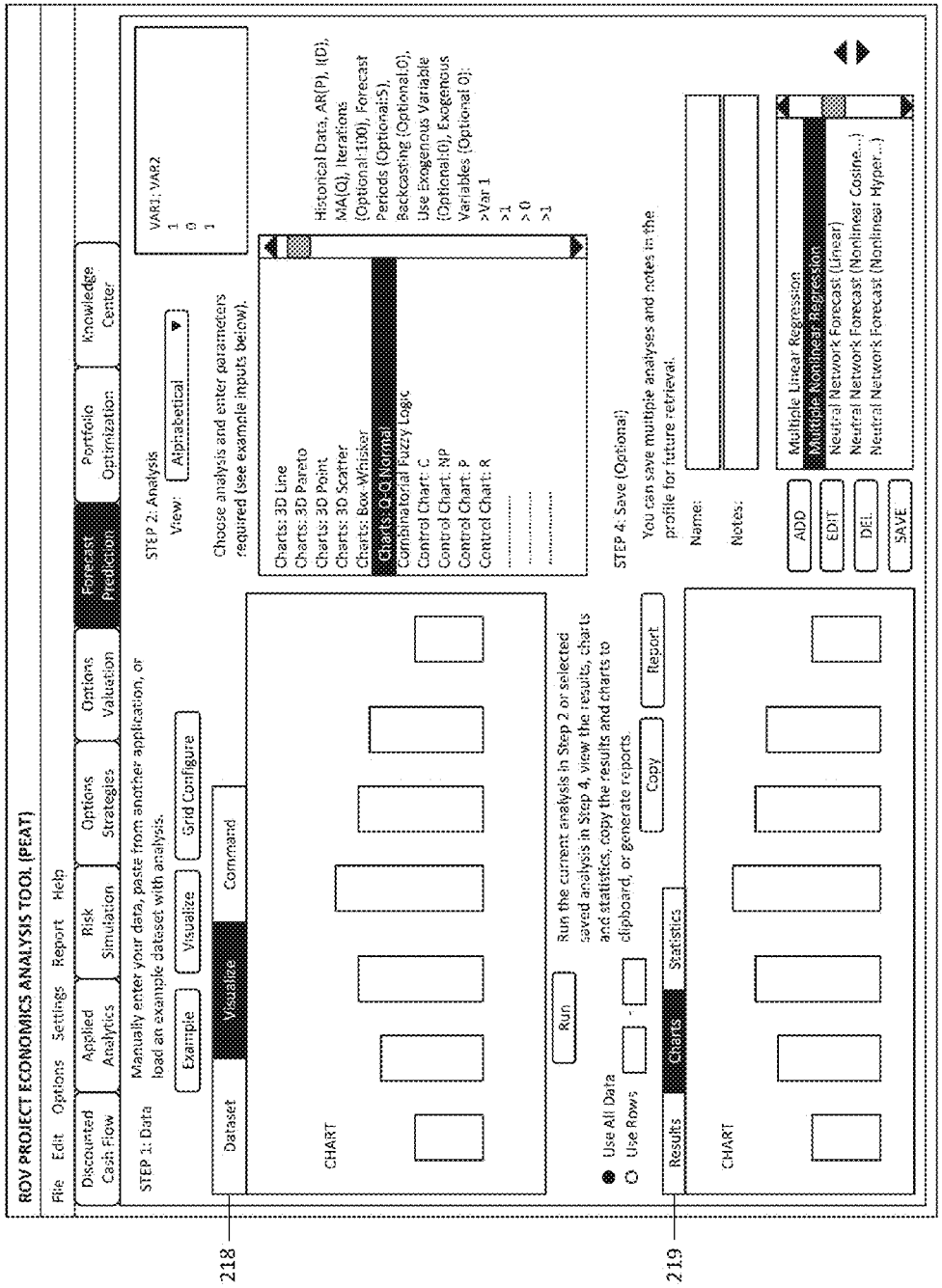
FIG. 31 illustrates the Forecast Prediction's Visualize and Charts subtabs.

In an exemplary embodiment according to the present invention, FIG. 31 illustrates the Forecast Prediction's Visualize 218 and Charts 219 subtabs. Depending on the model run, sometimes the results will return a chart (e.g., a stochastic process forecast was created and the results are presented both in the Results subtab and the Charts 219 subtab). In a preferred embodiment, the charts subtab has multiple chart icons users can use to change the appearance of the chart (e.g., modify the chart type, chart line colors, chart view, etc.). Also, when a variable is selected, users can click on the Visualize button or right-click and select Visualize 218, and the data will be collapsed into a time-series chart.

Figure 32:
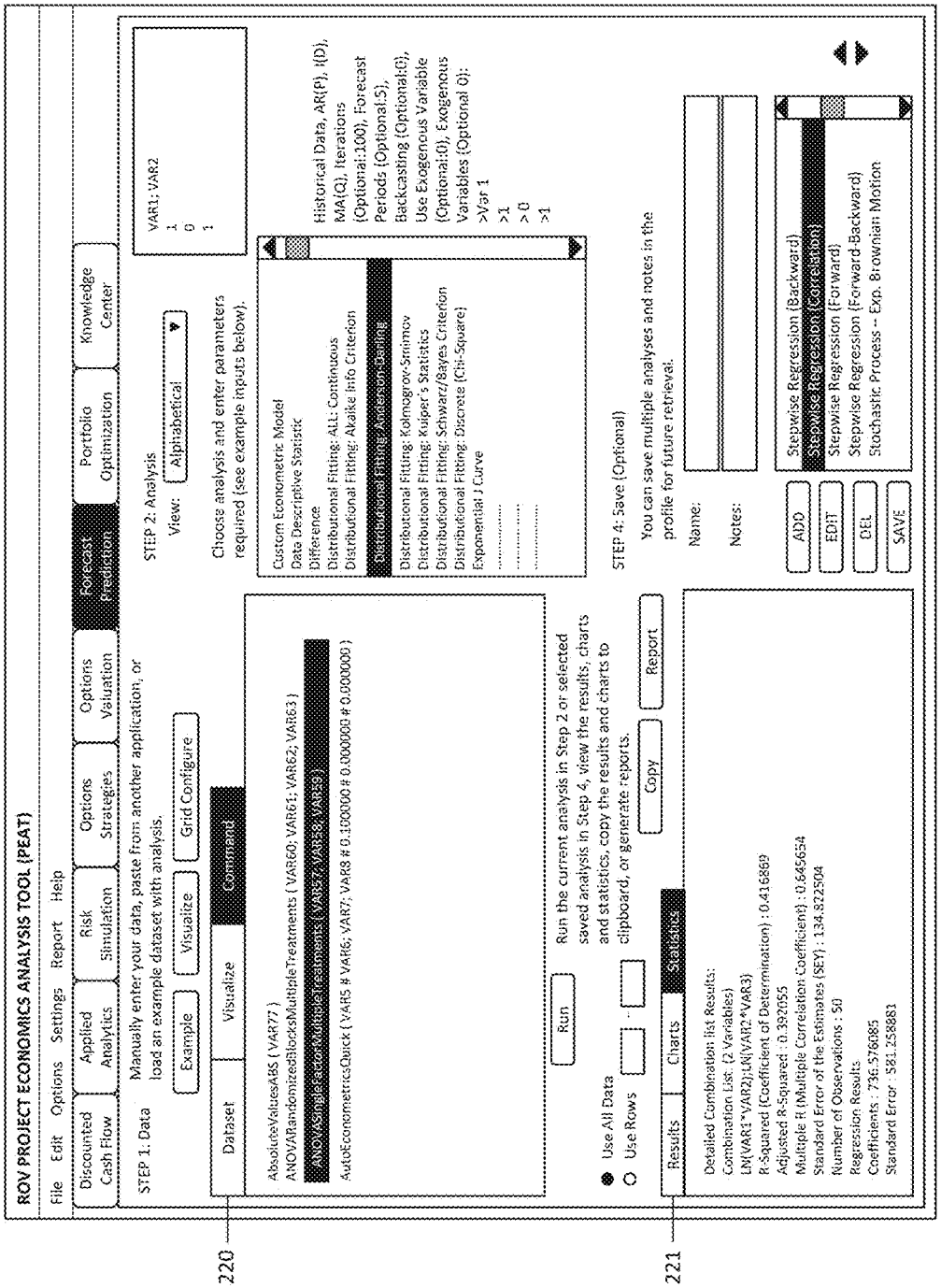
FIG. 32 illustrates the Forecast Prediction's Command Console.

In an exemplary embodiment according to the present invention, FIG. 32 illustrates the Forecast Prediction's Command Console 220. Users can also quickly run multiple models using direct commands in the Command Console. It is recommended that new users set up the models using the user interface, starting from Step 1 through to Step 4. In a preferred embodiment, to start using the console, users create the models they need, then click on the Command subtab, copy/edit/replicate the command syntax (e.g., users can replicate a model multiple times and change some of its input parameters very quickly using the command approach), and when ready, click on the Run Command button. Alternatively, models can also be entered using a Command console. To see how this works, users can double-click to run a model and go to the Command console. Users can replicate the model or create their own and click Run Command when ready. Each line in the console represents a model and its relevant parameters. The figure also shows a sample set of results in the Statistics 221 subtab.

Figure 33:
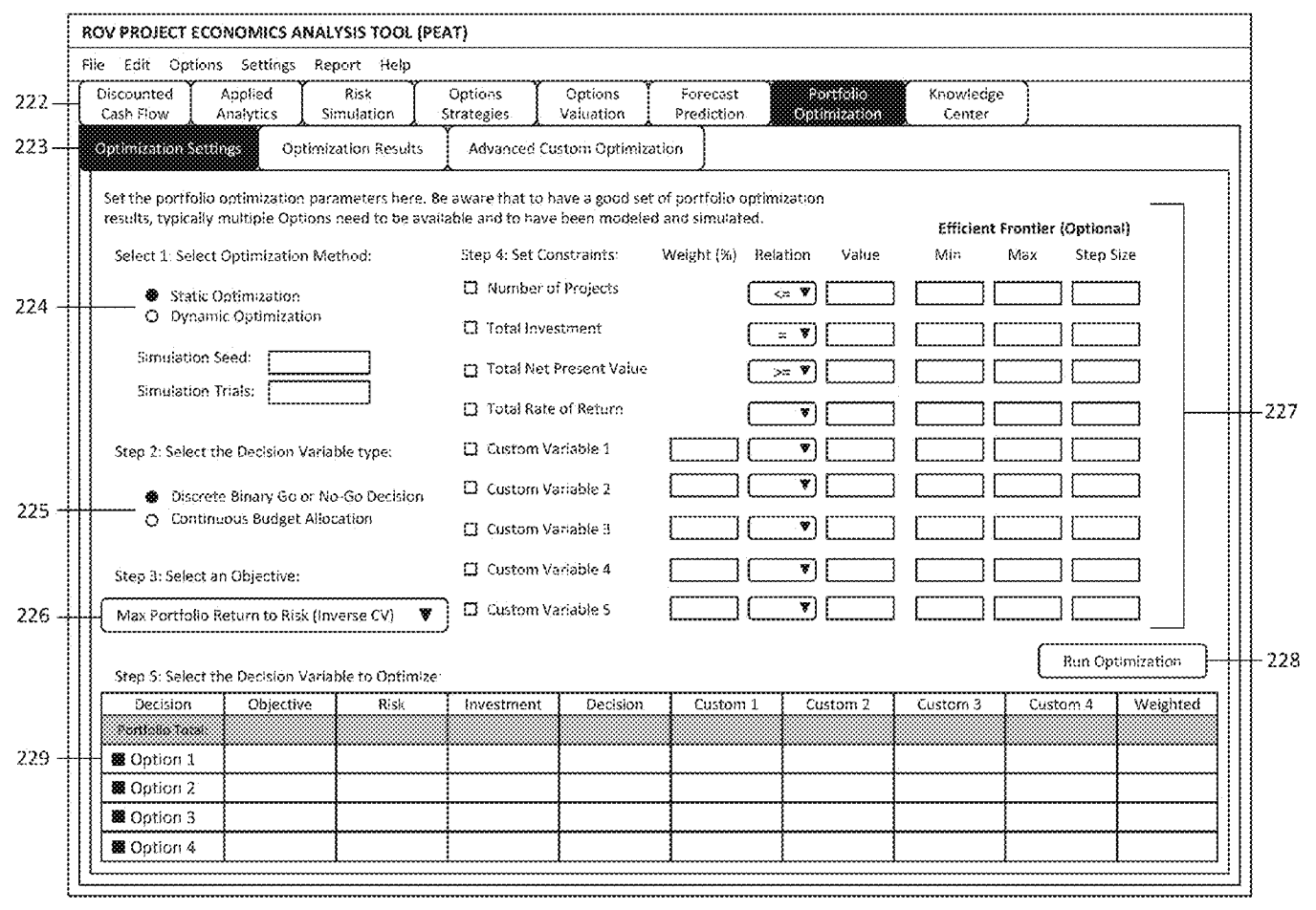

In an exemplary embodiment according to the present invention, FIG. 33 illustrates the Portfolio Optimization's 222 Optimization Settings 223 tab. In the Portfolio Optimization section, the individual Options can be modeled as a portfolio and optimized to determine the best combination of projects for the portfolio. In today's competitive global economy, companies are faced with many difficult decisions. These decisions include allocating financial resources, building or expanding facilities, managing inventories, and determining product-mix strategies. Such decisions might involve thousands or millions of potential alternatives. Considering and evaluating each of them would be impractical or even impossible. A model can provide valuable assistance in incorporating relevant variables when analyzing decisions and in finding the best solutions for making decisions. Models capture the most important features of a problem and present them in a form that is easy to interpret. Models often provide insights that intuition alone cannot. An optimization model has three major elements: decision variables, constraints, and an objective. In short, the optimization methodology finds the best combination or permutation of decision variables (e.g., which products to sell or which projects to execute) in every conceivable way such that the objective is maximized (e.g., revenues and net income) or minimized (e.g., risk and costs) while still satisfying the constraints (e.g., budget and resources).

According to an embodiment of the present invention, the Options can be modeled as a portfolio and optimized to determine the best combination of projects for the portfolio in the Optimization Settings tab. In a preferred embodiment, Users start by selecting the optimization method (Static or Dynamic Optimization) 224. Then the user selects the decision variable type of Discrete Binary (choose which Options to execute with a Go/No-Go Binary 1/0 decision) or Continuous Budget Allocation 225 (returns % of budget to allocate to each Option as long as the total portfolio is 100%); select the Objective 226 (e.g., Max NPV, Min Risk, etc.); set up any Constraints 227 (e.g., budget restrictions, number of projects restrictions, or create customized restrictions); select the Options to optimize/allocate/choose 229 (default selection is all Options); and when completed, click Run Optimization 228. The software will then take users to the Optimization Results 223 tab.

Figure 34:
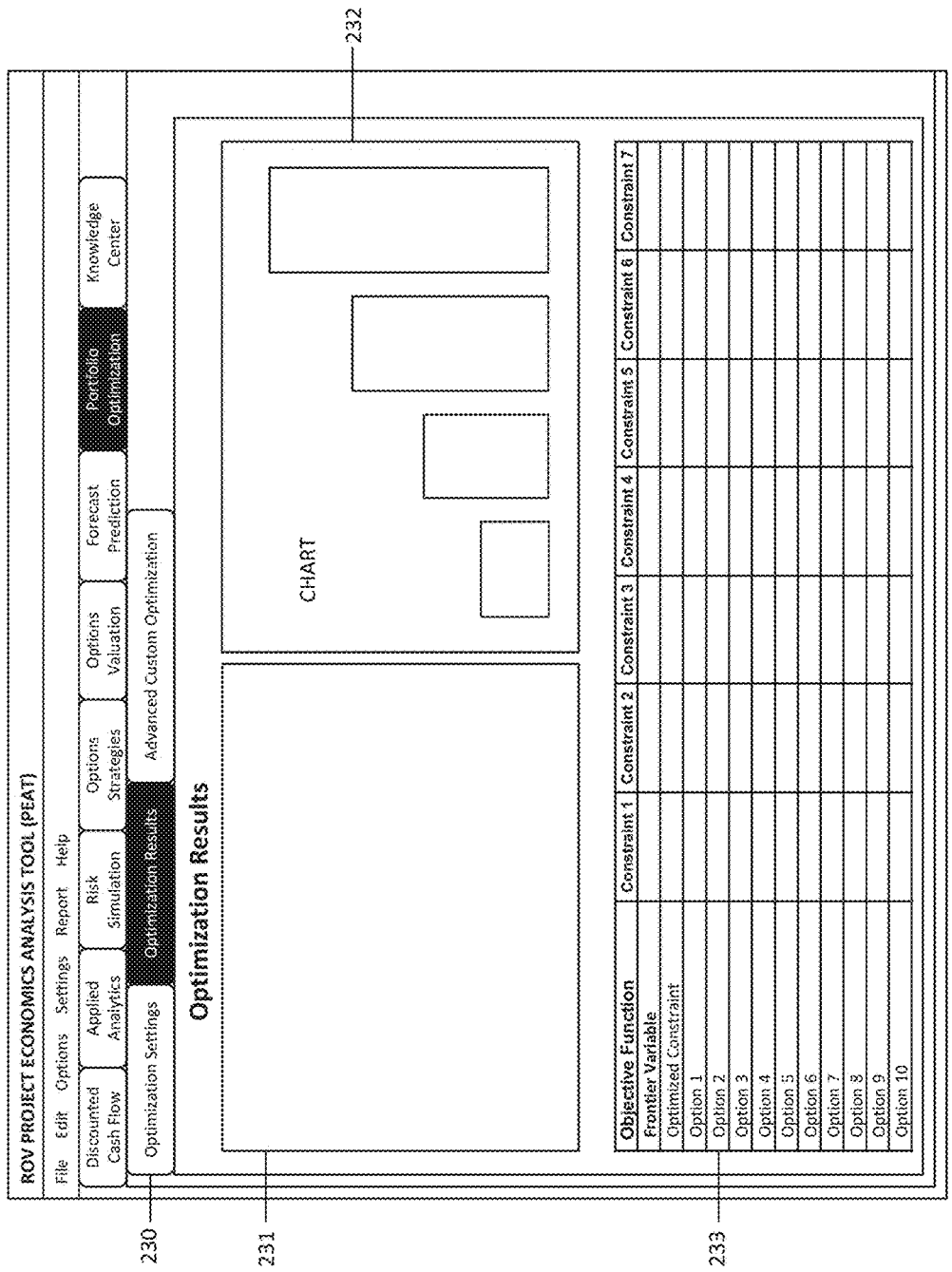
FIG. 34 illustrates the Optimization Results tab.

In an exemplary embodiment according to the present invention, FIG. 34 illustrates the Optimization Results 230 tab, which returns the results from the portfolio optimization analysis. In a preferred embodiment, the main results are provided in the data grid 233, showing the final Objective Function results, final Optimized Constraints, and the allocation, selection, or optimization across all individual Options within this optimized portfolio. The top left portion of the screen shows the textual details and results 231 of the optimization algorithms applied, and the chart 232 illustrates the final objective function (the chart will only show a single point for regular optimizations, whereas it will return an investment efficient frontier curve if the optional Efficient Frontier settings are set [min, max, step size] in the Optimization Settings tab).

Figure 35:
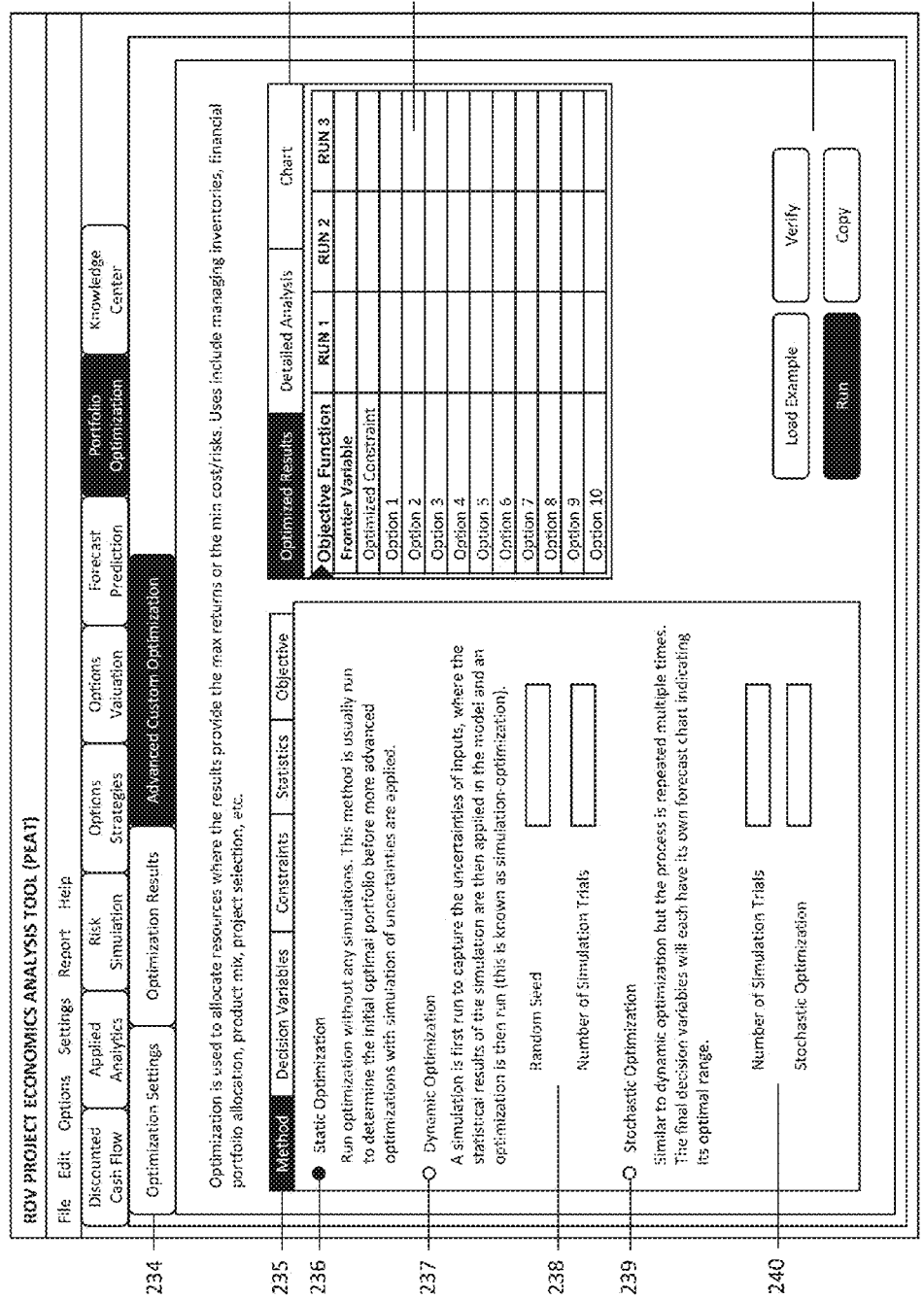
FIG. 35 illustrates the Advanced Custom Optimization's Optimization Method routines.

In an exemplary embodiment according to the present invention, FIG. 35 illustrates the Advanced Custom Optimization 234 tab's Optimization Method 235 routines, where users can create and solve their own optimization models. Knowledge of optimization modeling is required to set up models, but users can click on Load Example and select a sample model to run. Users can use these sample models to learn how the Optimization routines can be set up. Users click Run when done to execute the optimization routines and algorithms. The calculated results and charts will be presented upon completion. When users set up their own optimization model, it is recommended that they go from one tab to another, starting with the Method 235 (Static 236, Dynamic 237, or Stochastic Optimization 239) and based on the selected method, input the simulation seeds 238 or simulation trials 238, 240 or the number of stochastic optimization iterations 240 to perform. The Optimized Results 242 will be shown after the model is Run 241, where the resulting optimized decision variables 243 are presented as a data grid. Perhaps the best way to get started for a new user is to load an existing set of example models 241 to run. The user's own custom model can be checked using the Verify 241 process to determine if the model is set up correctly.

Figure 36:
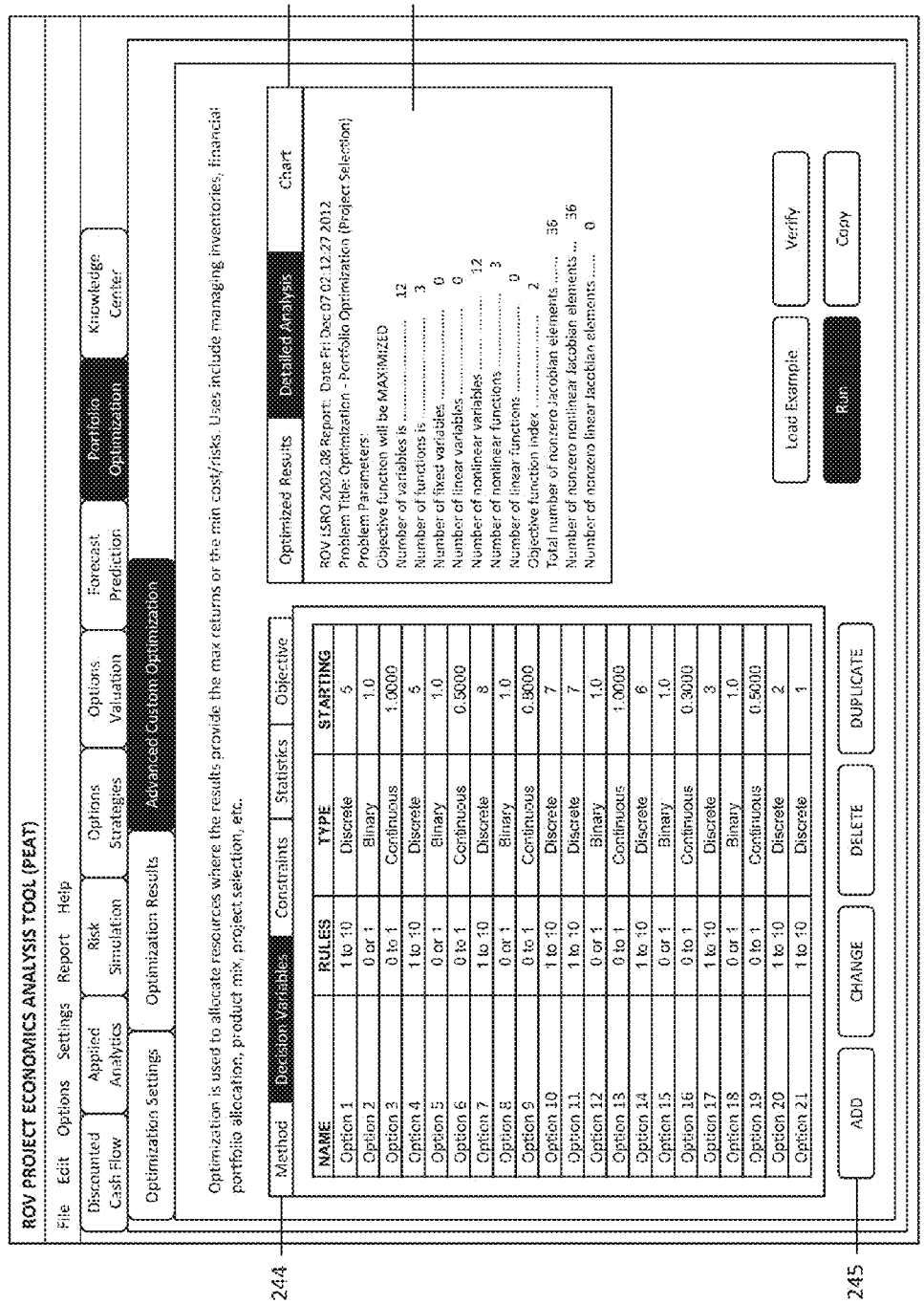
FIG. 36 illustrates the Advanced Custom Optimization's Decision Variables setup.

In an exemplary embodiment according to the present invention, FIG. 36 illustrates the Advanced Custom Optimization's Decision Variables 244 setup, where decision variables are those quantities over which users have control; for example, the amount of a product to make, the number of dollars to allocate among different investments, or which projects to select from among a limited set. As an illustrative example, portfolio optimization analysis includes a go or no-go decision on particular projects. In addition, the dollar or percentage budget allocation across multiple projects also can be structured as decision variables. Users can click Add 245 to add a new Decision Variable. Users can also Change, Delete, or Duplicate 245 an existing decision variable. The Decision Variables can be set as Continuous (with lower and upper bounds), Integers (with lower and upper bounds), Binary (0 or 1), or a Discrete Range 244. The list of available variables is shown in the data grid, complete with their assumptions (rules, types, and starting values) 244. Users can also view the Detailed Analysis 246 of the optimization results 247.

Figure 37:
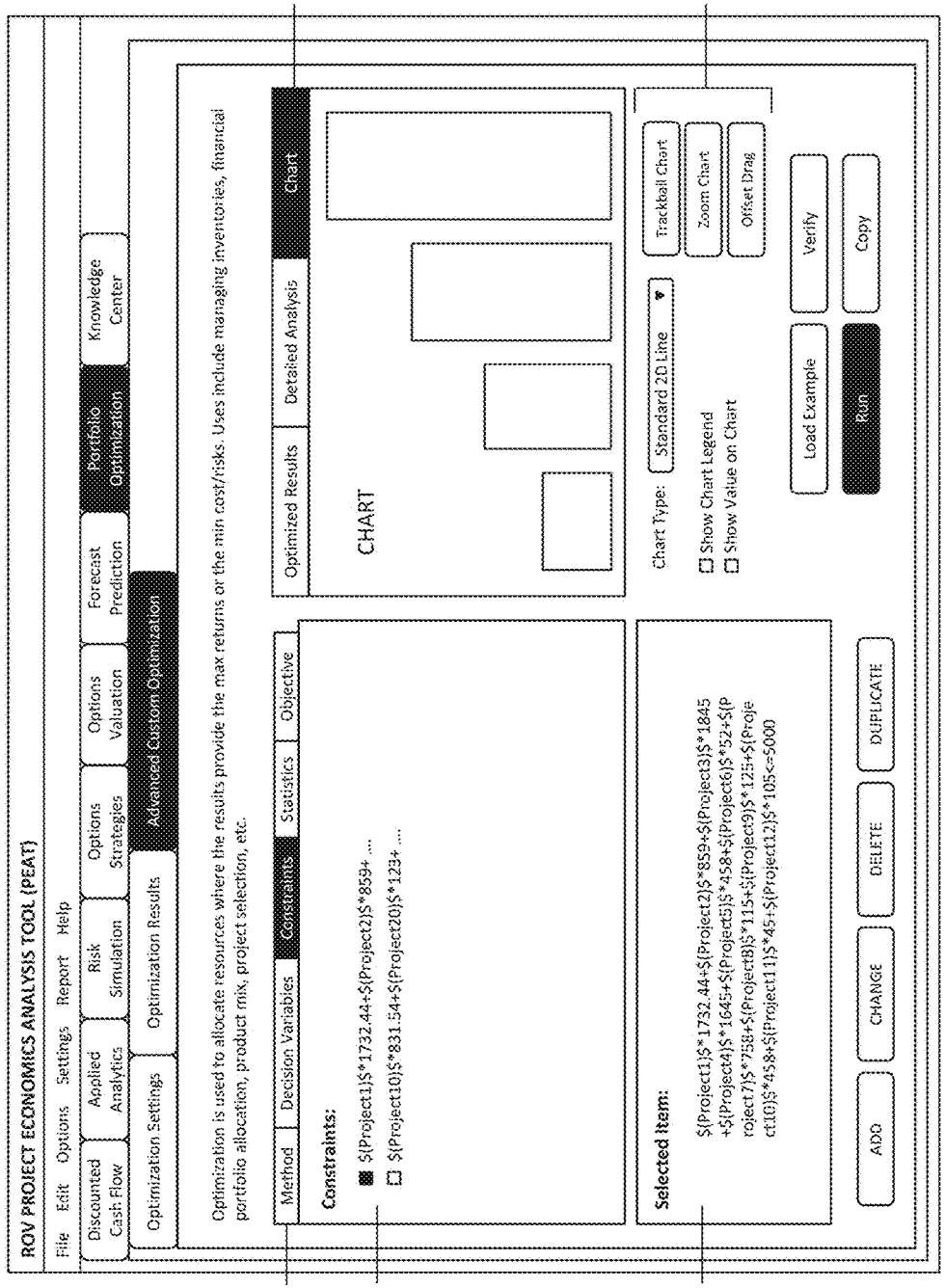
FIG. 37 illustrates the Advanced Custom Optimization's Constraints setup.

In an exemplary embodiment according to the present invention, FIG. 37 illustrates the Advanced Custom Optimization's Constraints 248 setup, which describes relationships among decision variables that restrict the values of the decision variables. For example, a constraint might ensure that the total amount of money allocated among various investments cannot exceed a specified amount or, at most, one project from a certain group can be selected; budget constraints; timing restrictions; minimum returns; or risk tolerance levels. Users can click Add to add a new Constraint. Users can also Change or Delete an existing constraint. When adding a new constraint, the list of available Variables will be shown. Users can simply double-click on a desired variable and its variable syntax will be added to the Expression window. For example, double-clicking on a variable named "Return1" will create a syntax variable "$(Return1)$" in the window. Users can enter their own constraint equation(s). For example, the following is a constraint 249, 250: $(Asset1)$+$(Asset2)$+$(Asset3)$+$(Asset4)$=1, where the sum of all four decision variables must add up to 1. Users can keep adding as many constraints as needed without any upper limit 249. The optimization results on occasion will also return a chart 251, for example, when an investment efficient frontier (Modern Portfolio Theory) is modeled in the optimization routines. Additional chart functionalities 252 are available in the Chart 251 tab.

Figure 38:
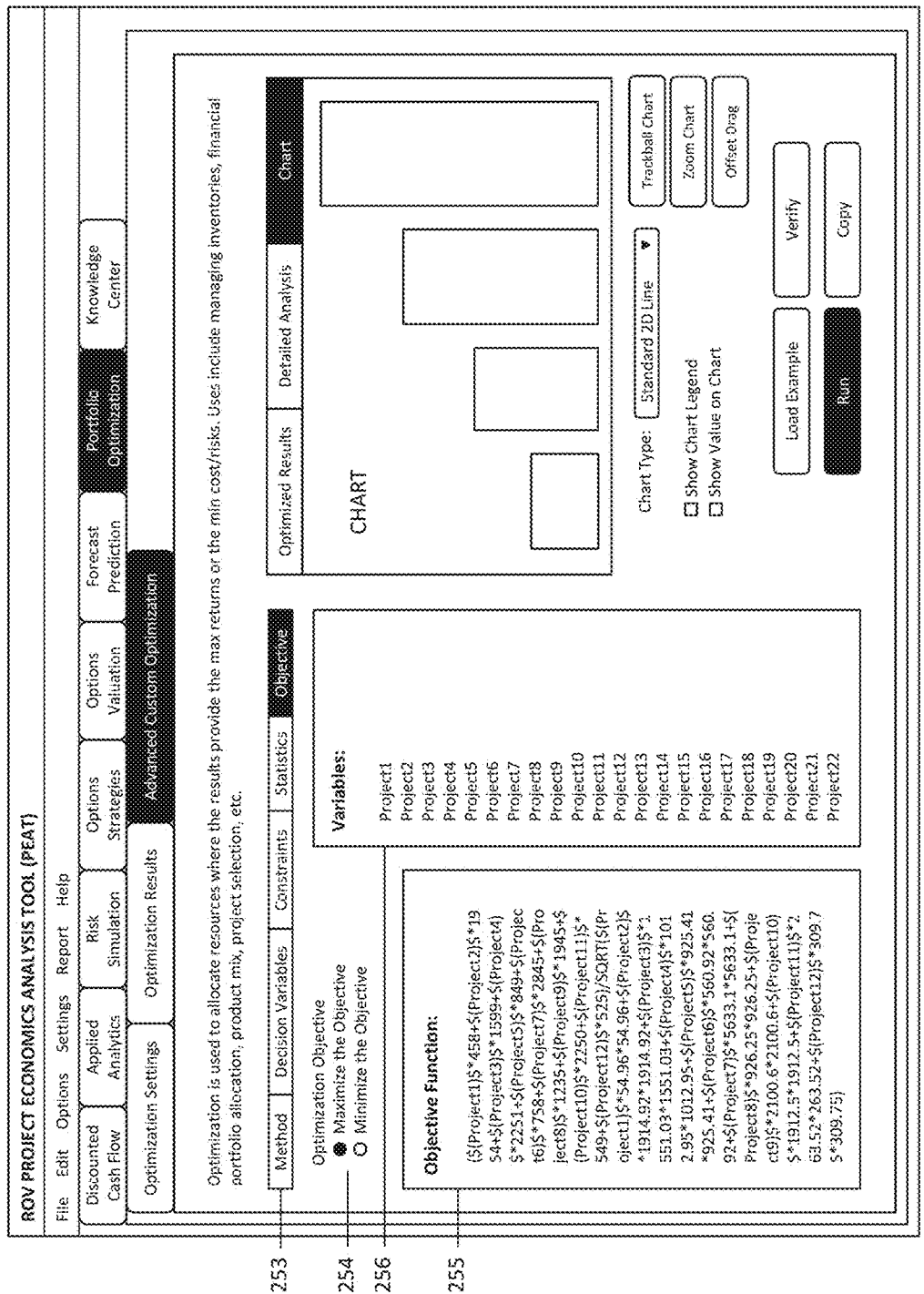
FIG. 38 illustrates the Advanced Custom Optimization's Objective.

In an exemplary embodiment according to the present invention, FIG. 38 illustrates the Advanced Custom Optimization's Objective 253, which gives a mathematical representation of the model's desired outcome, such as maximizing profit or minimizing cost, in terms of the decision variables. In financial analysis, for example, the objective may be to maximize returns while minimizing risks 254 (maximizing the Sharpe's ratio or returns-to-risk ratio). Users can enter their own customized Objective 255 in the function window. The list of available variables 256 is shown in the Variables window on the right. This list includes predefined decision variables and simulation assumptions. An example of an objective function equation looks something like 255:

($(Asset1)$*$(AS_Return1)$+$(As set2)$*$(AS_Return2)$+$(As set3)$*$(AS_Return3)$+$ (Asset4)$* $(AS_Return4)$)/sqrt($(AS_Risk1)$**2*$(Asset1) $2+$(AS_Risk2)$2*$(As set2)$2+ $(AS_Risk3)$2*$(Asset3)$2=$(AS_Risk4) $2*$(Asset4)$**2)

Users can use some of the most common math operators such as +, −, *, /, **, where the latter is the function for "raised to the power of."

According to an embodiment of the present invention, the Advanced Custom Optimization's Statistics 253 subtab will be populated only if there are simulation assumptions set up. In a preferred embodiment, the Statistics window will only be populated if users have previously defined simulation assumptions available. If there are simulation assumptions set up, users can run Dynamic Optimization or Stochastic Optimization (FIG. 35); otherwise users are restricted to running only Static Optimizations. In the window, users can click on the statistics individually to obtain a drop-down list. Here users can select the statistic to apply in the optimization process. The default is to return the Mean from the Monte Carlo Risk Simulation and replace the variable with the chosen statistic (in this case the average value), and Optimization will then be executed based on this statistic.

Figure 39:
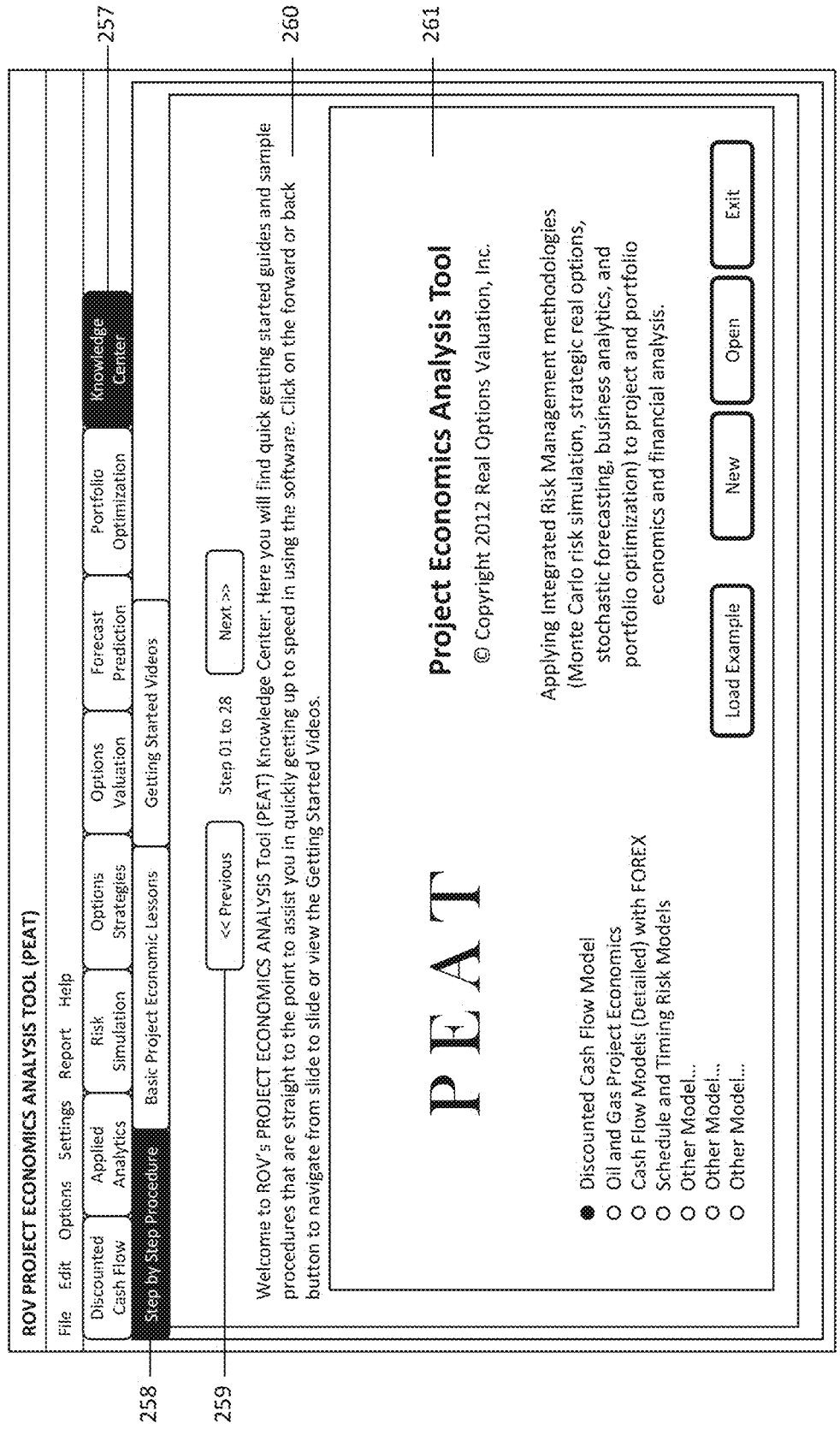
FIG. 39 illustrates the Knowledge Center's Step-by-Step Procedures.

In an exemplary embodiment according to the present invention, FIG. 39 illustrates the Knowledge Center's 257 Step-by-Step Procedures 258, where users will find quick getting started guides and sample procedures that are straight to the point to assist them in quickly getting up to speed in using the software. In a preferred embodiment, the user clicks on the Previous and Next 259 buttons to navigate from slide to slide or to view the Getting Started Videos. These sessions are meant to provide a quick overview to help users get started with using PEAT and do not substitute for years of experience or the technical knowledge required in the Certified in Risk Management (CRM) programs. The Step-by-Step Procedures 258 section highlights some quick getting started steps in a self-paced learning environment that is incorporated within the PEAT software. There are short descriptions 260 above each slide 261, and key elements of the slide are highlighted in the figures for quick identification.

Figure 40:
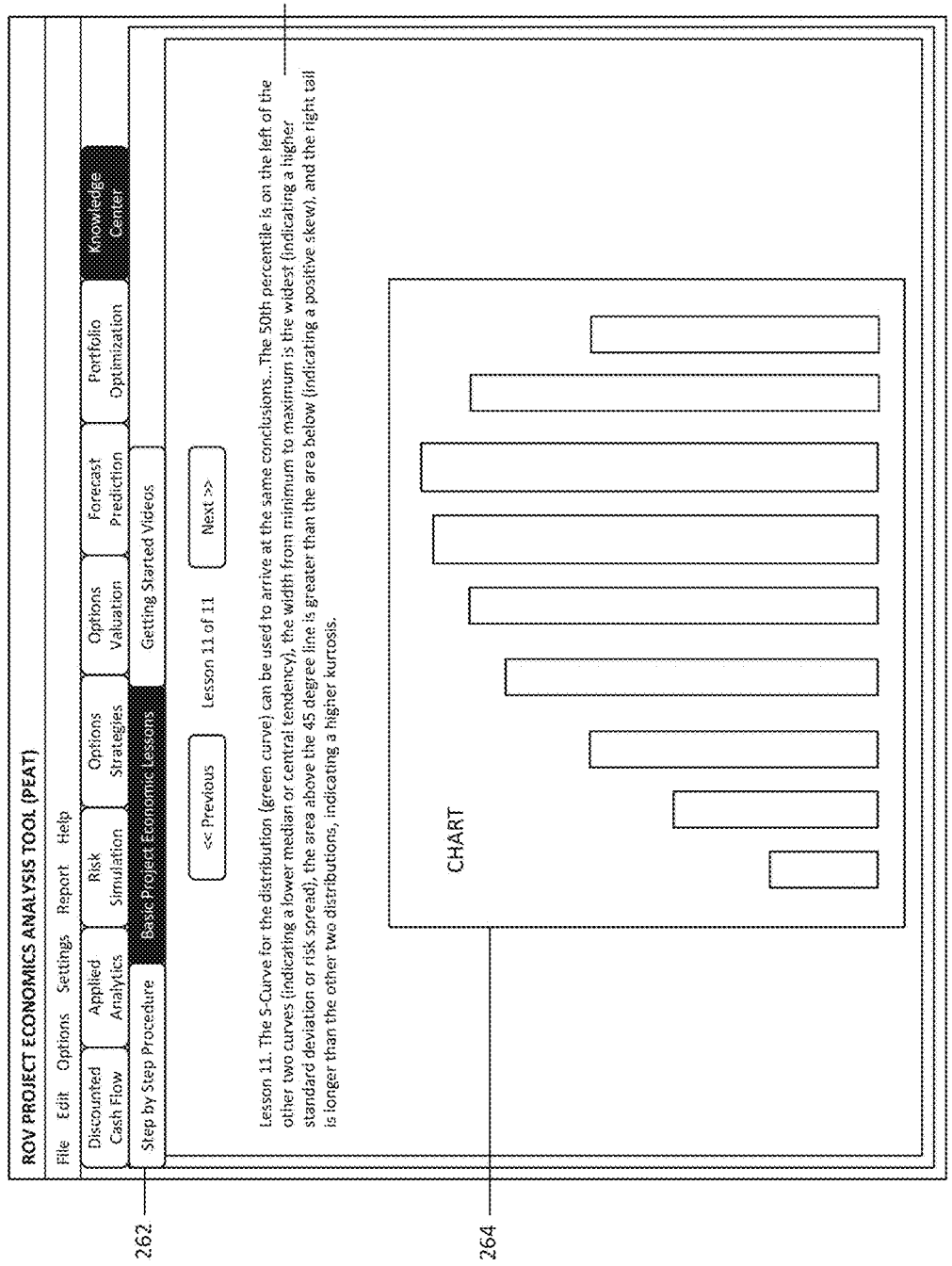
FIG. 40 illustrates the Knowledge Center's Basic Project Economics Lessons.

In an exemplary embodiment according to the present invention, FIG. 40 illustrates the Knowledge Center's Basic Project Economics Lessons 262, which provides an overview tour 263, 264 of some common concepts involved with cash flow analysis and project economic analysis such as the computations of NPV, IRR, MIRR, PI, ROI, PP, DPP, and so forth.

Figure 41:
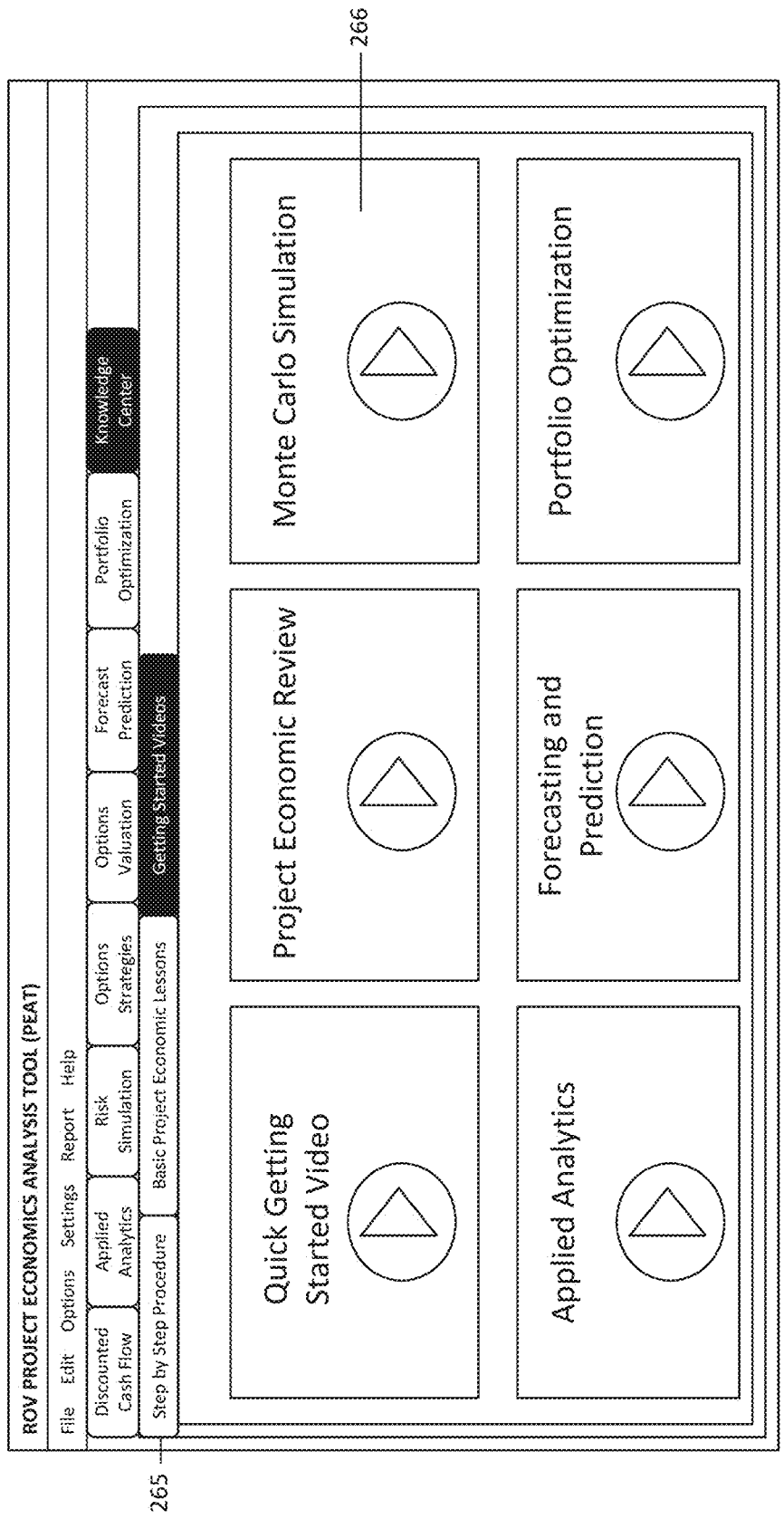
FIG. 41 illustrates the Knowledge Center's Getting Started Videos.

In an exemplary embodiment according to the present invention, FIG. 41 illustrates the Knowledge Center's Getting Started Videos 265, where users can watch a short description and hands-on examples of how to run one of the sections within this PEAT software. In a preferred embodiment, the first quick getting started video is preinstalled with the software while the rest of the videos may be downloaded at first viewing. Before downloading any materials, users should ensure they have a good Internet connection to view the online videos 266. In alternate embodiments, the videos may be entirely preinstalled or entirely downloadable.

According to an embodiment of the present invention, the Knowledge Center has additional functionalities that users can customize. In a preferred embodiment, the Knowledge Center files (videos, slides, and figures) may be available in the installation path's three subfolders: Lessons, Videos, and Procedures. Users can access the raw files directly or modify/update these files and the updated files will show in the software tool's Knowledge Center the next time the software utility tool is started. Users can utilize the existing files (e.g., file type such as *.BMP or *.WMV as well as pixel size of figures) as a guide to the relevant file specifications they can use when replacing any of these original Knowledge Center files. If users wish to edit the text shown in the Knowledge Center, they can edit the *.XML files in the three subfolders, and the next time the software tool is started, the updated text will be shown. If users wish to have any files updated/edited and be set as the default when they install the software tool, they are free to send the updated files to admin@realoptionsvaluation.com so that an updated build can be created for them. The *.WMV (Microsoft Windows Media Video) file format is preferred as all Microsoft Windows-based computers can run the video without any additional need for Video Codec installations. This file format is small in size and, hence, more portable when implementing it in the PEAT software tool installation build, such that users can still e-mail the installation build without the need for uploading to an FTP site. There are no minimum or maximum size limitations to this file format.

In an exemplary embodiment according to the present invention, FIG. 42 illustrates the Report Settings capability in the utility. Users can select or deselect 267 the relevant analyses to run, or select all analyses at once 268, and when Run Report 269 is clicked, the selected models will run and their results (data grids, models, charts, and results) are pasted into Microsoft Excel and Microsoft PowerPoint.

Figure 43:
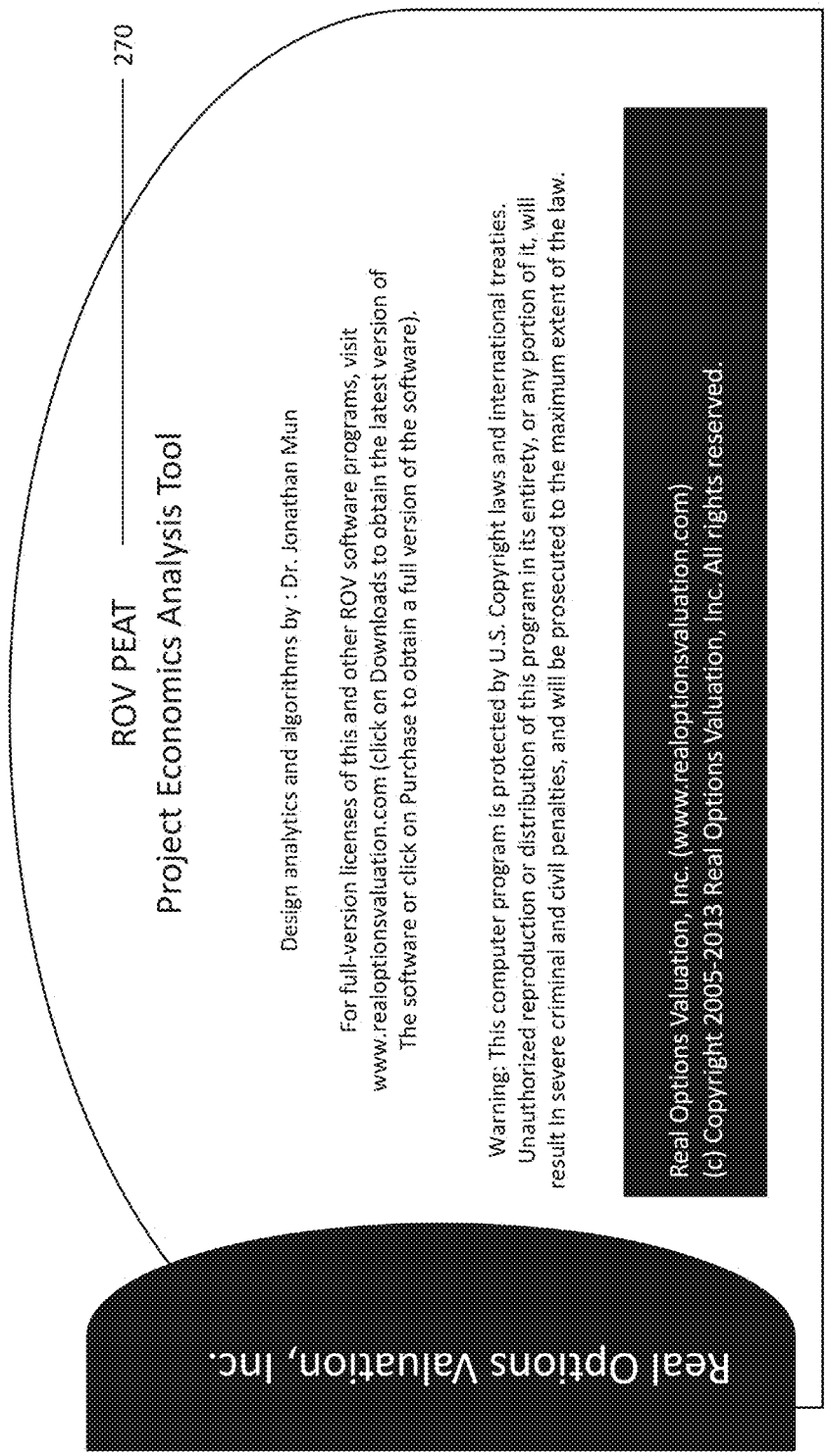
FIG. 43 illustrates the About US screen.

In an exemplary embodiment according to the present invention, FIG. 43 illustrates the About Us 270 splash screen of ROV PEAT (Project Economics Analysis Tool).

Appendix: Risk Simulation Mathematics

According to an embodiment of the present invention, this appendix demonstrates the mathematical models and computations used in creating the Monte Carlo simulations. In order to get started with simulation, one first needs to understand the concept of probability distributions. To begin to understand probability, consider this illustrative example: Users want to look at the distribution of nonexempt wages within one department of a large company. First, users gather raw data—in this case, the wages of each nonexempt employee in the department. Second, users organize the data into a meaningful format and plot the data as a frequency distribution on a chart. To create a frequency distribution, users divide the wages into group intervals and list these intervals on the chart's horizontal axis. Then users list the number or frequency of employees in each interval on the chart's vertical axis. Now users can easily see the distribution of nonexempt wages within the department. Users can chart this data as a probability distribution. A probability distribution shows the number of employees in each interval as a fraction of the total number of employees. To create a probability distribution, users divide the number of employees in each interval by the total number of employees and list the results on the chart's vertical axis.

Probability distributions are either discrete or continuous. Discrete probability distributions describe distinct values, usually integers, with no intermediate values and are shown as a series of vertical bars. A discrete distribution, for example, might describe the number of heads in four flips of a coin as 0, 1, 2, 3, or 4. Continuous probability distributions are actually mathematical abstractions because they assume the existence of every possible intermediate value between two numbers; that is, a continuous distribution assumes there is an infinite number of values between any two points in the distribution. However, in many situations, users can effectively use a continuous distribution to approximate a discrete distribution even though the continuous model does not necessarily describe the situation exactly.

Probability Density Functions, Cumulative Distribution Functions, and Probability Mass Functions In mathematics and Monte Carlo simulation, a probability density function (PDF) represents a continuous probability distribution in terms of integrals. If a probability distribution has a density of $f(x)$, then intuitively the infinitesimal interval of [x, x+dx] has a probability of $f(x)$ dx. The PDF therefore can be seen as a smoothed version of a probability histogram; that is, by providing an empirically large sample of a continuous random variable repeatedly, the histogram using very narrow ranges will resemble the random variable's PDF. The probability of the interval between [a, b] is given by $$\int_a^b f(x)\,dx,$$

which means that the total integral of the function $f$ must be 1.0. It is a common mistake to think of $f(a)$ as the probability of a. This is incorrect. In fact, $f(a)$ can sometimes be larger than 1—consider a uniform distribution between 0.0 and 0.5. The random variable x within this distribution will have $f(x)$ greater than 1. The probability in reality is the function $f(x)dx$ discussed previously, where dx is an infinitesimal amount.

The cumulative distribution function (CDF) is denoted as $F(x)=P(X \leq x)$, indicating the probability of X taking on a less than or equal value to x. Every CDF is monotonically increasing, is continuous from the right, and, at the limits, has the following properties:

$$\lim_{x \to -\infty} F(x) = 0 \text{ and } \lim_{x \to +\infty} F(x) = 1.$$

Further, the CDF is related to the PDF of $$F(b) - F(a) = P(a \leq X \leq b) = \int_a^b f(x)\,dx,$$

where the PDF function $f$ is the derivative of the CDF function F.

In probability theory, a probability mass function (PMF) gives the probability that a discrete random variable is exactly equal to some value. The PMF differs from the PDF in that the values of the latter, defined only for continuous random variables, are not probabilities; rather, its integral over a set of possible values of the random variable is a probability. A random variable is discrete if its probability distribution is discrete and can be characterized by a PMF. Therefore, X is a discrete random variable if $$\sum_u P(X = u) = 1$$

as u runs through all possible values of the random variable X.

Discrete Distributions

Following is a detailed listing of the different types of probability distributions that can be used in Monte Carlo simulation.

Bernoulli or Yes/No Distribution

The Bernoulli distribution is a discrete distribution with two outcomes (e.g., head or tails, success or failure, 0 or 1). The Bernoulli distribution is the binomial distribution with one trial and can be used to simulate Yes/No or Success/Failure conditions. This distribution is the fundamental building block of other more complex distributions. For instance:

Binomial distribution: Bernoulli distribution with higher number of n total trials and computes the probability of x successes within this total number of trials.

Geometric distribution: Bernoulli distribution with higher number of trials and computes the number of failures required before the first success occurs.

Negative binomial distribution: Bernoulli distribution with higher number of trials and computes the number of failures before the xth success occurs.

The mathematical constructs for the Bernoulli distribution are as follows:

$$P(x) = \begin{cases} 1-p & \text{for } x = 0 \\ p & \text{for } x = 1 \end{cases}$$

or $$P(x) = p^x(1-p)^{1-x}$$

$$\text{mean} = p$$

$$\text{standard deviation} = \sqrt{p(1-p)}$$

$$\text{skewness} = \frac{1-2p}{\sqrt{p(1-p)}}$$

$$\text{excess kurtosis} = \frac{6p^2 - 6p + 1}{p(1-p)}$$

The probability of success (p) is the only distributional parameter. Also, it is important to note that there is only one trial in the Bernoulli distribution, and the resulting simulated value is either 0 or 1. The input requirements are such that:

Probability of Success>0 and <1 (i.e., 0.0001<p<0.9999).

Binomial Distribution

The binomial distribution describes the number of times a particular event occurs in a fixed number of trials, such as the number of heads in 10 flips of a coin or the number of defective items out of 50 items chosen.

The three conditions underlying the binomial distribution are:

For each trial, only two outcomes are possible that are mutually exclusive.

The trials are independent—what happens in the first trial does not affect the next trial.

The probability of an event occurring remains the same from trial to trial.

The mathematical constructs for the binomial distribution are as follows:

$$P(x) = \frac{n!}{x!(n-x)!} p^x (1-p)^{(n-x)}$$

for $n > 0$; $x = 0, 1, 2, \ldots n$; and $0 < p < 1$ $$\text{mean} = np$$

$$\text{standard deviation} = \sqrt{np(1-p)}$$

$$\text{skewness} = \frac{1-2p}{\sqrt{np(1-p)}}$$

$$\text{excess kurtosis} = \frac{6p^2 - 6p + 1}{np(1-p)}$$

The probability of success (p) and the integer number of total trials (n) are the distributional parameters. The number of successful trials is denoted x. It is important to note that probability of success (p) of 0 or 1 are trivial conditions and do not require any simulations, and, hence, are not allowed in the software. The input requirements are such that Probability of Success>0 and <1 (i.e., 0.0001≤p≤0.9999), the Number of Trials≥1 or positive integers and ≤1,000 (for larger trials, use the normal distribution with the relevant computed binomial mean and standard deviation as the normal distribution's parameters).

Discrete Uniform

The discrete uniform distribution is also known as the equally likely outcomes distribution, where the distribution has a set of N elements, and each element has the same probability. This distribution is related to the uniform distribution but its elements are discrete and not continuous. The mathematical constructs for the discrete uniform distribution are as follows:

$$P(x) = \frac{1}{N}$$

$$\text{mean} = \frac{N+1}{2} \text{ ranked value}$$

$$\text{standard deviation} = \sqrt{\frac{(N-1)(N+1)}{12}} \text{ ranked value}$$

skewness = 0 (i.e., the distribution is perfectly symmetrical)

$$\text{excess kurtosis} = \frac{-6(N^2+1)}{5(N-1)(N+1)} \text{ ranked value}$$

The input requirements are such that Minimum<Maximum and both must be integers (negative integers and zero are allowed).

Geometric Distribution

The geometric distribution describes the number of trials until the first successful occurrence, such as the number of times one would need to spin a roulette wheel before winning.

The three conditions underlying the geometric distribution are:

The number of trials is not fixed.

The trials continue until the first success.

The probability of success is the same from trial to trial.

The mathematical constructs for the geometric distribution are as follows:

$$P(x) = p(1-p)^{x-1} \text{ for } 0 < p < 1 \text{ and } x = 1, 2, \ldots, n$$

$$\text{mean} = \frac{1}{p} - 1$$

$$\text{standard deviation} = \sqrt{\frac{1-p}{p^2}}$$

$$\text{skewness} = \frac{2-p}{\sqrt{1-p}}$$

$$\text{excess kurtosis} = \frac{p^2 - 6p + 6}{1-p}$$

The probability of success (p) is the only distributional parameter. The number of successful trials simulated is denoted x, which can only take on positive integers. The input requirements are such that Probability of success>0 and <1 (i.e., 0.0001≤p≤0.9999). It is important to note that probability of success (p) of 0 or 1 are trivial conditions and do not require any simulations, and, hence, are not allowed in the software.

Hypergeometric Distribution

The hypergeometric distribution is similar to the binomial distribution in that both describe the number of times a particular event occurs in a fixed number of trials. The difference is that binomial distribution trials are independent, whereas hypergeometric distribution trials change the probability for each subsequent trial and are called trials without replacement. As an illustrative example, suppose a box of manufactured parts is known to contain some defective parts. Users choose a part from the box, find it is defective, and remove the part from the box. If users choose another part from the box, the probability that it is defective is somewhat lower than for the first part because users have removed a defective part. If users had replaced the defective part, the probabilities would have remained the same, and the process would have satisfied the conditions for a binomial distribution.

The three conditions underlying the hypergeometric distribution are as follows:

The total number of items or elements (the population size) is a fixed number, a finite population. The population size must be less than or equal to 1,750.

The sample size (the number of trials) represents a portion of the population.

The known initial probability of success in the population changes after each trial.

The mathematical constructs for the hypergeometric distribution are as follows:

$$P(x) = \frac{\frac{(N_x)!}{x!(N_x-x)!} \frac{(N-N_x)!}{(n-x)!(N-N_x-n+x)!}}{\frac{N!}{n!(N-n)!}}$$

for $x = \text{Max}(n - (N - N_x), 0), \ldots, \text{Min}(n, N_x)$ $$\text{mean} = \frac{N_x n}{N}$$

$$\text{standard deviation} = \sqrt{\frac{(N-N_x)N_x n(N-n)}{N^2(N-1)}}$$

$$\text{skewness} = \frac{(N-2N_x)(N-2n)}{N-2} \sqrt{\frac{N-1}{(N-N_x)N_x n(N-n)}}$$

$$\text{excess kurtosis} = \frac{V(N, N_x, n)}{(N-N_x)N_x n(-3+N)(-2+N)(-N+n)}$$

where $V(N, N_x, n) = (N-N_x)^3 - (N-N_x)^5 + 3(N-N_x)^2 N_x - 6(N-N_x)^3 N_x +$
$(N-N_x)^4 N_x + 3(N-N_x)N_x^2 - 12(N-N_x)^2 N_x^2 + 8(N-N_x)^3 N_x^2 +$
$N_x^3 - 6(N-N_x)N_x^3 + 8(N-N_x)^2 N_x^3 + (N-N_x)N_x^4 - N_x^5 -$
$6(N-N_x)^3 N_x + 6(N-N_x)^4 N_x + 18(N-N_x)^2 N_x n - 6(N-N_x)^3 N_x n +$
$18(N-N_x)N_x^2 n - 24(N-N_x)^2 N_x^2 n - 6(N-N_x)^3 n - 6(N-N_x)N_x^3 n +$
$6N_x^4 n + 6(N-N_x)^2 n^2 - 6(N-N_x)^3 n^2 - 24(N-N_x)N_x n^2 +$
$12(N-N_x)^2 N_x n^2 + 6N_x^2 n^2 + 12(N-N_x)N_x^2 n^2 - 6N_x^3 n^2$ The number of items in the population (N), trials sampled (n), and number of items in the population that have the successful trait ($N_x$) are the distributional parameters. The number of successful trials is denoted x. The input requirements are such that Population≥2 and integer, Trials>0 and integer, Successes>0 and integer, Population>Successes Trials<Population and Population<1750.

Negative Binomial Distribution

The negative binomial distribution is useful for modeling the distribution of the number of trials until the rth successful occurrence, such as the number of sales calls that need to be made to close a total of 10 orders. It is essentially a superdistribution of the geometric distribution. This distribution shows the probabilities of each number of trials in excess of r to produce the required success r.

The three conditions underlying the negative binomial distribution are as follows:

The number of trials is not fixed.
The trials continue until the rth success.
The probability of success is the same from trial to trial.

The mathematical constructs for the negative binomial distribution are as follows:

$$P(x) = \frac{(x+r-1)!}{(r-1)!x!} p^r (1-p)^x$$

for $x = r, r+1, \ldots;$ and $0 < p < 1$ $$\text{mean} = \frac{r(1-p)}{p}$$

$$\text{standard deviation} = \sqrt{\frac{r(1-p)}{p^2}}$$

-continued $$\text{skewness} = \frac{2-p}{\sqrt{r(1-p)}}$$

$$\text{excess kurtosis} = \frac{p^2 - 6p + 6}{r(1-p)}$$

Probability of success (p) and required successes (r) are the distributional parameters. Where the input requirements are such that Successes required must be positive integers>0 and <8000, and Probability of success>0 and <1 (i.e., 0.0001≤p≤0.9999). It is important to note that probability of success (p) of 0 or 1 are trivial conditions and do not require any simulations, and, hence, are not allowed in the software.

Poisson Distribution

The Poisson distribution describes the number of times an event occurs in a given interval, such as the number of telephone calls per minute or the number of errors per page in a document.

The three conditions underlying the Poisson distribution are as follows:

The number of possible occurrences in any interval is unlimited.
The occurrences are independent. The number of occurrences in one interval does not affect the number of occurrences in other intervals.
The average number of occurrences must remain the same from interval to interval.

The mathematical constructs for the Poisson are as follows:

$$P(x) = \frac{e^{-\lambda} \lambda^x}{x!}$$

for $x$ and $\lambda > 0$ $\text{mean} = \lambda$ $\text{standard deviation} = \sqrt{\lambda}$ $\text{skewness} = \frac{1}{\sqrt{\lambda}}$ $\text{excess kurtosis} = \frac{1}{\lambda}$ Rate ($\lambda$) is the only distributional parameter, and the input requirements are such that Rate>0 and ≤1,000 (i.e., 0.0001≤rate≤1,000).

Continuous Distributions

Beta Distribution

The beta distribution is very flexible and is commonly used to represent variability over a fixed range. One of the more important applications of the beta distribution is its use as a conjugate distribution for the parameter of a Bernoulli distribution. In this application, the beta distribution is used to represent the uncertainty in the probability of occurrence of an event. It is also used to describe empirical data and predict the random behavior of percentages and fractions, as the range of outcomes is typically between 0 and 1. The value of the beta distribution lies in the wide variety of shapes it can assume when users vary the two parameters, alpha and beta. If the parameters are equal, the distribution is symmetrical. If either parameter is 1 and the other parameter is greater than 1, the distribution is J shaped. If alpha is less than beta, the distribution is said to be positively skewed (most of the values are near the minimum value). If alpha is greater than beta, the distribution is negatively skewed (most of the values are near the maximum value). The mathematical constructs for the beta distribution are as follows:

$$f(x) = \frac{(x)^{(\alpha-1)}(1-x)^{(\beta-1)}}{\left[\frac{\Gamma(\alpha)\Gamma(\beta)}{\Gamma(\alpha+\beta)}\right]}$$

for $\alpha > 0;$ $\beta > 0;$ $x > 0$ $$\text{mean} = \frac{\alpha}{\alpha+\beta}$$

$$\text{standard deviation} = \sqrt{\frac{\alpha\beta}{(\alpha+\beta)^2(1+\alpha+\beta)}}$$

$$\text{skewness} = \frac{2(\beta-\alpha)\sqrt{1+\alpha+\beta}}{(2+\alpha+\beta)\sqrt{\alpha\beta}}$$

$$\text{excess kurtosis} = \frac{3(\alpha+\beta+1)[\alpha\beta(\alpha+\beta-6)+2(\alpha+\beta)^2]}{\alpha\beta(\alpha+\beta+2)(\alpha+\beta+3)} - 3$$

Alpha ($\alpha$) and beta ($\beta$) are the two distributional shape parameters, and $\Gamma$ is the gamma function. The two conditions underlying the beta distribution are as follows:
The uncertain variable is a random value between 0 and a positive value.
The shape of the distribution can be specified using two positive values.
Input requirements:
Alpha and beta>0 and can be any positive value.
Cauchy Distribution or Lorentzian Distribution or Breit-Wigner Distribution The Cauchy distribution, also called the Lorentzian distribution or Breit-Wigner distribution, is a continuous distribution describing resonance behavior. It also describes the distribution of horizontal distances at which a line segment tilted at a random angle cuts the x-axis.

The mathematical constructs for the cauchy or Lorentzian distribution are as follows:

$$f(x) = \frac{1}{\pi} \frac{\gamma/2}{(x-m)^2 + \gamma^2/4}$$

The cauchy distribution is a special case where it does not have any theoretical moments (mean, standard deviation, skewness, and kurtosis) as they are all undefined. Mode location (m) and scale ($\gamma$) are the only two parameters in this distribution. The location parameter specifies the peak or mode of the distribution while the scale parameter specifies the half-width at half-maximum of the distribution. In addition, the mean and variance of a cauchy or Lorentzian distribution are undefined. In addition, the cauchy distribution is the Student's t distribution with only 1 degree of freedom. This distribution is also constructed by taking the ratio of two standard normal distributions (normal distributions with a mean of zero and a variance of one) that are independent of one another. The input requirements are such that Location can be any value, whereas Scale>0 and can be any positive value.

Chi-Square Distribution

The chi-square distribution is a probability distribution used predominantly in hypothesis testing and is related to the gamma distribution and the standard normal distribution. For instance, the sums of independent normal distributions are distributed as a chi-square ($\chi^2$) with k degrees of freedom:

$$Z_1^2 + Z_2^2 + \ldots + Z_k^2 \sim X_k^2$$

The mathematical constructs for the chi-square distribution are as follows:

$$f(x) = \frac{2^{-k/2}}{\Gamma(k/2)} x^{k/2-1} e^{-x/2}$$

for all $x > 0$ $\text{mean} = k$ $\text{standard deviation} = \sqrt{2k}$ $$\text{skewness} = 2\sqrt{\frac{2}{k}}$$

$$\text{excess kurtosis} = \frac{12}{k}$$

$\Gamma$ is the gamma function. Degrees of freedom k is the only distributional parameter.

The chi-square distribution can also be modeled using a gamma distribution by setting the $$\text{shape parameter} = \frac{k}{2}$$

and $$\text{scale} = 2S^2$$

where S is the scale. The input requirements are such that Degrees of freedom>1 and must be an integer<1,000.

Exponential Distribution

The exponential distribution is widely used to describe events recurring at random points in time, such as the time between failures of electronic equipment or the time between arrivals at a service booth. It is related to the Poisson distribution, which describes the number of occurrences of an event in a given interval of time. An important characteristic of the exponential distribution is the "memoryless" property, which means that the future lifetime of a given object has the same distribution, regardless of the time it existed. In other words, time has no effect on future outcomes. The mathematical constructs for the exponential distribution are as follows:

$$f(x) = \lambda e^{-\lambda x}$$

for $x \geq 0;$ $\lambda > 0$

-continued $$\text{mean} = \frac{1}{\lambda}$$

$$\text{standard deviation} = \frac{1}{\lambda}$$

skewness = 2 (this value applies to all success rate λ inputs)

excess kurtosis = 6 (this value applies to all success rate λ inputs)

Success rate (X) is the only distributional parameter. The number of successful trials is x.
  The condition underlying the exponential distribution is
  The exponential distribution describes the amount of time between occurrences. Input requirements: Rate>0 and ≤300.

Extreme Value Distribution or Gumbel Distribution

The extreme value distribution (Type 1) is commonly used to describe the largest value of a response over a period of time, for example, in flood flows, rainfall, and earthquakes. Other applications include the breaking strengths of materials, construction design, and aircraft loads and tolerances. The extreme value distribution is also known as the Gumbel distribution.

The mathematical constructs for the extreme value distribution are as follows:

$$f(x) = \frac{1}{\beta} z e^{-z}$$

where $$z = e^{\frac{x-m}{\beta}}$$

for $$\beta > 0;$$

and any value of x and m mean = $m + 0.577215\beta$ $$\text{standard deviation} = \sqrt{\frac{1}{6}\pi^2\beta^2}$$

$$\text{skewness} = \frac{12\sqrt{6}\,(1.2020569)}{\pi^3} =$$

1.13955 (this applies for all values of mode and scale)

excess kurtosis = 5.4 (this applies for all values of mode and scale)

Mode (m) and scale (β) are the distributional parameters. There are two standard parameters for the extreme value distribution: mode and scale. The mode parameter is the most likely value for the variable (the highest point on the probability distribution). The scale parameter is a number greater than 0. The larger the scale parameter, the greater the variance. The input requirements are such that Mode can be any value and Scale>0.

F Distribution or Fisher-Snedecor Distribution

The F distribution, also known as the Fisher-Snedecor distribution, is another continuous distribution used most frequently for hypothesis testing. Specifically, it is used to test the statistical difference between two variances in analysis of variance tests and likelihood ratio tests. The F distribution with the numerator degree of freedom n and denominator degree of freedom m is related to the chi-square distribution in that:

$$\frac{\chi_n^2/n^d}{\chi_m^2/m} \sim F_{n,m}$$

$$f(x) = \frac{\Gamma\left(\frac{n+m}{2}\right)\left(\frac{n}{m}\right)^{n/2} x^{n/2-1}}{\Gamma\left(\frac{n}{n}\right)\Gamma\left(\frac{m}{2}\right)\left[x\left(\frac{n}{m}\right)+1\right]^{(n+m)/2}}$$

or $$\text{mean} = \frac{m}{m-2}$$

$$\text{standard deviation} = \frac{2m^2(m+n-2)}{n(m-2)^2(m-4)}$$

for all m > 4

$$\text{skewness} = \frac{2(m+2n-2)}{m-6}\sqrt{\frac{2(m-4)}{n(m+n-2)}}$$

$$\text{excess kurtosis} = \frac{12(-16 + 20m - 8m^2 + m^3 + 44n - 32mn + 5m^2n - 22n^2 + 5mn^2)}{n(m-6)(m-8)(n+m-2)}$$

The numerator degree of freedom n and denominator degree of freedom m are the only distributional parameters. The input requirements are such that degrees of freedom numerator and degrees of freedom denominator are both >0 integers.

Gamma Distribution (Erlang Distribution)

The gamma distribution applies to a wide range of physical quantities and is related to other distributions: lognormal, exponential, Pascal, Erlang, Poisson, and chi-square. It is used in meteorological processes to represent pollutant concentrations and precipitation quantities. The gamma distribution is also used to measure the time between the occurrence of events when the event process is not completely random. Other applications of the gamma distribution include inventory control, economic theory, and insurance risk theory.

The gamma distribution is most often used as the distribution of the amount of time until the rth occurrence of an event in a Poisson process. When used in this fashion, the three conditions underlying the gamma distribution are as follows:
  The number of possible occurrences in any unit of measurement is not limited to a fixed number.
  The occurrences are independent. The number of occurrences in one unit of measurement does not affect the number of occurrences in other units.
  The average number of occurrences must remain the same from unit to unit.

The mathematical constructs for the gamma distribution are as follows:

$$f(x) = \frac{\left(\frac{x}{\beta}\right)^{\alpha-1} e^{-\frac{x}{\beta}}}{\Gamma(\alpha)\beta}$$

with any value of α > 0 and

β > 0 mean = αβ

$$\text{standard deviation} = \sqrt{\alpha\beta^2}$$

$$\text{skewness} = \frac{2}{\sqrt{\alpha}}$$

$$\text{excess kurtosis} = \frac{6}{\alpha}$$

Shape parameter alpha ($\alpha$) and scale parameter beta ($\beta$) are the distributional parameters, and $\Gamma$ is the gamma function. When the alpha parameter is a positive integer, the gamma distribution is called the Erlang distribution, used to predict waiting times in queuing systems, where the Erlang distribution is the sum of independent and identically distributed random variables each having a memoryless exponential distribution. With Setting n as the number of these random variables, the mathematical construct of the Erlang distribution is:

$$f(x) = \frac{x^{n-1}e^{-x}}{(n-1)!}$$

for all x>0 and all positive integers of n, where the input requirements are such that Scale Beta>0 and can be any positive value, Shape Alpha≥0.05 and can be any positive value, and Location can be any value.

Logistic Distribution

The logistic distribution is commonly used to describe growth, that is, the size of a population expressed as a function of a time variable. It also can be used to describe chemical reactions and the course of growth for a population or individual.

The mathematical constructs for the logistic distribution are as follows:

$$f(x) = \frac{e^{\frac{\mu-x}{\alpha}}}{\alpha\left[1+e^{\frac{\mu-x}{\alpha}}\right]^2}$$

for any value of $\alpha$ and $\beta$ $$\text{mean} = \mu$$

$$\text{standard deviation} = \sqrt{\frac{1}{3}\pi^2\alpha^2}$$

skewness = 0 (this applies to all mean and scale inputs)

excess kurtosis = 1.2 (this applies to all mean and scale inputs)

Mean ($\mu$) and scale ($\alpha$) are the distributional parameters. There are two standard parameters for the logistic distribution: mean and scale. The mean parameter is the average value, which for this distribution is the same as the mode because this distribution is symmetrical. The scale parameter is a number greater than 0. The larger the scale parameter, the greater the variance.

Input requirements:
Scale>0 and can be any positive value.
Mean can be any value.

Lognormal Distribution

The lognormal distribution is widely used in situations where values are positively skewed, for example, in financial analysis for security valuation or in real estate for property valuation, and where values cannot fall below zero.

Stock prices are usually positively skewed rather than normally (symmetrically) distributed. Stock prices exhibit this trend because they cannot fall below the lower limit of zero but might increase to any price without limit. Similarly, real estate prices illustrate positive skewness and are lognormally distributed as property values cannot become negative.

The three conditions underlying the lognormal distribution are as follows:
The uncertain variable can increase without limits but cannot fall below zero.
The uncertain variable is positively skewed, with most of the values near the lower limit.
The natural logarithm of the uncertain variable yields a normal distribution.

Generally, if the coefficient of variability is greater than 30%, use a lognormal distribution. Otherwise, use the normal distribution.

The mathematical constructs for the lognormal distribution are as follows:

$$f(x) = \frac{1}{x\sqrt{2\pi}\ln(\sigma)}e^{\frac{[ln(x)-ln(\mu)]^2}{2[ln(\sigma)]^2}}$$

for $x > 0;$ $\mu > 0$ and $\sigma > 0$ $$\text{mean} = \exp\left(\mu + \frac{\sigma^2}{2}\right)$$

$$\text{standard deviation} = \sqrt{\exp(\sigma^2 + 2\mu)[\exp(\sigma^2) - 1]}$$

$$\text{skewness} = \left[\sqrt{\exp(\sigma^2) - 1}\right](2 + \exp(\sigma^2))$$

$$\text{excess kurtosis} = \exp(4\sigma^2) + 2\exp(3\sigma^2) + 3\exp(2\sigma^2) - 6$$

Mean ($\mu$) and standard deviation ($\sigma$) are the distributional parameters. The input requirements are such that Mean and Standard deviation are both >0 and can be any positive value. By default, the lognormal distribution uses the arithmetic mean and standard deviation. For applications for which historical data are available, it is more appropriate to use either the logarithmic mean and standard deviation, or the geometric mean and standard deviation.

Normal Distribution

The normal distribution is the most important distribution in probability theory because it describes many natural phenomena, such as people's IQs or heights. Decision makers can use the normal distribution to describe uncertain variables such as the inflation rate or the future price of gasoline.

The three conditions underlying the normal distribution are as follows:
Some value of the uncertain variable is the most likely (the mean of the distribution).
The uncertain variable could as likely be above the mean as it could be below the mean (symmetrical about the mean).
The uncertain variable is more likely to be in the vicinity of the mean than further away.

The mathematical constructs for the normal distribution are as follows:

$$f(x) = \frac{1}{\sqrt{2\pi}\,\sigma} e^{-\frac{(x-\mu)^2}{2\sigma^2}}$$

for all values of $x$ while $\sigma > 0$ mean $= \mu$ standard deviation $= \sigma$ skewness =

0 (this applies to all inputs of mean and standard deviation)

excess kurtosis =

0 (this applies to all inputs of mean and standard deviation)

Mean ($\mu$) and standard deviation ($\sigma$) are the distributional parameters. The input requirements are such that Standard deviation>0 and can be any positive value and Mean can be any value.

Pareto Distribution

The Pareto distribution is widely used for the investigation of distributions associated with such empirical phenomena as city population sizes, the occurrence of natural resources, the size of companies, personal incomes, stock price fluctuations, and error clustering in communication circuits.

The mathematical constructs for the pareto are as follows:

$$f(x) = \frac{\beta L^\beta}{x^{(1+\beta)}}$$

for $x > L$ $$\text{mean} = \frac{\beta L}{\beta - 1}$$

$$\text{standard deviation} = \sqrt{\frac{\beta L^2}{(\beta - 1)^2 (\beta - 2)}}$$

$$\text{skewness} = \sqrt{\frac{\beta - 2}{\beta}} \left[ \frac{2(\beta + 1)}{\beta - 3} \right]$$

$$\text{excess kurtosis} = \frac{6(\beta^3 + \beta^2 - 6\beta - 2)}{\beta(\beta - 3)(\beta - 4)}$$

Location (L) and shape ($\beta$) are the distributional parameters.

There are two standard parameters for the Pareto distribution: location and shape. The location parameter is the lower bound for the variable. After users select the location parameter, they can estimate the shape parameter. The shape parameter is a number greater than 0, usually greater than 1. The larger the shape parameter, the smaller the variance and the thicker the right tail of the distribution. The input requirements are such that Location>0 and can be any positive value while Shape≥0.05.

Student's t Distribution

The Student's t distribution is the most widely used distribution in hypothesis testing. This distribution is used to estimate the mean of a normally distributed population when the sample size is small, and is used to test the statistical significance of the difference between two sample means or confidence intervals for small sample sizes.

The mathematical constructs for the t-distribution are as follows:

$$f(t) = \frac{\Gamma[(r+1)/2]}{\sqrt{r\pi}\,\Gamma[r/2]} (1 + t^2/r)^{-(r+1)/2}$$

mean =

0 (this applies to all degrees of freedom $r$ except if the distribution is shifted to another nonzero central location)

$$\text{standard deviation} = \sqrt{\frac{r}{r-2}}$$

skewness = 0 excess kurtosis $= \dfrac{6}{r-4}$ for all $r > 4$ where $t = \dfrac{x - \bar{x}}{s}$ and $\Gamma$ is the gamma function Degree of freedom r is the only distributional parameter. The t distribution is related to the F distribution as follows: the square of a value of t with r degrees of freedom is distributed as F with 1 and r degrees of freedom. The overall shape of the probability density function of the t distribution also resembles the bell shape of a normally distributed variable with mean 0 and variance 1, except that it is a bit lower and wider or is leptokurtic (fat tails at the ends and peaked center). As the number of degrees of freedom grows (say, above 30), the t distribution approaches the normal distribution with mean 0 and variance 1. The input requirements are such that Degrees of freedom>1 and must be an integer.

Triangular Distribution

The triangular distribution describes a situation where users know the minimum, maximum, and most likely values to occur. For example, users could describe the number of cars sold per week when past sales show the minimum, maximum, and usual number of cars sold.

The three conditions underlying the triangular distribution are as follows:

The minimum number of items is fixed.

The maximum number of items is fixed.

The most likely number of items falls between the minimum and maximum values, forming a triangular-shaped distribution, which shows that values near the minimum and maximum are less likely to occur than those near the most-likely value.

The mathematical constructs for the triangular distribution are as follows:

$$f(x) = \begin{cases} \dfrac{2(x - \text{Min})}{(\text{Max} - \text{Min})(\text{Likely} - \text{min})} & \text{for Min} < x < \text{Likely} \\ \dfrac{2(\text{Max} - x)}{(\text{Max} - \text{Min})(\text{Max} - \text{Likely})} & \text{for Likely} < x < \text{Max} \end{cases}$$

$$\text{mean} = \frac{1}{3}(\text{Min} + \text{Likely} + \text{Max})$$

standard deviation =

$$\sqrt{\frac{1}{18}(\text{Min}^2 + \text{Likely}^2 + \text{Max}^2 - \text{Min}\,\text{Max} - \text{Min}\,\text{Likely} - \text{Max}\,\text{Likely})}$$

-continued $$\text{skewness} = \frac{\sqrt{2}\,(\text{Min} + \text{Max} - 2Likely)}{5(\text{Min}^2 + \text{Max}^2 + Likely^2 - \text{MinMax} - \text{MinLikely} - \text{MaxLikely})^{3/2}}$$

$$(2\text{Min} - \text{Max} - Likely)(\text{Min} - 2\text{Max} + Likely)$$

excess kurtosis = −0.6

Minimum (Min), most likely (Likely), and maximum (Max) are the distributional parameters and the input requirements are such that Min≤Most Likely≤Max and can take any value, and Min<Max and can take any value.

Uniform Distribution

With the uniform distribution, all values fall between the minimum and maximum and occur with equal likelihood.

The three conditions underlying the uniform distribution are as follows:

The minimum value is fixed.
The maximum value is fixed.
All values between the minimum and maximum occur with equal likelihood.

The mathematical constructs for the uniform distribution are as follows:

$$f(x) = \frac{1}{\text{Max} - \text{Min}}$$

for all values such that Min < Max $$\text{mean} = \frac{\text{Min} + \text{Max}}{2}$$

$$\text{standard deviation} = \sqrt{\frac{(\text{Max} - \text{Min})^2}{12}}$$

skewness = 0 excess kurtosis = −1.2 (this applies to all inputs of Min and Max)

Maximum value (Max) and minimum value (Min) are the distributional parameters. The input requirements are such that Min<Max and can take any value.

Weibull Distribution (Rayleigh Distribution)

The Weibull distribution describes data resulting from life and fatigue tests. It is commonly used to describe failure time in reliability studies as well as the breaking strengths of materials in reliability and quality control tests. Weibull distributions are also used to represent various physical quantities, such as wind speed. The Weibull distribution is a family of distributions that can assume the properties of several other distributions. For example, depending on the shape parameter users define, the Weibull distribution can be used to model the exponential and Rayleigh distributions, among others. The Weibull distribution is very flexible. When the Weibull shape parameter is equal to 1.0, the Weibull distribution is identical to the exponential distribution. The Weibull location parameter lets users set up an exponential distribution to start at a location other than 0.0. When the shape parameter is less than 1.0, the Weibull distribution becomes a steeply declining curve. A manufacturer might find this effect useful in describing part failures during a burn-in period.

The mathematical constructs for the Weibull distribution are as follows:

$$f(x) = \frac{\alpha}{\beta}\left[\frac{x}{\beta}\right]^{\alpha-1} e^{-\left(\frac{x}{\beta}\right)^\alpha}$$

$$\text{mean} = \beta\Gamma(1 + \alpha^{-1})$$

$$\text{standard deviation} = \beta^2[\Gamma(1 + 2\alpha^{-1}) - \Gamma^2(1 + \alpha^{-1})]$$

$$\text{skewness} = \frac{2\Gamma^3(1 + \beta^{-1}) - 3\Gamma(1 + \beta^{-1})\Gamma(1 + 2\beta^{-1}) + \Gamma(1 + 3\beta^{-1})}{[\Gamma(1 + 2\beta^{-1}) - \Gamma^2(1 + \beta^{-1})]^{3/2}}$$

$$\text{excess kurtosis} = \frac{-6\Gamma^4(1 + \beta^{-1}) + 12\Gamma^2(1 + \beta^{-1})\Gamma(1 + 2\beta^{-1}) - 3\Gamma^2(1 + 2\beta^{-1}) - 4\Gamma(1 + \beta^{-1})\Gamma(1 + 3\beta^{-1}) + \Gamma(1 + 4\beta^{-1})}{[\Gamma(1 + 2\beta^{-1}) - \Gamma^2(1 + \beta^{-1})]^2}$$

Location (L), shape (α), and scale (β) are the distributional parameters, and Γ is the Gamma function. The input requirements are such that Scale>0 and can be any positive value, Shape≥0.05 and Location can take on any value.

Appendix: Strategic Real Options Models and Equations

This appendix demonstrates the mathematical models and computations used in creating the results for real options, financial options, and employee stock options. The following discussion provides an intuitive look into the binomial lattice methodology. Although knowledge of some stochastic mathematics and Martingale processes is required to fully understand the complexities involved even in a simple binomial lattice, the more important aspect is to understand how a lattice works, intuitively, without the need for complicated math.

There are two sets of key equations to consider when calculating a binomial lattice. These equations consist of an up/down equation (which is simply the discrete simulation's step size in a binomial lattice used in creating a lattice of the underlying asset) and a risk-neutral probability equation (used in valuing a lattice through backward induction). These two sets of equations are consistently applied to all options-based binomial modeling regardless of its complexity. The up step size (u) is shown as $u = e^{\sigma\sqrt{\delta t}}$, and the down step size (d) is shown as $d = e^{-\sigma\sqrt{\delta t}}$, where σ is the volatility of logarithmic cash flow returns and δt is the time-step in a lattice. The risk-neutral probability (p) is shown as $$p = \frac{e^{(rf-b)\delta t} - d}{u - d}$$

where rf is the risk-free rate in percent and b is the continuous dividend payout in percent.

In a stochastic case when uncertainty exists and is built into the model, several methods can be applied, including simulating a Brownian Motion. Starting with an Exponential Brownian Motion where $$\frac{\delta S}{S} = e^{\mu(\delta t) + \sigma\varepsilon\sqrt{\delta t}},$$

we can segregate the process into a deterministic and a stochastic part, where we have $$\frac{\delta S}{S} = e^{\mu(\delta t)} e^{\sigma\varepsilon\sqrt{\delta t}}.$$

The deterministic part of the model ($e^{\mu(\delta t)}$) accounts for the slope or growth rate of the Brownian process. The underlying asset variable (usually denoted S in options modeling)

is the sum of the present values of future free cash flows, which means that the growth rates or slope in cash flows from one period to the next have already been intuitively accounted for in the discounted cash flow analysis. Hence, we only have to account for the stochastic term ($e^{\sigma\epsilon\sqrt{\delta t}}$), which has a highly variable simulated term ($\epsilon$).

The stochastic term ($e^{\sigma\epsilon\sqrt{\delta t}}$) has a volatility component ($\sigma$), a time component ($\delta$), and a simulated component ($\epsilon$). Again, recall that the binomial lattice approach is a discrete simulation model; we no longer need to resimulate at every time period, and the simulated variable ($\epsilon$) drops out. The remaining stochastic term is simply $e^{\sigma\sqrt{\delta t}}$.

Finally, in order to obtain a recombining binomial lattice, the up and down step sizes have to be symmetrical in magnitude. Hence, if we set the up step size as $e^{\sigma\sqrt{\delta t}}$, we can set the down step size as its reciprocal, or $e^{-\sigma\sqrt{\delta t}}$.

Other methods can also be created using similar approaches, such as trinomial, quadranomial, and pentanomial lattices. Building and solving a trinomial lattice is similar to building and solving a binomial lattice, complete with the up/down jumps and risk-neutral probabilities. However, the following recombining trinomial lattice is more complicated to build. The results stemming from a trinomial lattice are the same as those from a binomial lattice at the limit, but the lattice-building complexity is much higher for trinomials or multinomial lattices. Hence, the examples thus far have been focusing on the binomial lattice, due to its simplicity and applicability. It is difficult enough to create a three—time-step trinomial tree manually. Imagine having to keep track of the number of nodes, bifurcations, and which branch recombines with which in a very large lattice. Therefore, computer algorithms are required. The trinomial lattice's equations are specified below:

$$u = e^{\sigma\sqrt{3\delta t}} \text{ and } d = e^{-\sigma\sqrt{3\delta t}}$$

$$p_L = \frac{1}{6} - \sqrt{\frac{\delta t}{12\sigma^2}}\left[r - q - \frac{\sigma^2}{2}\right]$$

$$p_M = \frac{2}{3}$$

$$p_H = \frac{1}{6} + \sqrt{\frac{\delta t}{12\sigma^2}}\left[r - q - \frac{\sigma^2}{2}\right]$$

Another approach that is used in the computation of options is the use of stochastic process simulation, which is a mathematically defined equation that can create a series of outcomes over time, outcomes that are not deterministic in nature. That is, an equation or process that does not follow any simple discernible rule such as price will increase X percent every year or revenues will increase by this factor of X plus Y percent. A stochastic process is by definition nondeterministic, and one can plug numbers into a stochastic process equation and obtain different results every time. For instance, the path of a stock price is stochastic in nature, and one cannot reliably predict the stock price path with any certainty. However, the price evolution over time is enveloped in a process that generates these prices. The process is fixed and predetermined, but the outcomes are not. Hence, by stochastic simulation, we create multiple pathways of prices, obtain a statistical sampling of these simulations, and make inferences on the potential pathways that the actual price may undertake given the nature and parameters of the stochastic process used to generate the time series.

Four basic stochastic processes are discussed herein, including the Geometric Brownian Motion, which is the most common and prevalently used process due to its simplicity and wide-ranging applications. The mean-reversion process, barrier long-run process, and jump-diffusion process are also briefly discussed.

Summary of Mathematical Characteristics of Geometric Brownian Motions

Assume a process X, where $X=[X_t:t\geq 0]$ if and only if $X_t$ is continuous, where the starting point is $X_0=0$, where X is normally distributed with mean zero and variance one or $X \in N(0, 1)$, and where each increment in time is independent of each other previous increment and is itself normally distributed with mean zero and variance t, such that $X_{t+a}-X_t \in N(0, t)$. Then, the process $dX = \alpha X dt + \sigma X dZ$ follows a Geometric Brownian Motion, where $\alpha$ is a drift parameter, $\sigma$ the volatility measure, $dZ = \epsilon_t\sqrt{\Delta t}$ such that ln $$\left[\frac{dX}{X}\right] \in N(\mu, \sigma),$$

or X and dX are lognormally distributed. If at time zero, $X(0)=0$, then the expected value of the process X at any time t is such that $E[X(t)]=X_0 e^{\alpha t}$, and the variance of the process X at time t is $V[X(t)]=X_0^2 e^{2\alpha t}(e^{\sigma^2 t}-1)$. In the continuous case where there is a drift parameter $\alpha$; the expected value then becomes $$E\left[\int_0^\infty X(t)e^{-rt}dt\right] = \int_0^\infty X_0 e^{-(r-\alpha)t} dt = \frac{X_0}{(r-\alpha)}.$$

Summary of Mathematical Characteristics of Mean-Reversion Processes

If a stochastic process has a long-run attractor such as a long-run production cost or long-run steady state inflationary price level, then a mean-reversion process is more likely. The process reverts to a long-run average such that the expected value is $E[X_t]=\overline{X}+(X_0-\overline{X})e^{-\eta t}$ and the variance is $$V[X_t - \overline{X}] = \frac{\sigma^2}{2\eta(1 - e^{-2\eta t})}.$$

The special circumstance that becomes useful is that in the limiting case when the time change becomes instantaneous or when $dt \to 0$, we have the condition where $X_t - X_{t-1} = \overline{X}(1-e^{-\eta})+X_{t-1}(e^{-\eta}-1)+\epsilon_t$, which is the first order autoregressive process, and $\eta$ can be tested econometrically in a unit root context.

Summary of Mathematical Characteristics of Barrier Long-Run Processes

This process is used when there are natural barriers to prices—for example, floors or caps—or when there are physical constraints like the maximum capacity of a manufacturing plant. If barriers exist in the process, where we define $\overline{X}$ as the upper barrier and $\underline{X}$ as the lower barrier, we have a process where $$X(t) = \frac{2\alpha}{\sigma^2} \frac{e^{\frac{2\alpha X}{\sigma^2}}}{e^{\frac{2\alpha \overline{X}}{\sigma^2}} - e^{\frac{2\alpha \underline{X}}{\sigma^2}}}.$$

Summary of Mathematical Characteristics of Jump-Diffusion Processes

Start-up ventures and research and development initiatives usually follow a jump-diffusion process. Business operations may be status quo for a few months or years, and then a product or initiative becomes highly successful and takes off. An initial public offering of equities, oil price jumps, and price of electricity are textbook examples of this circumstance. Assuming that the probability of the jumps follows a Poisson distribution, we have a process dX=ƒ(X, t)dt+g(X,t)dq, where the functions ƒ and g are known and where the probability process is $$dq = \begin{cases} 0 & \text{with } P(X) = 1 - \lambda dt \\ \mu & \text{with } P(X) = Xdt \end{cases}.$$

The other approach applied in the present invention is the Black-Scholes-Merton model. The model is detailed below, where we have the following definitions of variables:

S present value of future cash flows ($)
X implementation cost ($)
r risk-free rate (%)
T time to expiration (years)
σ a volatility (%)
Φ cumulative standard-normal distribution $$\text{Call} = S\Phi\left(\frac{\ln(S/X) + (r + \sigma^2/2)T}{\sigma\sqrt{T}}\right) - Xe^{-rT}\Phi\left(\frac{\ln(S/X) + (r - \sigma^2/2)T}{\sigma\sqrt{T}}\right)$$

$$\text{Put} =$$

$$Xe^{-rT}\Phi\left(-\left[\frac{\ln(S/X) + (r - \sigma^2/2)T}{\sigma\sqrt{T}}\right]\right) - S\Phi\left(-\left[\frac{\ln(S/X) + (r + \sigma^2/2)T}{\sigma\sqrt{T}}\right]\right)$$

Options Execution Types

American Options can be executed at any time up to and including the maturity date.

European Options can be executed only at one point in time, the maturity date.

Bermudan Options can be executed at certain times and can be considered a hybrid of American and European Options. There is typically a blackout or vesting period when the option cannot be executed, but starting from the end of the blackout vesting date to the option's maturity, the option can be executed.

Option to Wait and Execute

Buy additional time to wait for new information by pre-negotiating pricing and other contractual terms to obtain the option but not the obligation to purchase or execute something in the future should conditions warrant it (wait and see before executing).

Run a Proof of Concept first to better determine the costs and schedule risks of a project versus jumping in right now and taking the risk.

Build, Buy, or Lease. Developing internally or using commercially available technology or products.

Multiple Contracts in place that may or may not be executed.

Market Research to obtain valuable information before deciding.

Venture Capital small seed investment with right of first refusal before executing large-scale financing.

Relative values of Strategic Analysis of Alternatives or Courses of Action while considering risk and the Value of Information.

Contract Negotiations with vendors, acquisition strategy with industrial-based ramifications (competitive sustainment and strategic capability and availability).

Project Evaluation and Capability ROI modeling.

Capitalizing on other opportunities while reducing large-scale implementation risks, and determining the value of Research & Development (parallel implementation of alternatives while waiting on technical success of the main project, and no need to delay the project because of one bad component in the project).

Low Rate Initial Production, Prototyping, Advanced Concept Technology Demonstration before full-scale implementation.

Right of First Refusal contracts.

Value of Information by forecasting cost inputs, capability, schedule, and other metrics.

Hedging and Call- and Put-like options to execute something in the future with agreed upon terms now, OTC Derivatives (Price, Demand, Forex, Interest Rate forwards, futures, options, swaptions for hedging).

Option to Abandonment

Hedge downside risks and losses by being able to salvage some value of a failed project or asset that is out-of-the-money (sell intellectual property and assets, abandon and walk away from a project, buyback/sellback provisions).

Exit and Salvage assets and intellectual property to reduce losses.

Divestiture and Spin-off.

Buyback Provisions in a contract.

Stop and Abandon before executing the next phase.

Termination for Convenience.

Early Exit and Stop Loss Provisions in a contract.

Option to Expand

Take advantage of upside opportunities by having existing platform, structure, or technology that can be readily expanded (utility peaking plants, larger oil platforms, early/leapfrog technology development, larger capacity or technology-in-place for future expansion).

Platform Technologies.

Mergers and Acquisitions.

Built-in Expansion Capabilities.

Geographical, Technological, and Market Expansion.

Foreign Military Sales.

Reusability and Scalability.

Option to Contract

Reduce downside risk but still participate in reduced benefits (counterparty takes over or joins in some activities to share profits; at the same time reduce the firm's risk of failure or severe losses in a risky but potentially profitable venture).

Outsourcing, Alliances, Contractors, Leasing.

Joint Venture.

Foreign Partnerships.

Co-Development and Co-Marketing.

Portfolio Options

Combinations of options and strategic flexibility within a portfolio of nested options (path dependencies, mutually exclusive/inclusive, nested options).

Determining the portfolio of projects' capabilities to develop and field within Budget and Time Constraints, and what new Product Configurations to develop or acquire to field certain capabilities.

Allows for different Flexible Pathways: Mutually Exclusive (P1 or P2 but not both), Platform/Prerequisite Technology (P3 requires P2, but P2 can be stand-alone; expensive and worth less if considered by itself without accounting for flexibility downstream options it provides for in the next phase), expansion options, abandonment options, or parallel development or simultaneous compound options.

Determining the Optimal Portfolios given budget scenarios that provide the maximum capability, flexibility, and cost effectiveness with minimal risks.

Determining testing required in Modular Systems, meantime-to-failure estimates, and Replacement and Redundancy requirements.

Relative value of strategic Flexibility Options (options to Abandon, Choose, Contract, Expand, Switch, and Sequential Compound Options, Barrier Options, and many other types of Exotic Options).

Maintaining Capability and Readiness Levels.

Product Mix, Inventory Mix, Production Mix.

Capability Selection and Sourcing.

Sequential Options

Significant value exists if you can phase out investments over time, thereby reducing the risk of a one-time up-front investment (pharmaceutical and high technology development and manufacturing usually comes in phases or stages).

Stage-gate implementation of high-risk project development, prototyping, low-rate initial production, technical feasibility tests, technology demonstration competitions.

Government contracts with multiple stages with the option to abandon at any time and valuing Termination for Convenience, and built-in flexibility to execute different courses of action at specific stages of development.

P3I, Milestones, R&D, and Phased Options.

Platform technology.

Options to Switch

Ability to choose among several options, thereby improving strategic flexibility to maneuver within the realm of uncertainty (maintain a foot in one door while exploring another to decide if it makes sense to switch or stay put).

Ability to Switch among various raw input materials to use when prices of each raw material fluctuates significantly.

Readiness and capability risk mitigation by switching vendors in an Open Architecture through Multiple Vendors and Modular Design.

Other Types of Real Options

Barrier Options, Custom Options, Simultaneous Compound Option, Employee Stock Options, Exotic Options, Options Embedded Contracts, Options with Blackout/Vesting Provisions, Options with Market and Change of Control Provisions, and many others!

Options Input Assumptions

Asset Value. This is the underlying asset value before implementation costs. You can compute it by taking the NPV and adding back the sum of the present values of capital investments.

Implementation Cost. This is the cost to execute the option (typically this is the cost to execute an option to wait or an option to expand).

Volatility. This is the annualized volatility (a measure of risk and uncertainty, denoted as a value in percent) of the underlying asset.

Maturity. This is the maturity of the option, denoted in years (e.g., a two and a half year option life can be entered as 2.5).

Risk-free Rate. This is the interest rate yield on a risk-free government bond with maturity commensurate to that of the option.

Dividend Rate. The annualized opportunity cost of not executing the option, as a percentage of the underlying asset.

Lattice Steps. The number of binomial or multinomial lattice steps to run in the model. The typical number we recommend is between 100 and 1,000, and you can check for convergence of the results. The larger the number of lattice steps, the higher the level of convergence and granularity (i.e., the number of decimal precision).

Blackout Year. The vesting period entered in years, during which the option cannot be executed (European), but the option converts to an American on the date of this vesting period through to its maturity.

Maturity of Phases. These are the number of years to the end of each phase in a sequential compound option model.

Cost to Implement Phases. These are the costs to execute each of the subsequent phases in a sequential compound option, and they can be set to zero or a positive value.

Expansion Factor. The relative ratio increase in the underlying asset when the option to expand is executed (typically this is greater than 1).

Contraction Factor. The relative ratio reduction in the underlying asset when the option to contract is executed (typically this is less than 1).

Savings. The net savings received by contracting operations.

Salvage. The net sales amount after expenses of abandoning an asset.

Barrier. The upper or lower barrier of an option whereupon if the underlying asset breaches this barrier, the option becomes either live or worthless, depending on the option type modeled.

Appendix: Forecasting and Econometric Modeling

This appendix demonstrates the mathematical models and computations used in creating the general regression equations, which take the form of $Y=\beta_0+\beta_1X_1+\beta_2X_2+\ldots+\beta_nX_n+\epsilon$ where $\beta_0$ is the intercept, $\beta_i$ are the slope coefficients, and $\epsilon$ is the error term. The Y term is the dependent variable and the X terms are the independent variables, where these X variables are also known as the regressors. The dependent variable is named as such as it depends on the independent variable; for example, sales revenue depends on the amount of marketing costs expended on a product's advertising and promotion, making the dependent variable sales and the independent variable marketing costs. An example of a bivariate regression where there is only a single Y and a single X variable is seen as simply inserting the best-fitting line through a set of data points in a two-dimensional plane. In other cases, a multivariate regression can be performed, where there are multiple or k number of independent X variables or regressors where in this case the best-fitting line will be within a k+1 dimensional plane.

Fitting a line through a set of data points in a multidimensional scatter plot may result in numerous possible lines. The best-fitting line is defined as the single unique line that minimizes the total vertical errors, that is, the sum of the absolute distances between the actual data points ($Y_i$) and the estimated line ($\hat{Y}$) To find the best-fitting unique line that minimizes the errors, a more sophisticated approach is applied, using multivariate regression analysis. Regression analysis therefore finds the unique best-fitting line by requiring that the total errors be minimized, or by calculating:

$$\text{Min} \sum_{i=1}^{n} (Y_i - \hat{Y}_i)^2$$

Only one unique line will minimize this sum of squared errors as shown in the equation above. The errors (vertical distances between the actual data and the predicted line) are squared to avoid the negative errors from canceling out the positive errors. Solving this minimization problem with respect to the slope and intercept requires calculating first derivatives and setting them equal to zero:

$$\frac{d}{d\beta_0} \sum_{i=1}^{n} (Y_i - \hat{Y}_i)^2 = 0 \text{ and}$$

$$\frac{d}{d\beta_1} \sum_{i=1}^{n} (Y_i - \hat{Y}_i)^2 = 0$$

which yields the simple bivariate regression's set of least squares equations:

$$\beta_1 = \frac{\sum_{i=1}^{n}(X_i - \overline{X})(Y_i - \overline{Y})}{\sum_{i=1}^{n}(X_i - \overline{X})^2} = \frac{\sum_{i=1}^{n} X_i Y_i - \frac{\sum_{i=1}^{n} X_i \sum_{i=1}^{n} Y_i}{n}}{\sum_{i=1}^{n} X_i^2 - \frac{\left(\sum_{i=1}^{n} X_i\right)^2}{n}}$$

$$\beta_0 = \overline{Y} - B_1 \overline{X}$$

For multivariate regression, the analogy is expanded to account for multiple independent variables, where $Y_i = \beta_1 + \beta_2 X_{2,i} + \beta_3 X_{3,i} + \epsilon_i$, and the estimated slopes can be calculated by:

$$\hat{\beta}_2 = \frac{\sum Y_i X_{2,i} \sum X_{3,i}^2 - \sum Y_i X_{3,i} \sum X_{2,i} X_{3,i}}{\sum X_{2,i}^2 \sum X_{3,i}^2 - (\sum X_{2,i} X_{3,i})^2}$$

$$\hat{\beta}_3 = \frac{\sum Y_i X_{3,i} \sum X_{2,i}^2 - \sum Y_i X_{2,i} \sum X_{2,i} X_{3,i}}{\sum X_{2,i}^2 \sum X_{3,i}^2 - (\sum X_{2,i} X_{3,i})^2}$$

This set of results can be summarized using matrix notations: $[X'X]^{-1}[X'Y]$.

In running multivariate regressions, great care must be taken to set up and interpret the results. For instance, a good understanding of econometric modeling is required (e.g., identifying regression pitfalls such as structural breaks, multicollinearity, heteroskedasticity, autocorrelation, specification tests, nonlinearities, etc.) before a proper model can be constructed. Therefore the present invention includes some advanced econometrics approaches that are based on the principles of multiple regression outlined above.

One approach used is that of an Auto-ARIMA, which is based on the fundamental concepts of ARIMA theory or Autoregressive Integrated Moving Average models. ARIMA (p,d,q) models are the extension of the AR model that uses three components for modeling the serial correlation in the time-series data. The first component is the autoregressive (AR) term. The AR(p) model uses the p lags of the time series in the equation. An AR(p) model has the form: y(t)=a(1) y(t−1)+ . . . +a(p) y(t−p)+e(t). The second component is the integration (d) order term. Each integration order corresponds to differencing the time series. I(1) means differencing the data once. I(d) means differencing the data d times. The third component is the moving average (MA) term. The MA(q) model uses the q lags of the forecast errors to improve the forecast. An MA(q) model has the form: y(t)=e(t)+b(1) e(t−1)+ . . . +b(q) e(t−q). Finally, an ARMA (p,q) model has the combined form: y(t)=a(1) y(t−1)+ . . . +a(p) y(t−p)+e(t)+b(1) e(t−1)+ . . . +b(q) e(t−q) . . . . Using this ARIMA concept, various combinations of p, d, q integers are tested in an automated and systematic fashion to determine the best-fitting model for the user's data.

In order to determine the best fitting model, we apply several goodness-of-fit statistics to provide a glimpse into the accuracy and reliability of the estimated regression model. They usually take the form of a t-statistic, F-statistic, R-squared statistic, adjusted R-squared statistic, Durbin-Watson statistic, Akaike Criterion, Schwarz Criterion, and their respective probabilities.

The R-squared ($R^2$), or coefficient of determination, is an error measurement that looks at the percent variation of the dependent variable that can be explained by the variation in the independent variable for a regression analysis. The coefficient of determination can be calculated by:

$$R^2 = 1 - \frac{\sum_{i=1}^{n}(Y_i - \hat{Y}_i)^2}{\sum_{i=1}^{n}(Y_i - \overline{Y})^2} = 1 - \frac{SSE}{TSS}$$

where the coefficient of determination is one less the ratio of the sums of squares of the errors (SSE) to the total sums of squares (TSS). In other words, the ratio of SSE to TSS is the unexplained portion of the analysis; thus, one less the ratio of SSE to TSS is the explained portion of the regression analysis.

The estimated regression line is characterized by a series of predicted values ($\hat{Y}$) the average value of the dependent variable's data points is denoted $\overline{Y}$; and the individual data points are characterized by $Y_i$. Therefore, the total sum of squares, that is, the total variation in the data or the total variation about the average dependent value, is the total of the difference between the individual dependent values and its average (the total squared distance of $Y_i - \overline{Y}$). The explained sum of squares, the portion that is captured by the regression analysis, is the total of the difference between the regression's predicted value and the average dependent variable's dataset (seen as the total squared distance of $\hat{Y} - \overline{Y}$). The difference between the total variation (TSS) and the explained variation (ESS) is the unexplained sums of squares, also known as the sums of squares of the errors (SSE).

Another related statistic, the adjusted coefficient of determination, or the adjusted R-squared ($\overline{R}^2$), corrects for the number of independent variables (k) in a multivariate regression through a degrees of freedom correction to provide a more conservative estimate:

$$\overline{R}^2 = 1 - \frac{\sum_{i=1}^{n}(Y_i - \hat{Y}_i)^2 / (k-2)}{\sum_{i=1}^{n}(Y_i - \overline{Y})^2 / (k-1)} = 1 - \frac{SSE/(k-2)}{TSS/(k-1)}$$

The adjusted R-squared should be used instead of the regular R-squared in multivariate regressions because every time an independent variable is added into the regression analysis, the R-squared will increase, indicating that the percent variation explained has increased. This increase occurs even when nonsensical regressors are added. The adjusted R-squared takes the added regressors into account and penalizes the regression accordingly, providing a much better estimate of a regression model's goodness-of-fit.

Other goodness-of-fit statistics include the t-statistic and the F-statistic. The former is used to test if each of the estimated slope and intercept(s) is statistically significant, that is, if it is statistically significantly different from zero (therefore making sure that the intercept and slope estimates are statistically valid). The latter applies the same concepts but simultaneously for the entire regression equation including the intercept and slopes. Using the previous example, the following illustrates how the t-statistic and F-statistic can be used in a regression analysis.

When running the Autoeconometrics methodology, multiple regression issues and errors are first tested for. These include items such as heteroskedasticity, multicollinearity, micronumerosity, lags, leads, autocorrelation, and others. For instance, several tests exist to test for the presence of heteroskedasticity. These tests also are applicable for testing misspecifications and nonlinearities. The simplest approach is to graphically represent each independent variable against the dependent variable as illustrated earlier. Another approach is to apply one of the most widely used models, the White's test, where the test is based on the null hypothesis of no heteroskedasticity against an alternate hypothesis of heteroskedasticity of some unknown general form. The test statistic is computed by an auxiliary or secondary regression, where the squared residuals or errors from the first regression are regressed on all possible (and nonredundant) cross products of the regressors. For example, suppose the following regression is estimated:

$$Y = \beta_0 + \beta_1 X + \beta_2 Z + \epsilon_i$$

The test statistic is then based on the auxiliary regression of the errors ($\epsilon$):

$$\epsilon_t^2 = \alpha_0 + \alpha_1 X + \alpha_2 Z + \alpha_3 X^2 + \alpha_4 Z^2 + \alpha_5 XZ + v_t$$

The $nR^2$ statistic is the White's test statistic, computed as the number of observations (n) times the centered R-squared from the test regression. White's test statistic is asymptotically distributed as a $\chi^2$ with degrees of freedom equal to the number of independent variables (excluding the constant) in the test regression.

The White's test is also a general test for model misspecification, because the null hypothesis underlying the test assumes that the errors are both homoskedastic and independent of the regressors, and that the linear specification of the model is correct. Failure of any one of these conditions could lead to a significant test statistic. Conversely, a non-significant test statistic implies that none of the three conditions is violated. For instance, the resulting F-statistic is an omitted variable test for the joint significance of all cross products, excluding the constant.

One method to fix heteroskedasticity is to make it homoskedastic by using a weighted least squares (WLS) approach. For instance, suppose the following is the original regression equation:

$$Y = \beta_0 + \beta_1 X_1 + \beta_2 X_2 + \beta_3 X_3 + \epsilon$$

Further suppose that $X_2$ is heteroskedastic. Then transform the data used in the regression into:

$$Y = \frac{\beta_0}{X_2} + \beta_1 \frac{X_1}{X_2} + \beta_2 + \beta_3 \frac{X_3}{X_2} + \frac{\epsilon}{X_2}$$

The model can be redefined as the following WLS regression:

$$Y_{WLS} = \beta_0^{WLS} + \beta_1^{WLS} X_1 + \beta_2^{WLS} X_2 + \beta_3^{WLS} X_3 + v$$

Alternatively, the Park's test can be applied to test for heteroskedasticity and to fix it. The Park's test model is based on the original regression equation, uses its errors, and creates an auxiliary regression that takes the form of:

$$\ln e_i^2 = \beta_1 + \beta_2 \ln X_{k,i}$$

Suppose $\beta_2$ is found to be statistically significant based on a t-test, then heteroskedasticity is found to be present in the variable $X_{k,i}$. The remedy, therefore, is to use the following regression specification:

$$\frac{Y}{\sqrt{X_k^{\beta_2}}} = \frac{\beta_1}{\sqrt{X_k^{\beta_2}}} + \frac{\beta_2 X_2}{\sqrt{X_k^{\beta_2}}} + \frac{\beta_3 X_3}{\sqrt{X_k^{\beta_2}}} + \epsilon$$

Multicollinearity exists when there is a linear relationship between the independent variables. When this occurs, the regression equation cannot be estimated at all. In near collinearity situations, the estimated regression equation will be biased and provide inaccurate results. This situation is especially true when a stepwise regression approach is used, where the statistically significant independent variables will be thrown out of the regression mix earlier than expected, resulting in a regression equation that is neither efficient nor accurate.

As an example, suppose the following multiple regression analysis exists, where $$Y_i = \beta_1 + \beta_2 X_{2,i} + \beta_3 X_{3,i} + \epsilon_i$$

The estimated slopes can be calculated through:

$$\hat{\beta}_2 = \frac{\sum Y_i X_{2,i} \sum X_{3,i}^2 - \sum Y_i X_{3,i} \sum X_{2,i} X_{3,i}}{\sum X_{2,i}^2 \sum X_{3,i}^2 - (\sum X_{2,i} X_{3,i})^2}$$

$$\hat{\beta}_3 = \frac{\sum Y_i X_{3,i} \sum X_{2,i}^2 - \sum Y_i X_{2,i} \sum X_{2,i} X_{3,i}}{\sum X_{2,i}^2 \sum X_{3,i}^2 - (\sum X_{2,i} X_{3,i})^2}$$

Now suppose that there is perfect multicollinearity, that is, there exists a perfect linear relationship between $X_2$ and $X_3$, such that $X_{3,i} = \lambda X_{2,i}$ for all positive values of $\lambda$. Substituting this linear relationship into the slope calculations for $\beta_2$, the result is indeterminate. In other words, we have:

$$\hat{\beta}_2 = \frac{\sum Y_i X_{2,i} \sum \lambda^2 X_{2,i}^2 - \sum Y_i \lambda X_{2,i} \sum \lambda X_{2,i}^2}{\sum X_{2,i}^2 \sum \lambda^2 X_{2,i}^2 - (\sum \lambda X_{2,i}^2)^2} = \frac{0}{0}$$

The same calculation and results apply to $\beta_3$, which means that the multiple regression analysis breaks down and cannot be estimated given a perfect collinearity condition.

One quick test of the presence of multicollinearity in a multiple regression equation is that the R-squared value is relatively high while the t-statistics are relatively low. Another quick test is to create a correlation matrix between the independent variables. A high cross correlation indicates a potential for multicollinearity. The rule of thumb is that a correlation with an absolute value greater than 0.75 is indicative of severe multicollinearity.

Another test for multicollinearity is the use of the variance inflation factor (VIF), obtained by regressing each independent variable to all the other independent variables, obtaining the R-squared value and calculating the VIF of that variable by estimating:

$$VIF_i = \frac{1}{(1-R_i^2)}$$

A high VIF value indicates a high R-squared near unity. As a rule of thumb, a VIF value greater than 10 is usually indicative of destructive multicollinearity. The Autoeconometrics method computes for multicollinearity and corrects the data before running the next iteration when enumerating through the entire set of possible combinations and permutations of models.

One simple approach to test for autocorrelation is to graph the time series of a regression equation's residuals. If these residuals exhibit some cyclicality, then autocorrelation exists. Another more robust approach to detect autocorrelation is the use of the Durbin-Watson statistic, which estimates the potential for a first-order autocorrelation. The Durbin-Watson test also identifies model misspecification, that is, if a particular time-series variable is correlated to itself one period prior. Many time-series data tend to be autocorrelated to their historical occurrences. This relationship can be due to multiple reasons, including the variables' spatial relationships (similar time and space), prolonged economic shocks and events, psychological inertia, smoothing, seasonal adjustments of the data, and so forth.

The Durbin-Watson statistic is estimated by the ratio of sum of the squares of the regression errors for one period prior to the sum of the current period's errors:

$$DW = \frac{\sum (\varepsilon_t - \varepsilon_{t-1})^2}{\sum \varepsilon_t^2}$$

There is a Durbin-Watson critical statistic table at the end of the book that provides a guide as to whether a statistic implies any autocorrelation.

Another test for autocorrelation is the Breusch-Godfrey test, where for a regression function in the form of:

$$Y = f(X_1, X_2, \ldots, X_k)$$

Estimate this regression equation and obtain its errors t. Then, run the secondary regression function in the form of:

$$Y = f(X_1, X_2, \ldots, X_k, \varepsilon_{t-1}, \varepsilon_{t-2}, \varepsilon_{t-p})$$

Obtain the R-squared value and test it against a null hypothesis of no autocorrelation versus an alternate hypothesis of autocorrelation, where the test statistic follows a Chi-Square distribution of p degrees of freedom:

$$R^2(n-p) \sim \chi_{df=p}^2$$

Fixing autocorrelation requires the application of advanced econometric models including the applications of ARIMA (as described above) or ECM (Error Correction Models). However, one simple fix is to take the lags of the dependent variable for the appropriate periods, add them into the regression function, and test for their significance. For instance:

$$Y_t = f(Y_{t-1}, Y_{t-2}, \ldots, Y_{t-p}, X_1, X_2, \ldots, X_k)$$

In interpreting the results of an Autoeconometrics model, most of the specifications are identical to the multivariate regression analysis. However, there are several additional sets of results specific to the econometric analysis. The first is the addition of Akaike Information Criterion (AIC) and Schwarz Criterion (SC), which are often used in ARIMA model selection and identification. That is, AIC and SC are used to determine if a particular model with a specific set of p, d, and q parameters is a good statistical fit. SC imposes a greater penalty for additional coefficients than the AIC but, generally, the model with the lowest AIC and SC values should be chosen. Finally, an additional set of results called the autocorrelation (AC) and partial autocorrelation (PAC) statistics are provided in the ARIMA report.

As an illustrative example, if autocorrelation AC(1) is nonzero, it means that the series is first-order serially correlated. If AC dies off more or less geometrically with increasing lags, it implies that the series follows a low-order autoregressive process. If AC drops to zero after a small number of lags, it implies that the series follows a low-order moving-average process. In contrast, PAC measures the correlation of values that are k periods apart after removing the correlation from the intervening lags. If the pattern of autocorrelation can be captured by an autoregression of order less than k, then the partial autocorrelation at lag k will be close to zero. The Ljung-Box Q-statistics and their p-values at lag k are also provided, where the null hypothesis being tested is such that there is no autocorrelation up to order k. The dotted lines in the plots of the autocorrelations are the approximate two standard error bounds. If the autocorrelation is within these bounds, it is not significantly different from zero at approximately the 5% significance level. Finding the right ARIMA model takes practice and experience. These AC, PAC, SC, and AIC are highly useful diagnostic tools to help identify the correct model specification. Finally, the ARIMA parameter results are obtained using sophisticated optimization and iterative algorithms, which means that although the functional forms look like those of a multivariate regression, they are not the same. ARIMA is a much more computationally intensive and advanced econometric approach.

Descriptive Statistics

Most distributions can be described within four moments (some distributions require one moment, while others require two moments, etc.). Descriptive statistics quantitatively captures these moments. The first moment describes the location of a distribution (i.e., mean, median, and mode) and is interpreted as the expected value, expected returns, or the average value of occurrences.

The second moment measures a distribution's spread, or width, and is frequently described using measures such as Standard Deviations, Variances, Quartiles, and Inter-Quartile Ranges. Standard deviation is a popular measure indicating the average deviation of all data points from their mean. It is a popular measure as it is frequently associated with risk (higher standard deviations meaning a wider distribution, higher risk, or wider dispersion of data points around the mean value) and its units are identical to the units in the original dataset.

Skewness is the third moment in a distribution. Skewness characterizes the degree of asymmetry of a distribution around its mean. Positive skewness indicates a distribution with an asymmetric tail extending toward more positive values. Negative skewness indicates a distribution with an asymmetric tail extending toward more negative values.

Kurtosis characterizes the relative peakedness or flatness of a distribution compared to the normal distribution. It is the fourth moment in a distribution. A positive kurtosis value indicates a relatively peaked distribution. A negative kurtosis indicates a relatively flat distribution. The kurtosis measured here has been centered to zero (certain other kurtosis measures are centered on 3.0). While both are equally valid, centering across zero makes the interpretation simpler. A high positive kurtosis indicates a peaked distribution around its center and leptokurtic or fat tails. This indicates a higher probability of extreme events (e.g., catastrophic events, terrorist attacks, stock market crashes) than is predicted in a normal distribution.

Correlation Matrix

According to an embodiment of the present invention, the Correlation module lists the Pearson's product moment correlations (commonly referred to as the Pearson's R) between variable pairs. The correlation coefficient ranges between −1.0 and +1.0 inclusive. The sign indicates the direction of association between the variables, while the coefficient indicates the magnitude or strength of association. The Pearson's R only measures a linear relationship and is less effective in measuring nonlinear relationships.

A hypothesis t-test is performed on the Pearson's R and the p-values are reported. If the calculated p-value is less than or equal to the significance level used in the test, then reject the null hypothesis and conclude that there is a significant correlation between the two variables in question. Otherwise, the correlation is not statistically significant.

Finally, a Spearman Rank-Based Correlation is also included. The Spearman's R first ranks the raw data then performs the correlation calculation, which allows it to better capture nonlinear relationships. The Pearson's R is a parametric test and the underlying data is assumed to be normally distributed, hence, the t-test can be applied. However, the Spearman's R is a nonparametric test, where no underlying distributions are assumed, and, hence, the t-test cannot be applied.

Variance-Covariance Matrix

The Covariance measures the average of the products of deviations for each data point pair. Use covariance to determine the relationship between two variables. The covariance is related to the correlation in that the correlation is the covariance divided by the product of the two variables' standard deviation, standardizing the correlation measurement to be unitless and between −1 and +1.

Covariance is used when the units of the variables are similar, allowing for easy comparison of the magnitude of variability about their respective means. The covariance of the same variable is also known as the variance. The variance of a variable is the square of its standard deviation. This is why standardizing the variance through dividing it by the variable's standard deviation (twice) yields a correlation of 1.0, indicating that a variable is perfectly correlated to itself.

It must be stressed that a high covariance does not imply causation. Associations between variables in no way imply that the change of one variable causes another variable to change. Two variables that are moving independently of each other but in a related path may have a high covariance but their relationship might be spurious. In order to capture this relationship, use regression analysis instead.

Basic Statistics

According to an embodiment of the present invention, the following basic statistical functions are also included in PEAT's Forecast Statistics module and their short definitions are listed below:

Absolute Values: Computes the absolute value of a number where it is the number without its sign.

Average: Computes the average or arithmetic mean of the rows of data for the selected variable.

Count: Computes how many numbers there are in the rows of data for the selected variable.

Difference: Computes the difference of the current period from the previous period.

Lag: Returns the value lagged some number of periods (the entire chronological dataset is shifted down the number of lagged periods specified).

Lead: Returns the value leading by some number of periods (the entire chronological dataset is shifted up the number of lead periods specified).

LN: Computes the natural logarithm.

Log: Computes the logarithmic value of some specified base.

Max: Computes the maximum of the rows of data for the selected variable.

Median: Computes the median of the rows of data for the selected variable.

Min: Computes the minimum of the rows of data for the selected variable.

Mode: Computes the mode, or most frequently occurring, of data points for the selected variable.

Power: Computes the result of a number raised to a specified power.

Rank Ascending: Ranks the rows of data for the selected variable in ascending order.

Rank Descending: Ranks the rows of data for the selected variable in descending order.

Relative LN Returns: Computes the natural logarithm of the relative returns from one period to another, where the relative return is computed as the current value divided by its previous value.

Relative Returns: Computes the relative return where the current value is divided by its previous value.

Semi-Standard Deviation (Lower): Computes the sample standard deviation of data points below a specified value.

Semi-Standard Deviation (Upper): Computes the sample standard deviation of data points above a specified value.

Standard Deviation: Computes the standard deviation of the rows of data for the selected variable.

Variance: Computes the variance of the rows of data for the selected variable.

One of ordinary skill the art would appreciated that more or less basic statistical functions are could be included in PEAT's Forecast Statistics module, and embodiments of the present invention are contemplated for use with such basic statistical function.

Hypothesis Tests: Parametric Models

One-Variable Testing for Means (T-Test)

This one-variable t-test of means is appropriate when the population standard deviation is not known but the sampling distribution is assumed to be approximately normal (the t-test is used when the sample size is less than 30). This t-test can be applied to three types of hypothesis tests to be examined—a two-tailed test, a right-tailed test, and a left-tailed test—based on the sample dataset if the population mean is equal to, less than, or greater than the hypothesized mean.

If the calculated p-value is less than or equal to the significance level in the test, then reject the null hypothesis and conclude that the true population mean is not equal to (two-tailed test), less than (left-tailed test), or greater than (right-tailed test) the hypothesized mean based on the sample tested. Otherwise, the true population mean is statistically similar to the hypothesized mean.

One-Variable Testing for Means (Z-Test)

The one-variable Z-test is appropriate when the population standard deviation is known and the sampling distribution is assumed to be approximately normal (this applies when the number of data points exceeds 30). This Z-test can be applied to three types of hypothesis tests to be examined—a two-tailed test, a right-tailed test, and a left-tailed test—based on the sample dataset if the population mean is equal to, less than, or greater than the hypothesized mean.

If the calculated p-value is less than or equal to the significance level in the test, then reject the null hypothesis and conclude that the true population mean is not equal to (two-tailed test), less than (left-tailed test), or greater than (right-tailed test) the hypothesized mean based on the sample tested. Otherwise, the true population mean is statistically similar to the hypothesized mean.

One-Variable Testing for Proportions (Z-Test)

The one-variable Z-test for proportions is appropriate when the sampling distribution is assumed to be approximately normal (this applies when the number of data points exceeds 30, and when the number of data points, N, multiplied by the hypothesized population proportion mean, P, is greater than or equal to five, or NP≥5). The data used in the analysis have to be proportions and be between 0 and 1. This Z-test can be applied to three types of hypothesis tests to be examined—a two-tailed test, a right-tailed test, and a left-tailed test—based on the sample dataset if the population mean is equal to, less than, or greater than the hypothesized mean.

If the calculated p-value is less than or equal to the significance level in the test, then reject the null hypothesis and conclude that the true population mean is not equal to (two-tailed test), less than (left-tailed test), or greater than (right-tailed test) the hypothesized mean based on the sample tested. Otherwise, the true population mean is statistically similar to the hypothesized mean.

Two Variables with Dependent Means (T-Test)

The two-variable dependent t-test is appropriate when the population standard deviation is not known but the sampling distribution is assumed to be approximately normal (the t-test is used when the sample size is less than 30). In addition, this test is specifically formulated for testing the same or similar samples before and after an event (e.g., measurements taken before a medical treatment are compared against those measurements taken after the treatment to see if there is a difference). This t-test can be applied to three types of hypothesis tests: a two-tailed test, a right-tailed test, and a left-tailed test.

As an illustrative example, suppose that a new heart medication was administered to 100 patients (N=100) and the heart rates before and after the medication was administered were measured. The two dependent variables t-test can be applied to determine if the new medication is effective by testing to see if there are statistically different "before and after" averages. The dependent variables test is used here because there is only a single sample collected (the same patients' heartbeats were measured before and after the new drug administration).

The two-tailed null hypothesis tests that the true population's mean of the difference between the two variables is zero, versus the alternate hypothesis that the difference is statistically different from zero. The right-tailed null hypothesis test is such that the difference in the population means (first mean less second mean) is statistically less than or equal to zero (which is identical to saying that mean of the first sample is less than or equal to the mean of the second sample). The alternative hypothesis is that the real populations' mean difference is statistically greater than zero when tested using the sample dataset (which is identical to saying that the mean of the first sample is greater than the mean of the second sample). The left-tailed null hypothesis test is such that the difference in the population means (first mean less second mean) is statistically greater than or equal to zero (which is identical to saying that the mean of the first sample is greater than or equal to the mean of the second sample). The alternative hypothesis is that the real populations' mean difference is statistically less than zero when tested using the sample dataset (which is identical to saying that the mean of the first sample is less than the mean of the second sample).

If the calculated p-value is less than or equal to the significance level in the test, then reject the null hypothesis and conclude that the true population difference of the population means is not equal to (two-tailed test), less than (left-tailed test), or greater than (right-tailed test) zero based on the sample tested. Otherwise, the true population mean is statistically similar to the hypothesized mean.

Two (Independent) Variables with Equal Variances (T-Test)

The two-variable t-test with equal variances is appropriate when the population standard deviation is not known but the sampling distribution is assumed to be approximately normal (the t-test is used when the sample size is less than 30). In addition, the two independent samples are assumed to have similar variances.

For illustrative purposes, suppose that a new engine design is tested against an existing engine design to see if there is a statistically significant difference between the two. The t-test on two (independent) variables with equal variances can be applied. This test is used because there are two distinctly different samples collected here (new engine and existing engine) but the variances of both samples are assumed to be similar (the means may or may not be similar, but the fluctuations around the mean are assumed to be similar).

This t-test can be applied to three types of hypothesis tests: a two-tailed test, a right-tailed test, and a left-tailed test. A two-tailed hypothesis tests the null hypothesis, $H_0$, such that the populations' mean difference between the two variables is statistically identical to the hypothesized mean differences (HMD). If HMD is set to zero, this is the same as saying that the first mean equals the second mean. The alternative hypothesis, Ha, is that the difference between the real population means is statistically different from the hypothesized mean differences when tested using the sample dataset. If HMD is set to zero, this is the same as saying that the first mean does not equal the second mean.

A right-tailed hypothesis tests the null hypothesis, $H_0$, such that the population mean differences between the two variables is statistically less than or equal to the hypothesized mean differences. If HMD is set to zero, this is the same as saying that the first mean is less than or equals the second mean. The alternative hypothesis, Ha, is that the real difference between population means is statistically greater than the hypothesized mean differences when tested using the sample dataset. If HMD is set to zero, this is the same as saying that the first mean is greater than the second mean.

A left-tailed hypothesis tests the null hypothesis, $H_0$, such that the differences between the population means of the two variables is statistically greater than or equal to the hypothesized mean differences. If HMD is set to zero, this is the same as saying that the first mean is greater than or equals the second mean. The alternative hypothesis, Ha, is that the real difference between population means is statistically less than the hypothesized mean difference when tested using the sample dataset. If HMD is set to zero, this is the same as saying that the first mean is less than the second mean.

If the calculated p-value is less than or equal to the significance level in the test, then reject the null hypothesis and conclude that the true population difference of the population means is not equal to (two-tailed test), less than (left-tailed test), or greater than (right-tailed test) HMD based on the sample tested. Otherwise, the true difference of the population means is statistically similar to the HMD. For data requirements, see the preceding section, Two Variables with Dependent Means (T-Test).

Two (Independent) Variables with Unequal Variances (T-Test)

The two-variable t-test with unequal variances (the population variance of sample 1 is expected to be different from the population variance of sample 2) is appropriate when the population standard deviation is not known but the sampling distribution is assumed to be approximately normal (the t-test is used when the sample size is less than 30). In addition, the two independent samples are assumed to have similar variances.

For illustrative purposes, suppose that a new customer relationship management (CRM) process is being evaluated for its effectiveness, and the customer satisfaction rankings between two hotels (one with and the other without CRM implemented) are collected. The t-test on two (independent) variables with unequal variances can be applied. This test is used here because there are two distinctly different samples collected (customer survey results of two different hotels) and the variances of both samples are assumed to be dissimilar (due to the difference in geographical location, plus the demographics and psychographics of the customers are different on both properties).

This t-test can be applied to three types of hypothesis tests: a two-tailed test, a right-tailed test, and a left-tailed test. A two-tailed hypothesis tests the null hypothesis, $H_0$, such that the population mean differences between the two variables are statistically identical to the hypothesized mean differences. If HMD is set to zero, this is the same as saying that the first mean equals the second mean. The alternative hypothesis, Ha, is that the real difference between the population means is statistically different from the hypothesized mean differences when tested using the sample dataset. If HMD is set to zero, this is the same as saying that the first mean does not equal the second mean.

A right-tailed hypothesis tests the null hypothesis, $H_0$, such that the difference between the two variables' population means is statistically less than or equal to the hypothesized mean differences. If HMD is set to zero, this is the same as saying that the first mean is less than or equals the second mean. The alternative hypothesis, Ha, is that the real populations' mean difference is statistically greater than the hypothesized mean differences when tested using the sample dataset. If HMD is set to zero, this is the same as saying that the first mean is greater than the second mean.

A left-tailed hypothesis tests the null hypothesis, $H_0$, such that the difference between the two variables' population means is statistically greater than or equal to the hypothesized mean differences. If HMD is set to zero, this is the same as saying that the first mean is greater than or equals the second mean. The alternative hypothesis, Ha, is that the real difference between population means is statistically less than the hypothesized mean difference when tested using the sample dataset. If HMD is set to zero, this is the same as saying that the first mean is less than the second mean.

If the calculated p-value is less than or equal to the significance level in the test, then reject the null hypothesis and conclude that the true population difference of the population means is not equal to (two-tailed test), less than (left-tailed test), or greater than (right-tailed test) the hypothesized mean based on the sample tested. Otherwise, the true difference of the population means is statistically similar to the hypothesized mean.

Two (Independent) Variables Testing for Means (Z-Test)

The two-variable Z-test is appropriate when the population standard deviations are known for the two samples, and the sampling distribution of each variable is assumed to be approximately normal (this applies when the number of data points of each variable exceeds 30).

To illustrate, suppose that a market survey was conducted on two different markets, the sample collected is large (N must exceed 30 for both variables), and the researcher is interested in testing whether there is a statistically significant difference between the two markets. Further suppose that such a market survey has been performed many times in the past and the population standard deviations are known. A two-independent variable Z-test can be applied because the sample size exceeds 30 on each market and the population standard deviations are known.

This Z-test can be applied to three types of hypothesis tests: a two-tailed test, a right-tailed test, and a left-tailed test. A two-tailed hypothesis tests the null hypothesis, $H_0$, such that the difference between the two population means is statistically identical to the hypothesized mean. The alternative hypothesis, Ha, is that the real difference between the two population means is statistically different from the hypothesized mean when tested using the sample dataset.

A right-tailed hypothesis tests the null hypothesis, $H_0$, such that the difference between the two population means is statistically less than or equal to the hypothesized mean. The alternative hypothesis, Ha, is that the real difference between the two population means is statistically greater than the hypothesized mean when tested using the sample dataset.

A left-tailed hypothesis tests the null hypothesis, $H_0$, such that the difference between the two population means is statistically greater than or equal to the hypothesized mean. The alternative hypothesis, Ha, is that the real difference between the two population means is statistically less than the hypothesized mean when tested using the sample dataset.

Two (Independent) Variables Testing for Proportions (Z-Test)

The two-variable Z-test on proportions is appropriate when the sampling distribution is assumed to be approximately normal (this applies when the number of data points of both samples exceeds 30). Further, the data should all be proportions and be between 0 and 1.

For illustrative purposes, suppose that a brand research was conducted on two different headache pills, the sample collected is large (N must exceed 30 for both variables), and the researcher is interested in testing whether there is a statistically significant difference between the proportion of headache sufferers of both samples using the different headache medication. A two-independent variable Z-test for proportions can be applied because the sample size exceeds 30 on each market and the data collected are proportions.

This Z-test can be applied to three types of hypothesis tests: a two-tailed test, a right-tailed test, and a left-tailed test. A two-tailed hypothesis tests the null hypothesis, $H_0$, that the difference in the population proportion is statistically identical to the hypothesized difference (if the hypothesized difference is set to zero, the null hypothesis tests if the population proportions of the two samples are identical). The alternative hypothesis, Ha, is that the real difference in population proportions is statistically different from the hypothesized difference when tested using the sample dataset.

A right-tailed hypothesis tests the null hypothesis, $H_0$, that the difference in the population proportion is statistically less than or equal to the hypothesized difference (if the hypothesized difference is set to zero, the null hypothesis tests if population proportion of sample 1 is equal to or less than the population proportion of sample 2). The alternative hypothesis, Ha, is that the real difference in population proportions is statistically greater than the hypothesized difference when tested using the sample dataset.

A left-tailed hypothesis tests the null hypothesis, $H_0$, that the difference in the population proportion is statistically greater than or equal to the hypothesized difference (if the hypothesized difference is set to zero, the null hypothesis tests if population proportion of sample 1 is equal to or greater than the population proportion of sample 2). The alternative hypothesis, Ha, is that the real difference in population proportions is statistically less than the hypothesized difference when tested using the sample dataset.

Two (Independent) Variables Testing for Variances (F-Test)

The two-variable F-test analyzes the variances from two samples (the population variance of sample 1 is tested with the population variance of sample 2 to see if they are equal) and is appropriate when the population standard deviation is not known but the sampling distribution is assumed to be approximately normal. The measurement of variation is a key issue in Six Sigma and quality control applications. In this illustration, suppose that the variation or variance around the units produced in a manufacturing process is compared to another process to determine which process is more variable and, hence, less predictable in quality.

This F-test can typically be applied to a single hypothesis test: a two-tailed test. A two-tailed hypothesis tests the null hypothesis, $H_0$, such that the population variance of the two variables is statistically identical. The alternative hypothesis, Ha, is that the population variances are statistically different from one another when tested using the sample dataset.

If the calculated p-value is less than or equal to the significance level in the test, then reject the null hypothesis and conclude that the true population variances of the two variables are not statistically equal to one another. Otherwise, the true population variances are statistically similar to each other.

Nonparametric Analysis

Nonparametric techniques make no assumptions about the specific shape or distribution from which the sample is drawn. This lack of assumptions makes it different from the other hypotheses tests such as ANOVA or t-tests (parametric tests) where the sample is assumed to be drawn from a population that is normally or approximately normally distributed. If normality is assumed, the power of the test is higher due to this normality restriction. However, if flexibility on distributional requirements is needed, then nonparametric techniques are superior. In general, nonparametric methodologies provide the following advantages over other parametric tests:

Normality or approximate normality does not have to be assumed.

Fewer assumptions about the population are required; that is, nonparametric tests do not require that the population assume any specific distribution.

Smaller sample sizes can be analyzed.

Samples with nominal and ordinal scales of measurement can be tested.

Sample variances do not have to be equal, whereas equality is required in parametric tests.

However, several caveats are worthy of mention:

Compared to parametric tests, nonparametric tests use data less efficiently.

The power of the test is lower than that of the parametric tests.

Therefore, if all the required assumptions are satisfied, it is better to use parametric tests.

In reality, however, it may be difficult to justify these distributional assumptions, or small sample sizes may exist, requiring the need for nonparametric tests. Thus, nonparametric tests should be used when the data are nominal or ordinal, or when the data are interval or ratio but the normality assumption is not met. The following covers each of the nonparametric tests available for use in the software.

Chi-Square Goodness-Of-Fit Test

The Chi-Square test for goodness of fit is used to determine whether a sample dataset could have been drawn from a population having a specified probability distribution. The probability distribution tested here is the normal distribution. The null hypothesis ($H_0$) tested is such that the sample is randomly drawn from the normal distribution, versus the alternate hypothesis (Ha) that the sample is not from a normal distribution. If the calculated p-value is less than or equal to the alpha significance value, then reject the null hypothesis and accept the alternate hypothesis. Otherwise, if the p-value is higher than the alpha significance value, do not reject the null hypothesis.

For the Chi-Square goodness-of-fit test, create data tables such as the one below, and select the data in the blue area (e.g., select the data from D6 to E13, or data points 800 to 4). To extend the dataset, just add more observations (rows).

Chi-Square Test of Independence

The Chi-Square test for independence examines two variables to see if there is some statistical relationship between them. This test is not used to find the exact nature of the relationship between the two variables, but to simply test if the variables could be independent of each other. The null hypothesis ($H_0$) tested is such that the variables are independent of each other, versus the alternate hypothesis (Ha) that the variables are not independent of each other.

The Chi-Square test looks at a table of observed frequencies and a table of expected frequencies. The amount of disparity between these two tables is calculated and compared with the Chi-Square test statistic. The observed frequencies reflect the cross-classification for members of a single sample, and the table of expected frequencies is constructed under the assumption that the null hypothesis is true.

Chi-Square Population Variance Test

The Chi-Square test for population variance is used for hypothesis testing and confidence interval estimation for a population variance. The population variance of a sample is typically unknown, and, hence, the need for quantifying this confidence interval. The population is assumed to be normally distributed.

Friedman Test

The Friedman test is a form of nonparametric test that makes no assumptions about the specific shape of the population from which the sample is drawn, allowing for smaller sample datasets to be analyzed. This method is an extension of the Wilcoxon Signed-Rank test for paired samples. The corresponding parametric test is the Randomized Block Multiple Treatment ANOVA, but unlike the ANOVA, the Friedman test does not require that the dataset be randomly sampled from normally distributed populations with equal variances.

The Friedman test uses a two-tailed hypothesis test where the null hypothesis ($H_0$) is such that the population medians of each treatment are statistically identical to the rest of the group. That is, there is no effect among the different treatment groups. The alternative hypothesis (Ha) is such that the real population medians are statistically different from one another when tested using the sample dataset. That is, the medians are statistically different, which means that there is a statistically significant effect among the different treatment groups. If the calculated p-value is less than or equal to the alpha significance value, then reject the null hypothesis and accept the alternate hypothesis. Otherwise, if the p-value is higher than the alpha significance value, do not reject the null hypothesis.

For the Friedman test, create data tables such as the one below, and select the data in the blue area (e.g., select the data from C22 to F32, or data points Treatment 1 to 80).

Kruskal-Wallis Test

The Kruskal-Wallis test is a form of nonparametric test that makes no assumptions about the specific shape of the population from which the sample is drawn, allowing for smaller sample datasets to be analyzed. This method is an extension of the Wilcoxon Signed-Rank test by comparing more than two independent samples. The corresponding parametric test is the One-Way ANOVA, but unlike the ANOVA, the Kruskal-Wallis does not require that the dataset be randomly sampled from normally distributed populations with equal variances. The Kruskal-Wallis test is a two-tailed hypothesis test where the null hypothesis ($H_0$) is such that the population medians of each treatment are statistically identical to the rest of the group. That is, there is no effect among the different treatment groups. The alternative hypothesis (Ha) is such that the real population medians are statistically different from one another when tested using the sample dataset. That is, the medians are statistically different, which means that there is a statistically significant effect among the different treatment groups. If the calculated p-value is less than or equal to the alpha significance value, then reject the null hypothesis and accept the alternate hypothesis. Otherwise, if the p-value is higher than the alpha significance value, do not reject the null hypothesis.

The benefit of the Kruskal-Wallis test is that it can be applied to ordinal, interval, and ratio data while ANOVA is only applicable for interval and ratio data. Also, the Friedman test can be run with fewer data points.

For illustrative purposes, suppose that three different drug indications (T=3) were developed and tested on 100 patients each (N=100). The Kruskal-Wallis test can be applied to test if these three drugs are all equally effective statistically. If the calculated p-value is less than or equal to the significance level used in the test, then reject the null hypothesis and conclude that there is a significant difference among the different treatments. Otherwise, the treatments are all equally effective.

For the Kruskal-Wallis test, create data tables such as the one below, and select the data in the blue area (e.g., select the data from C40 to F50, or data points Treatment 1 to 80). To extend the dataset, just add more observations (rows) or more treatment variables to compare (columns).

Lilliefors Test

The Lilliefors test is a form of nonparametric test that makes no assumptions about the specific shape of the population from which the sample is drawn, allowing for smaller sample datasets to be analyzed. This test evaluates the null hypothesis ($H_0$) of whether the data sample was drawn from a normally distributed population, versus an alternate hypothesis (Ha) that the data sample is not normally distributed. If the calculated p-value is less than or equal to the alpha significance value, then reject the null hypothesis and accept the alternate hypothesis. Otherwise, if the p-value is higher than the alpha significance value, do not reject the null hypothesis. This test relies on two cumulative frequencies: one derived from the sample dataset and one from a theoretical distribution based on the mean and standard deviation of the sample data. An alternative to this test is the Chi-Square test for normality. The Chi-Square test requires more data points to run compared to the Lilliefors test.

Runs Test

The runs test is a form of nonparametric test that makes no assumptions about the specific shape of the population from which the sample is drawn, allowing for smaller sample datasets to be analyzed. This test evaluates the randomness of a series of observations by analyzing the number of runs it contains. A run is a consecutive appearance of one or more observations that are similar. The null hypothesis ($H_0$) tested is whether the data sequence is random, versus the alternate hypothesis (Ha) that the data sequence is not random. If the calculated p-value is less than or equal to the alpha significance value, then reject the null hypothesis and accept the alternate hypothesis. Otherwise, if the p-value is higher than the alpha significance value, do not reject the null hypothesis.

Wilcoxon Signed-Rank Test (One Variable)

The single variable Wilcoxon Signed-Rank test is a form of nonparametric test that makes no assumptions about the specific shape of the population from which the sample is drawn, allowing for smaller sample datasets to be analyzed. This method looks at whether a sample dataset could have been randomly drawn from a particular population whose median is being hypothesized. The corresponding parametric test is the one-sample t-test, which should be used if the underlying population is assumed to be normal, providing a higher power on the test. The Wilcoxon Signed-Rank test can be applied to three types of hypothesis tests: a two-tailed test, a right-tailed test, and a left-tailed test. If the calculated Wilcoxon statistic is outside the critical limits for the specific significance level in the test, reject the null hypothesis and conclude that the true population median is not equal to (two-tailed test), less than (left-tailed test), or greater than (right-tailed test) the hypothesized median based on the sample tested. Otherwise, the true population median is statistically similar to the hypothesized median.

Wilcoxon Signed-Rank Test (Two Variables)

The Wilcoxon Signed-Rank test for paired variables is a form of nonparametric test, which makes no assumptions about the specific shape of the population from which the sample is drawn, allowing for smaller sample datasets to be analyzed. This method looks at whether the median of the differences between the two paired variables are equal. This test is specifically formulated for testing the same or similar samples before and after an event (e.g., measurements taken before a medical treatment are compared against those measurements taken after the treatment to see if there is a difference). The corresponding parametric test is the two-sample t-test with dependent means, which should be used if the underlying population is assumed to be normal, providing a higher power on the test. The Wilcoxon Signed-Rank test can be applied to three types of hypothesis tests: a two-tailed test, a right-tailed test, and a left-tailed test.

For illustrative purposes, suppose that a new engine design is tested against an existing engine design to see if there is a statistically significant difference between the two. The paired variable Wilcoxon Signed-Rank test can be applied. If the calculated Wilcoxon statistic is outside the critical limits for the specific significance level in the test, reject the null hypothesis and conclude that the difference between the true population medians is not equal to (two-tailed test), less than (left-tailed test), or greater than (right-tailed test) the hypothesized median difference based on the sample tested. Otherwise, the true population median is statistically similar to the hypothesized median.

ANOVA (Multivariate Hypothesis Tests)

Single Factor Multiple Treatments ANOVA

The one-way ANOVA for single factor with multiple treatments test is an extension of the two-variable t-test, looking at multiple variables simultaneously. The ANOVA is appropriate when the sampling distribution is assumed to be approximately normal. ANOVA can be applied to only the two-tailed hypothesis test. A two-tailed hypothesis tests the null hypothesis ($H_0$) such that the population means of each treatment is statistically identical to the rest of the group, which means that there is no effect among the different treatment groups. The alternative hypothesis (Ha) is such that the real population means are statistically different from one another when tested using the sample dataset.

For illustrative purposes, suppose that three different drug indications (T=3) were developed and tested on 100 patients each (N=100). The one-way ANOVA can be applied to test if these three drugs are all equally effective statistically. If the calculated p-value is less than or equal to the significance level used in the test, then reject the null hypothesis and conclude that there is a significant difference among the different treatments. Otherwise, the treatments are all equally effective.

Randomized Block Multiple Treatments ANOVA

The one-way randomized block ANOVA is appropriate when the sampling distribution is assumed to be approximately normal and when there is a block variable for which ANOVA will control (block the effects of this variable by controlling it in the experiment). ANOVA can be applied to only the two-tailed hypothesis test. This analysis can test for the effects of both the treatments as well as the effectiveness of the control, or block, variable.

If the calculated p-value for the treatment is less than or equal to the significance level used in the test, then reject the null hypothesis and conclude that there is a significant difference among the different treatments. If the calculated p-value for the block variable is less than or equal to the significance level used in the test, then reject the null hypothesis and conclude that there is a significant difference among the different block variables.

For illustrative purposes, suppose that three different headlamp designs (T=3) were developed and tested on four groups of volunteer drivers grouped by their age (B=4). The one-way randomized block ANOVA can be applied to test if these three headlamps are all equally effective statistically when tested using the volunteers' driving test grades. Otherwise, the treatments are all equally effective. This test can determine if the differences occur because of the treatment (that the type of headlamp will determine differences in driving test scores) or from the block, or controlled, variable (that age may yield different driving abilities).

Two-Way ANOVA

The two-way ANOVA is an extension of the single factor and randomized block ANOVA by simultaneously examining the effects of two factors on the dependent variable, along with the effects of interactions between the different levels of these two factors. Unlike the randomized block design, this model examines the interactions between different levels of the factors, or independent variables. In a two-factor experiment, interaction exists when the effect of a level for one factor depends on which level of the other factor is present.

There are three sets of null ($H_0$) and alternate (Ha) hypotheses to be tested in the two-way analysis of variance.

The first test is on the first independent variable, where the null hypothesis is that no level of the first factor has an effect on the dependent variable. The alternate hypothesis is that there is at least one level of the first factor having an effect on the dependent variable. If the calculated p-value is less than or equal to the alpha significance value, then reject the null hypothesis and accept the alternate hypothesis. Otherwise, if the p-value is higher than the alpha significance value, do not reject the null hypothesis.

The second test is on the second independent variable, where the null hypothesis is that no level of the second factor has an effect on the dependent variable. The alternate hypothesis is that there is at least one level of the second factor having an effect on the dependent variable. If the calculated p-value is less than or equal to the alpha significance value, then reject the null hypothesis and accept the alternate hypothesis. Otherwise, if the p-value is higher than the alpha significance value, do not reject the null hypothesis.

The third test is on the interaction of both the first and second independent variables, where the null hypothesis is that there are no interacting effects between levels of the first and second factors. The alternate hypothesis is that there is at least one combination of levels of the first and second factors having an effect on the dependent variable. If the calculated p-value is less than or equal to the alpha significance value, then reject the null hypothesis and accept the alternate hypothesis. Otherwise, if the p-value is higher than the alpha significance value, do not reject the null hypothesis.

According to an embodiment of the present invention the Two-Way ANOVA module, creates tables such as the one below, and select the data in the blue area (804 to 835). Users can extend the data by adding rows of factors and columns of treatments. Note that the number of replications in the table above is 2 (i.e., two rows of observations per Factor A type). Of course, users can increase the number of replications as required. The number of replications has to be consistent if users wish to extend the dataset.

Forecasting, Multiple Regression, and Econometrics

ARIMA (Autoregressive Integrated Moving Average)

One powerful advanced times-series forecasting tool is the ARIMA or Auto Regressive Integrated Moving Average approach. ARIMA forecasting assembles three separate tools into a comprehensive model. The first tool segment is the autoregressive or "AR" term, which corresponds to the number of lagged value of the residual in the unconditional forecast model. In essence, the model captures the historical variation of actual data to a forecasting model and uses this variation, or residual, to create a better predicting model. The second tool segment is the integration order or the "I" term. This integration term corresponds to the number of differencing the time series to be forecasted goes through. This element accounts for any nonlinear growth rates existing in the data. The third tool segment is the moving average or "MA" term, which is essentially the moving average of lagged forecast errors. By incorporating this average of lagged forecast errors, the model, in essence, learns from its forecast errors or mistakes and corrects for them through a moving-average calculation.

Auto ARIMA (Automatic Autoregressive Integrated Moving Average)

ARIMA is an advanced modeling technique used to model and forecast time-series data (data that have a time component to them, e.g., interest rates, inflation, sales revenues, gross domestic product).

The ARIMA Auto Model selection will analyze all combinations of ARIMA (p,d,q) for the most common values of 0, 1, and 2, and reports the relevant Akaike Information Criterion (AIC) and Schwarz Criterion (SC). The lowest AIC and SC model is then chosen and run. Users can also add in exogenous variables into the model selection.

In addition, in order to forecast ARIMA models with exogenous variables, it is necessary that the exogenous variables have enough data points to cover the additional number of periods to forecast. Finally, due to the complexity of the models, this module may take several minutes to run.

Autoregressive Integrated Moving Average, or ARIMA (p,d,q), models are the extension of the AR model that uses three components for modeling the serial correlation in the time-series data. The first component is the autoregressive (AR) term. The AR(p) model uses the p lags of the time series in the equation. An AR(p) model has the form: y(t)=a(1) y(t−1)+ . . . +a(p) y(t−p)+e(t). The second component is the integration (d) order term. Each integration order corresponds to differencing the time series. I(1) means differencing the data once; I(d) means differencing the data d times. The third component is the moving average (MA) term. The MA(q) model uses the q lags of the forecast errors to improve the forecast. An MA(q) model has the form: y(t)=e(t)+b(1) e(t−1)+ . . . +b(q) e(t−q). Finally, an ARMA (p,q) model has the combined form: y(t)=a(1) y(t−1)+ . . . +a(p) y(t−p)+e(t)+b(1) e(t−1)+ . . . +b(q) e(t−q).

Basic Multiple Regression

It is assumed that the user is familiar with regression analysis. Multiple Regression analysis is used to find a statistical and mathematical relationship between a single dependent variable and multiple independent variables. Regression is useful for determining the relationship as well as for forecasting.

For illustrative purposes, suppose users want to determine if sales of a product can be attributed to an advertisement in a local paper. In this case, sales revenue is the dependent variable, Y (it is dependent on size of the advertisement and how frequently is appears a week), while advertisement size and frequency are the independent variables X1 and X2 (they are independent of sales). Interpreting the regression analysis is more complex (this may include hypothesis t-tests, F-tests, ANOVA, correlations, autocorrelations, etc.).

Basic Econometrics and Autoeconometrics

Econometrics refers to a branch of business analytics, modeling, and forecasting techniques for modeling the behavior or forecasting certain business, financial, economic, physical science, and other variables. Running the Basic Econometrics models is similar to regular regression analysis except that the dependent and independent variables are allowed to be modified before a regression is run. The report generated is the same as shown in the Multiple Regression section previously and the interpretations are identical to those described previously Combinatorial Fuzzy Logic In contrast, the term fuzzy logic is derived from fuzzy set theory to deal with reasoning that is approximate rather than accurate. As opposed to crisp logic, where binary sets have binary logic, fuzzy logic variables may have a truth value that ranges between 0 and 1 and is not constrained to the two truth values of classic propositional logic. This fuzzy weighting schema is used together with a combinatorial method to yield time-series forecast results. Note that neither neural networks nor fuzzy logic techniques have yet been established as valid and reliable methods in the business forecasting domain, on either a strategic, tactical, or operational level. Much research is still required in these advanced forecasting fields. Nonetheless, PEAT's Forecast Statistics module provides the fundamentals of these two techniques for the purposes of running time-series forecasts.

GARCH Volatility Forecasts

The Generalized Autoregressive Conditional Heteroskedasticity (GARCH) Model is used to model historical and forecast future volatility levels of a marketable security (e.g., stock prices, commodity prices, oil prices, etc.). The dataset has to be a time series of raw price levels. GARCH will first convert the prices into relative returns and then run an internal optimization to fit the historical data to a mean-reverting volatility term structure, while assuming that the volatility is heteroskedastic in nature (changes over time according to some econometric characteristics).

The typical volatility forecast situation requires P=1, Q=1; Periodicity=number of periods per year (12 for monthly data, 52 for weekly data, 252 or 365 for daily data); Base=minimum of 1 and up to the periodicity value; and Forecast Periods=number of annualized volatility forecasts users wish to obtain. There are several GARCH models available in PEAT's Forecast Statistics module, including EGARCH, EGARCH-T, GARCH-M, GJR-GARCH, GJR-GARCH-T, IGARCH, and T-GARCH.

GARCH models are used mainly in analyzing financial time-series data to ascertain their conditional variances and volatilities. These volatilities are then used to value the options as usual, but the amount of historical data necessary for a good volatility estimate remains significant. Usually, several dozen—and even up to hundreds—of data points are required to obtain good GARCH estimates.

GARCH is a term that incorporates a family of models that can take on a variety of forms, known as GARCH(p,q), where p and q are positive integers that define the resulting GARCH model and its forecasts. In most cases for financial instruments, a GARCH(1,1) is sufficient and is most generally used. For instance, a GARCH (1,1) model takes the form of:

$$y_t = x_t \gamma + \epsilon_t$$

$$\sigma_t^2 = \omega + \alpha \epsilon_{t-1}^2 + \beta \sigma_{t-1}^2$$

where the first equation's dependent variable ($y_t$) is a function of exogenous variables ($x_t$) with an error term ($\epsilon_t$). The second equation estimates the variance (squared volatility $\sigma_t^2$) at time t, which depends on a historical mean ($\omega$); on news about volatility from the previous period, measured as a lag of the squared residual from the mean equation ($\epsilon_{t-1}^2$); and on volatility from the previous period ($\sigma_{t-1}^2$). Suffice it to say that detailed knowledge of econometric modeling (model specification tests, structural breaks, and error estimation) is required to run a GARCH model, making it less accessible to the general analyst. Another problem with GARCH models is that the model usually does not provide a good statistical fit. That is, it is impossible to predict the stock market and, of course, equally if not harder to predict a stock's volatility over time.

J-Curve and S-Curve Forecasts

The J curve, or exponential growth curve, is one where the growth of the next period depends on the current period's level and the increase is exponential. This phenomenon means that over time, the values will increase significantly, from one period to another. This model is typically used in forecasting biological growth and chemical reactions over time.

The S curve, or logistic growth curve, starts off like a J curve, with exponential growth rates. Over time, the environment becomes saturated (e.g., market saturation, competition, overcrowding), the growth slows, and the forecast value eventually ends up at a saturation or maximum level. The S-curve model is typically used in forecasting market share or sales growth of a new product from market introduction until maturity and decline, population dynamics, growth of bacterial cultures, and other naturally occurring variables.

Markov Chains

A Markov chain exists when the probability of a future state depends on a previous state and when linked together forms a chain that reverts to a long-run steady state level. This Markov approach is typically used to forecast the market share of two competitors. The required inputs are the starting probability of a customer in the first store (the first state) returning to the same store in the next period versus the probability of switching to a competitor's store in the next state.

Neural Network Forecasting

The term Neural Network is often used to refer to a network or circuit of biological neurons, while modern usage of the term often refers to artificial neural networks comprising artificial neurons, or nodes, recreated in a software environment. Such networks attempt to mimic the neurons in the human brain in ways of thinking and identifying patterns and, in our situation, identifying patterns for the purposes of forecasting time-series data. Note that the number of hidden layers in the network is an input parameter and will need to be calibrated with user data. Typically, the more complicated the data pattern, the higher the number of hidden layers users would need and the longer it would take to compute. It is recommended that users start at 3 layers. The testing period is simply the number of data points used in the final calibration of the Neural Network model, and it is recommended that at least the same number of periods users wish to forecast as the testing period be used.

Nonlinear Extrapolation

Extrapolation involves making statistical forecasts by using historical trends that are projected for a specified period of time into the future. It is only used for time-series forecasts. For cross-sectional or mixed panel data (time-series with cross-sectional data), multivariate regression is more appropriate. This methodology is useful when major changes are not expected; that is, causal factors are expected to remain constant or when the causal factors of a situation are not clearly understood. It also helps discourage the introduction of personal biases into the process. Extrapolation is fairly reliable, relatively simple, and inexpensive. However, extrapolation, which assumes that recent and historical trends will continue, produces large forecast errors if discontinuities occur within the projected time period; that is, pure extrapolation of time series assumes that all we need to know is contained in the historical values of the series being forecasted. If we assume that past behavior is a good predictor of future behavior, extrapolation is appealing. This makes it a useful approach when all that is needed are many short-term forecasts.

This methodology estimates the $f(x)$ function for any arbitrary x value, by interpolating a smooth nonlinear curve through all the x values and, using this smooth curve, extrapolates future x values beyond the historical dataset. The methodology employs either the polynomial functional form or the rational functional form (a ratio of two polynomials). Typically, a polynomial functional form is sufficient for well-behaved data; however, rational functional forms are sometimes more accurate (especially with polar functions, i.e., functions with denominators approaching zero).

Principal Components Analysis

Principal Components Analysis is a way of identifying patterns in data and recasting the data in such a way as to highlight their similarities and differences. Patterns of data are very difficult to find in high dimensions when multiple variables exist, and higher dimensional graphs are very difficult to represent and interpret. Once the patterns in the data are found, they can be compressed, resulting in a reduction of the number of dimensions. This reduction of data dimensions does not mean much loss of information. Instead, similar levels of information can now be obtained by fewer variables.

The analysis provides the Eigenvalues and Eigenvectors of the dataset. The Eigenvector with the highest Eigenvalue is the principle component of the dataset. Ranking the Eigenvalues from highest to lowest provides the components in order of statistical significance. If the Eigenvalues are small, users do not lose much information. It is up to users to decide how many components to ignore based on their Eigenvalues. The proportions and cumulative proportions tell users how much of the variation in the dataset can be explained by incorporating that component. Finally, the data is then transformed to account for only the number of components users decide to keep.

Spline (Cubic Spline Interpolation and Extrapolation)

Sometimes there are missing values in a time-series dataset. As an example, interest rates for years 1 to 3 may exist, followed by years 5 to 8, and then year 10. Spline curves can be used to interpolate the missing years' interest rate values based on the data that exist. Spline curves can also be used to forecast or extrapolate values of future time periods beyond the time period of available data. The data can be linear or nonlinear. The Known X values represent the values on the x-axis of a chart (as an example, this is Years of the known interest rates, and, usually, the x-axis are the values that are known in advance such as time or years) and the Known Y values represent the values on the y-axis (in our case, the known Interest Rates). The y-axis variable is typically the variable users wish to interpolate missing values from or extrapolate the values into the future.

Stepwise Regression

One powerful automated approach to regression analysis is Stepwise Regression. Based on its namesake, the regression process proceeds in multiple steps. There are several ways to set up these stepwise algorithms, including the correlation approach, forward method, backward method, and the forward and backward method.

In the correlation method, the dependent variable (Y) is correlated to all the independent variables (X), and a regression is run, starting with the X variable with the highest absolute correlation value. Then subsequent X variables are added until the p-values indicate that the new X variable is no longer statistically significant. This approach is quick and simple but does not account for interactions among variables, and an X variable, when added, will statistically overshadow other variables.

In the forward method, first Y is correlated with all X variables, a regression for Y is run on the highest absolute value correlation of X, and the fitting errors are obtained. Then, these errors are correlated with the remaining X variables and the highest absolute value correlation among this remaining set is chosen and another regression is run. The process is repeated until the p-value for the latest X variable coefficient is no longer statistically significant then the process is stopped.

In the backward method, a regression with Y is run on all X variables and, reviewing each variable's p-value, the variable with the largest p-value is systematically eliminated. Then a regression is run again, repeating each time until all p-values are statistically significant.

In the forward and backward method, the forward method is applied to obtain three X variables, and then the backward approach is applied to see if one of them needs to be eliminated because it is statistically insignificant. The forward method is repeated, and then the backward method until all remaining X variables are considered.

The Stepwise Regression is an automatic search process iterating through all the independent variables, and it models the variables that are statistically significant in explaining the variations in the dependent variable. Stepwise Regression is powerful when there are many independent variables and a large combination of models can be built. To illustrate, suppose users want to determine if sales of a product can be attributed to an advertisement in a local paper. In this case, sales revenue is the dependent variable Y, while the independent variables X1 to X5 are the size of the advertisement, cost of the ad, number of readers, day of the week, and how frequently it appears a week. Stepwise Regression will automatically iterate through these X variables to find those that are statistically significant in the regression model. Interpreting the regression analysis is more complex (this may include hypothesis t-tests, F-tests, ANOVA, correlations, autocorrelations, etc.).

Forecasting with Time-Series Decomposition

Forecasting is the act of predicting the future whether it is based on historical data or speculation about the future when no history exists. When historical data exists, a quantitative or statistical approach is best, but if no historical data exist, then a qualitative or judgmental approach is usually the only recourse. There are eight common time-series models, segregated by seasonality and trend. For instance, if the data variable has no trend or seasonality, then a single moving-average model or a single exponential-smoothing model would suffice. However, if seasonality exists but no discernible trend is present, either a seasonal additive or seasonal multiplicative model would be better, and so forth.

The best-fitting test for the moving average forecast uses the Root Mean Squared Errors (RMSE). The RMSE calculates the square root of the average squared deviations of the fitted values versus the actual data points.

Mean Squared Error (MSE) is an absolute error measure that squares the errors (the difference between the actual historical data and the forecast-fitted data predicted by the model) to keep the positive and negative errors from canceling each other out. This measure also tends to exaggerate large errors by weighting the large errors more heavily than smaller errors by squaring them, which can help when comparing different time-series models. Root Mean Square Error (RMSE) is the square root of MSE and is the most popular error measure, also known as the quadratic loss function. RMSE can be defined as the average of the absolute values of the forecast errors and is highly appropriate when the cost of the forecast errors is proportional to the absolute size of the forecast error. The RMSE is used as the selection criteria for the best-fitting time-series model. Mean Absolute Deviation (MAD) is an error statistic that averages the distance (absolute value of the difference between the actual historical data and the forecast-fitted data predicted by the model) between each pair of actual and fitted forecast data points and is most appropriate when the cost of forecast errors is proportional to the absolute size of the forecast errors.

Mean Absolute Percentage Error (MAPE) is a relative error statistic measured as an average percent error of the historical data points and is most appropriate when the cost of the forecast error is more closely related to the percentage error than the numerical size of the error.

Finally, an associated measure is the Theil's U statistic, which measures the naivety of the model's forecast. That is, if the Theil's U statistic is less than 1.0, then the forecast method used provides an estimate that is statistically better than guessing.

Single Moving Average

The single moving average is applicable when time-series data with no trend and seasonality exist. This model is not appropriate when used to predict cross-sectional data. The single moving average simply uses an average of the actual historical data to project future outcomes. This average is applied consistently moving forward, hence the term moving average. The value of the moving average for a specific length is simply the summation of actual historical data arranged and indexed in a time sequence. The software finds the optimal moving average lag automatically through an optimization process that minimizes the forecast errors.

Single Exponential Smoothing

The single exponential smoothing approach is used when no discernible trend or seasonality exists in the time-series data. This model is not appropriate when used to predict cross-sectional data. This method weights past data with exponentially decreasing weights going into the past; that is, the more recent the data value, the greater its weight. This weighting largely overcomes the limitations of moving averages or percentage-change models. The weight used is termed the alpha measure. The software finds the optimal alpha parameter automatically through an optimization process that minimizes the forecast errors.

Double Moving Average

The double moving average method will smooth out past data by performing a moving average on a subset of data that represents a moving average of an original set of data. That is, a second moving average is performed on the first moving average. The second moving average application captures the trending effect of the data. The results are then weighted and forecasts are created. The software finds the optimal moving average lag automatically through an optimization process that minimizes the forecast errors.

Double Exponential Smoothing

The double exponential smoothing method is used when the data exhibit a trend but no seasonality. This model is not appropriate when used to predict cross-sectional data. Double exponential smoothing applies single exponential smoothing twice, once to the original data and then to the resulting single exponential smoothing data. An alpha weighting parameter is used on the first or single exponential smoothing (SES), while a beta weighting parameter is used on the second or double exponential smoothing (DES). This approach is useful when the historical data series is not stationary. The software finds the optimal alpha and beta parameters automatically through an optimization process that minimizes the forecast errors.

Seasonal Additive

If the time-series data has no appreciable trend but exhibits seasonality, then the additive seasonality and multiplicative seasonality methods apply. The additive seasonality model breaks the historical data into a level (L), or base-case, component as measured by the alpha parameter, and a seasonality (S) component measured by the gamma parameter. The resulting forecast value is simply the addition of this base-case level to the seasonality value. The software finds the optimal alpha and gamma parameters automatically through an optimization process that minimizes the forecast errors.

Seasonal Multiplicative

If the time-series data has no appreciable trend but exhibits seasonality, then the additive seasonality and multiplicative seasonality methods apply. The multiplicative seasonality model breaks the historical data into a level (L), or base-case, component as measured by the alpha parameter, and a seasonality (S) component measured by the gamma parameter. The resulting forecast value is simply the multiplication of this base-case level by the seasonality value. The software finds the optimal alpha and gamma parameters automatically through an optimization process that minimizes the forecast errors.

Holt-Winter's Seasonal Additive

When both seasonality and trend exist, more advanced models are required to decompose the data into their base elements: a base-case level (L) weighted by the alpha parameter; a trend component (b) weighted by the beta parameter; and a seasonality component (S) weighted by the gamma parameter. Several methods exist, but the two most common are the Holt-Winter's additive seasonality and Holt-Winter's multiplicative seasonality methods. In the Holt-Winter's additive model, the base-case level, seasonality, and trend are added together to obtain the forecast fit.

Holt-Winter's Seasonal Multiplicative

When both seasonality and trend exist, more advanced models are required to decompose the data into their base elements: a base-case level (L) weighted by the alpha parameter; a trend component (b) weighted by the beta parameter; and a seasonality component (S) weighted by the gamma parameter. Several methods exist, but the two most common are the Holt-Winter's additive seasonality and Holt-Winter's multiplicative seasonality methods. In the Holt-Winter's multiplicative model, the base-case level and trend are added together and multiplied by the seasonality factor to obtain the forecast fit.

Trendlines

Trendlines can be used to determine if a set of time-series data follows any appreciable trend. Trends can be linear or nonlinear (such as exponential, logarithmic, moving average, polynomial, or power). In forecasting models, the process usually includes removing the effects of accumulating datasets from seasonality and trend to show only the absolute changes in values and to allow potential cyclical patterns to be identified after removing the general drift, tendency, twists, bends, and effects of seasonal cycles of a set of time-series data. For example, a detrended dataset may be necessary to see a more accurate account of a company's sales in a given year by shifting the entire dataset from a slope to a flat surface to better expose the underlying cycles and fluctuations.

Volatility: Log Returns Approach

There are several ways to estimate the volatility used in forecasting and option valuation models. The most common approach is the Logarithmic Returns Approach. This method is used mainly for computing the volatility on liquid and tradable assets, such as stocks in financial options. However, sometimes it is used for other traded assets, such as the price of oil or electricity. This method cannot be used when negative cash flows or prices occur, which means it is used only on positive data, making it most appropriate for computing the volatility of traded assets. The approach is simply to take the annualized standard deviation of the logarithmic relative returns of the time-series data as the proxy for volatility.

Yield Curves: Bliss and Nelson-Siegel Methods

The Bliss interpolation model is used for generating the term structure of interest rates and yield curve estimation. Econometric modeling techniques are required to calibrate the values of several input parameters in this model. The Bliss approach modifies the Nelson-Siegel method by adding an additional generalized parameter. Virtually any yield curve shape can be interpolated using these two models, which are widely used at banks around the world. In contrast, the Nelson-Siegel model is run with four curve estimation parameters. If properly modeled, it can be made to fit almost any yield curve shape. Calibrating the inputs in these models requires facility with econometric modeling and error optimization techniques. Typically, if some interest rates exist, a better approach is to use a spline interpolation method such as cubic spline and so forth.

Forecasting with Stochastic Processes

The Basics of Forecasting with Stochastic Processes

A stochastic process is nothing but a mathematically defined equation that can create a series of outcomes over time, outcomes that are not deterministic in nature. That is, it does not follow any simple discernible rule such as price will increase X percent every year or revenues will increase by this factor of X plus Y percent. A stochastic process is, by definition, nondeterministic, and one can plug numbers into a stochastic process equation and obtain different results every time. For instance, the path of a stock price is stochastic in nature, and one cannot reliably predict the stock price path with any certainty. However, the price evolution over time is enveloped in a process that generates these prices. The process is fixed and predetermined, but the outcomes are not. Hence, by stochastic simulation, we create multiple pathways of prices, obtain a statistical sampling of these simulations, and make inferences on the potential pathways that the actual price may undertake given the nature and parameters of the stochastic process used to generate the time series.

Analytical Models

Autocorrelation

Autocorrelation can be defined as the correlation of a dataset to itself in the past. It is the correlation between observations of a time series separated by specified time units. Certain time-series data follow an autocorrelated series as future outcomes rely heavily on past outcomes (e.g., revenues or sales that follow a weekly, monthly, quarterly, or annual seasonal cycle; inflation and interest rates that follow some economic or business cycle, etc.). The term autocorrelation describes a relationship or correlation between values of the same data series at different time periods. The term lag defines the offset when comparing a data series with itself. For autocorrelation, lag refers to the offset of data that users choose when correlating a data series with itself. In PEAT's Forecast Statistics module, the autocorrelation function is calculated, together with the Q-statistic and relevant p-values. If the p-values are below the tested significance level, then the null hypothesis ($H_0$) of no autocorrelation is rejected, and it is concluded that there is autocorrelation with that particular lag.

Control Charts

Sometimes the specification limits are not set; instead, statistical control limits are computed based on the actual data collected (e.g., the number of defects in a manufacturing line). The upper control limit (UCL) and lower control limit (LCL) are computed, as are the central line (CL) and other sigma levels. The resulting chart is called a control chart, and if the process is out of control, the actual defect line will be outside of the UCL and LCL lines. Typically, when the LCL is a negative value, we set the floor as zero. In the interpretation of a control chart, by adding in the ±1 and 2 sigma lines, we can divide the control charts into several areas or zones. The following are rules of thumb that typically apply to control charts to determine if the process is out of control:

If one point is beyond Area A
If two out of three consecutive points are in Area A or beyond
If four out of five consecutive points are in Area B or beyond
If eight consecutive points are in Area C or beyond Additionally, a potential structural shift can be detected if any one of the following occurs:

At least 10 out of 11 sequential points are on one side of the CL
At least 12 out of 14 sequential points are on one side of the CL
At least 14 out of 17 sequential points are on one side of the CL
At least 16 out of 20 sequential points are on one side of the CL X-Bar Chart An X-Bar Chart is used when the variable has raw data values and there are multiple measurements in a sample experiment, multiple experiments are run, and the average of the collected data is of interest.

R-Bar Chart

An R-Bar Chart is used when the variable has raw data values and there are multiple measurements in a sample experiment, multiple experiments are run, and the range of the collected data is of interest.

XMR Chart

An XMR Chart is used when the variable has raw data values and is a single measurement taken in each sample experiment, multiple experiments are run, and the actual value of the collected data is of interest.

P Chart

A P Chart is used when the variable of interest is an attribute (e.g., defective or nondefective) and the data collected are in proportions of defects (or number of defects in a specific sample), there are multiple measurements in a sample experiment, multiple experiments are run with differing numbers of samples collected in each, and the average proportion of defects of the collected data is of interest.

NP Chart

An NP Chart is used when the variable of interest is an attribute (e.g., defective or nondefective) and the data collected are in proportions of defects (or number of defects in a specific sample), there are multiple measurements in a sample experiment, multiple experiments are run with a constant number of samples in each, and the average proportion of defects of the collected data is of interest.

C Chart

A C Chart is used when the variable of interest is an attribute (e.g., defective or nondefective) and the data collected are in total number of defects (actual count in units), there are multiple measurements in a sample experiment, multiple experiments are run with the same number of samples collected in each, and the average number of defects of the collected data is of interest.

U Chart

A U Chart is used when the variable of interest is an attribute (e.g., defective or nondefective) and the data collected are in total number of defects (actual count in units), there are multiple measurements in a sample experiment, multiple experiments are run with differing numbers of samples collected in each, and the average number of defects of the collected data is of interest.

Deseasonalization

The data deseasonalization method removes any seasonal components in the original data. In forecasting models, the process usually includes removing the effects of accumulating datasets from seasonality and trend to show only the absolute changes in values and to allow potential cyclical patterns to be identified after removing the general drift, tendency, twists, bends, and effects of seasonal cycles of a set of time-series data. Many time-series data exhibit seasonality where certain events repeat themselves after some time period or seasonality period (e.g., ski resorts' revenues are higher in winter than in summer, and this predictable cycle will repeat itself every winter). Seasonality periods represent how many periods would have to pass before the cycle repeats itself (e.g., 24 hours in a day, 12 months in a year, 4 quarters in a year, 60 minutes in an hour, etc.). For deseasonalized and detrended data, a seasonal index greater than 1 indicates a high period or peak within the seasonal cycle, and a value below 1 indicates a dip in the cycle.

Distributional Fitting

Another powerful simulation tool is distributional fitting or determining which distribution to use for a particular input variable in a model and what the relevant distributional parameters are. If no historical data exist, then the analyst must make assumptions about the variables in question. One approach is to use the Delphi method where a group of experts is tasked with estimating the behavior of each variable. For instance, a group of mechanical engineers can be tasked with evaluating the extreme possibilities of a spring coil's diameter through rigorous experimentation or guesstimates. These values can be used as the variable's input parameters (e.g., uniform distribution with extreme values between 0.5 and 1.2). When testing is not possible (e.g., market share and revenue growth rate), management can still make estimates of potential outcomes and provide the best-case, most-likely case, and worst-case scenarios. However, if reliable historical data are available, distributional fitting can be accomplished. Assuming that historical patterns hold and that history tends to repeat itself, then historical data can be used to find the best-fitting distribution with their relevant parameters to better define the variables to be simulated.

Heteroskedasticity

A common violation in regression, econometric modeling, and some time-series forecast methods is heteroskedasticity. Heteroskedasticity is defined as the variance of the forecast errors increasing over time. If pictured graphically, the width of the vertical data fluctuations increases or fans out over time. As an example, the data points have been changed to exaggerate the effect. However, in most time-series analysis, checking for heteroskedasticity is a much more difficult task. The coefficient of determination, or R-squared, in a multiple regression analysis drops significantly when heteroskedasticity exists. As is, the current regression model is insufficient and incomplete.

If the variance of the dependent variable is not constant, then the error's variance will not be constant. The most common form of such heteroskedasticity in the dependent variable is that the variance of the dependent variable may increase as the mean of the dependent variable increases for data with positive independent and dependent variables.

Unless the heteroskedasticity of the dependent variable is pronounced, its effect will not be severe: the least-squares estimates will still be unbiased, and the estimates of the slope and intercept will either be normally distributed if the errors are normally distributed, or at least normally distributed asymptotically (as the number of data points becomes large) if the errors are not normally distributed. The estimate for the variance of the slope and overall variance will be inaccurate, but the inaccuracy is not likely to be substantial if the independent-variable values are symmetric about their mean.

Heteroskedasticity of the dependent variable is usually detected informally by examining the X-Y scatter plot of the data before performing the regression. If both nonlinearity and unequal variances are present, employing a transformation of the dependent variable may have the effect of simultaneously improving the linearity and promoting equality of the variances. Otherwise, a weighted least-squares linear regression may be the preferred method of dealing with nonconstant variance of the dependent variable.

Maximum Likelihood Models on Logit, Probit, and Tobit

Limited Dependent Variables describe the situation where the dependent variable contains data that are limited in scope and range, such as binary responses (0 or 1) and truncated, ordered, or censored data. For instance, given a set of independent variables (e.g., age, income, education level of credit card debt, or mortgage loan holders), we can model the probability of default using maximum likelihood estimation (MLE). The response or dependent variable Y is binary, that is, it can have only two possible outcomes that we denote as 1 and 0 (e.g., Y may represent presence/absence of a certain condition, defaulted/not defaulted on previous loans, success/failure of some device, answer yes/no on a survey, etc.), and we also have a vector of independent variable regressors X, which are assumed to influence the outcome Y. A typical ordinary least squares regression approach is invalid because the regression errors are heteroskedastic and non-normal, and the resulting estimated probability estimates will return nonsensical values of above 1 or below 0. MLE analysis handles these problems using an iterative optimization routine to maximize a log likelihood function when the dependent variables are limited.

A Logit or Logistic regression is used for predicting the probability of occurrence of an event by fitting data to a logistic curve. It is a generalized linear model used for binomial regression, and like many forms of regression analysis, it makes use of several predictor variables that may be either numerical or categorical. MLE applied in a binary multivariate logistic analysis is used to model dependent variables to determine the expected probability of success of belonging to a certain group. The estimated coefficients for the Logit model are the logarithmic odds ratios and cannot be interpreted directly as probabilities. A quick computation is first required and the approach is simple.

Specifically, the Logit model is specified as Estimated $Y=LN[P_i/(1-P_i)]$ or, conversely, $P_i=EXP(\text{Estimated } Y)/(1+EXP(\text{Estimated } Y))$, and the coefficients $\beta_i$ are the log odds ratios. So, taking the antilog, or $EXP(\beta_i)$, we obtain the odds ratio of $P_i/(1-P_i)$. This means that with an increase in a unit of $\beta_i$, the log odds ratio increases by this amount. Finally, the rate of change in the probability is $dP/dX=\beta_i P_i(1-P_i)$. The Standard Error measures how accurate the predicted Coefficients are, and the t-Statistics are the ratios of each predicted Coefficient to its Standard Error and are used in the typical regression hypothesis test of the significance of each estimated parameter. To estimate the probability of success of belonging to a certain group (e.g., predicting if a smoker will develop chest complications given the amount smoked per year), simply compute the Estimated Y value using the MLE coefficients. For example, if the model is $Y=1.1+0.005$ (Cigarettes), then someone smoking 100 packs per year has an Estimated Y of $1.1+0.005(100)=1.6$. Next, compute the inverse antilog of the odds ratio: $EXP(\text{Estimated } Y)/[1+EXP(\text{Estimated } Y)]=EXP(1.6)/(1+EXP(1.6))=0.8320$. So, such a person has an 83.20% chance of developing some chest complications in his or her lifetime.

A Probit model (sometimes also known as a Normit model) is a popular alternative specification for a binary response model, which employs a Probit function estimated using maximum likelihood estimation and called Probit regression. The Probit and Logistic regression models tend to produce very similar predictions where the parameter estimates in a logistic regression tend to be 1.6 to 1.8 times higher than they are in a corresponding Probit model. The choice of using a Probit or Logit is entirely up to convenience, and the main distinction is that the logistic distribution has a higher kurtosis (fatter tails) to account for extreme values. For example, suppose that house ownership is the decision to be modeled, and this response variable is binary (home purchase or no home purchase) and depends on a series of independent variables $X_i$ such as income, age, and so forth, such that $I_i=\beta_0+\beta_1 X_1+\ldots+\beta_n X_n$, where the larger the value of $I_i$, the higher the probability of home ownership. For each family, a critical I* threshold exists, where if exceeded, the house is purchased—otherwise, no home is purchased—and the outcome probability (P) is assumed to be normally distributed such that $P_i=CDF(I)$ using a standard normal cumulative distribution function (CDF). Therefore, use the estimated coefficients exactly like those of a regression model and using the Estimated Y value, apply a standard normal distribution (users can use Microsoft Excel's NORMSDIST function or PEAT's Distributional Analysis tool by selecting Normal distribution and setting the mean to be 0 and standard deviation to be 1). Finally, to obtain a Probit or probability unit measure, set $I_i+5$ (this is because whenever the probability $P_i<0.5$, the estimated $I_i$ is negative, due to the fact that the normal distribution is symmetrical around a mean of zero).

The Tobit model (Censored Tobit) is an econometric and biometric modeling method used to describe the relationship between a non-negative dependent variable $Y_i$ and one or more independent variables $X_i$. In a Tobit model, is the dependent variable is censored; that is, the dependent variable is censored because values below zero are not observed. The Tobit model assumes that there is a latent unobservable variable Y*. This variable is linearly dependent on the $X_i$ variables via a vector of $\beta_i$ coefficients that determine their interrelationships. In addition, there is a normally distributed error term, $U_i$, to capture random influences on this relationship. The observable variable $Y_i$ is defined to be equal to the latent variables whenever the latent variables are above zero, and $Y_i$ is assumed to be zero otherwise. That is, $Y_i=Y^*$ if $Y^*>0$ and $Y_i=0$ if $Y^*=0$. If the relationship parameter $\beta_i$ is estimated by using ordinary least squares regression of the observed $Y_i$ on $X_i$, the resulting regression estimators are inconsistent and yield downward-biased slope coefficients and an upward-biased intercept. Only MLE would be consistent for a Tobit model. In the Tobit model, there is an ancillary statistic called sigma, which is equivalent to the standard error of estimate in a standard ordinary least squares regression, and the estimated coefficients are used the same way as in a regression analysis.

Multicollinearity

Multicollinearity exists when there is a linear relationship between the independent variables in a regression analysis. When this occurs, the regression equation cannot be estimated at all. In near-collinearity situations, the estimated regression equation will be biased and provide inaccurate results. This situation is especially true when a stepwise regression approach is used, where the statistically significant independent variables will be thrown out of the regression mix earlier than expected, resulting in a regression equation that is neither efficient nor accurate.

Partial Autocorrelation

Autocorrelation can be defined as the correlation of a dataset to itself in the past. It is the correlation between observations of a time series separated by specified time units. Certain time-series data follow an autocorrelated series as future outcomes rely heavily on past outcomes (e.g., revenues or sales that follow a weekly, monthly, quarterly, or annual seasonal cycle; inflation and interest rates that follow some economic or business cycle, etc.). Partial Autocorrelations (PAC), in contrast, are used to measure the degree of association between each data point at a particular time $Y_t$ and a time lag $Y_{t-k}$ when the cumulative effects of all other time lags $(1, 2, 3, \ldots, k-1)$ have been removed. The term lag defines the offset when comparing a data series with itself. In this module, the Partial Autocorrelation function is calculated, together with the Q-statistic and relevant p-values. If the p-values are below the tested significance level, then the null hypothesis ($H_0$) of no autocorrelation is rejected and it is concluded that there is autocorrelation that that particular lag.

Segmentation Clustering

Segmentation clustering takes the original dataset and runs some internal algorithms (a combination or k-means hierarchical clustering and other method of moments in order to find the best-fitting groups or natural statistical clusters) to statistically divide, or segment, the original dataset into multiple groups. This technique is valuable in a variety of settings including marketing (such as market segmentation of customers into various customer relationship management groups), physical sciences, engineering, and others.

Seasonality Test

Many time-series data exhibit seasonality where certain events repeat themselves after some time period or seasonality period (e.g., ski resorts' revenues are higher in winter than in summer, and this predictable cycle will repeat itself every winter). Seasonality periods represent how many periods would have to pass before the cycle repeats itself (e.g., 24 hours in a day, 12 months in a year, 4 quarters in a year, 60 minutes in an hour, etc.). For deseasonalized and detrended data, a seasonal index greater than 1 indicates a high period or peak within the seasonal cycle, and a value below 1 indicates a dip in the cycle. Users enter in the maximum seasonality period to test. That is, if users enter 6, the tool will test the following seasonality periods: 1, 2, 3, 4, 5, and 6. Period 1, of course, implies no seasonality in the data. Users can review the report generated for more details on the methodology, application, and resulting charts and seasonality test results. The best seasonality periodicity is listed first (ranked by the lowest RMSE error measure), and all the relevant error measurements are included for comparison: root mean squared error (RMSE), mean squared error (MSE), mean absolute deviation (MAD), and mean absolute percentage error (MAPE).

Structural Break

Structural break analysis tests whether the coefficients in different datasets are equal, and this test is most commonly used in time-series analysis to test for the presence of a structural break. A time-series dataset can be divided into two subsets. Structural break analysis is used to test each subset individually and on one another and on the entire dataset to statistically determine if, indeed, there is a break starting at a particular time period. The structural break test is often used to determine whether the independent variables have different impacts on different subgroups of the population, such as to test if a new marketing campaign, activity, major event, acquisition, divestiture, and so forth have an impact on the time-series data. Suppose, for example, a dataset has 100 time-series data points. Users can set various breakpoints to test, for instance, data points 10, 30, and 51. (This means that three structural break tests will be performed: data points 1-9 compared with 10-100; data points 1-29 compared with 30-100; and 1-50 compared with 51-100 to see if there is a break in the underlying structure at the start of data points 10, 30, and 51.). A one-tailed hypothesis test is performed on the null hypothesis ($H_0$) such that the two data subsets are statistically similar to one another, that is, there is no statistically significant structural break. The alternative hypothesis (Ha) is that the two data subsets are statistically different from one another, indicating a possible structural break. If the calculated p-values are less than or equal to 0.01, 0.05, or 0.10, then the hypothesis is rejected, which implies that the two data subsets are statistically significantly different at the 1%, 5%, and 10% significance levels. High p-values indicate that there is no statistically significant structural break.

Appendix: Portfolio Optimization

According to an embodiment of present invention, in the Portfolio Optimization section, the individual Options can be modeled as a portfolio and optimized to determine the best combination of projects for the portfolio. In today's competitive global economy, companies are faced with many difficult decisions. These decisions include allocating financial resources, building or expanding facilities, managing inventories, and determining product-mix strategies. Such decisions might involve thousands or millions of potential alternatives. Considering and evaluating each of them would be impractical or even impossible. A model can provide valuable assistance in incorporating relevant variables when analyzing decisions and in finding the best solutions for making decisions. Models capture the most important features of a problem and present them in a form that is easy to interpret. Models often provide insights that intuition alone cannot. An optimization model has three major elements: decision variables, constraints, and an objective. In short, the optimization methodology finds the best combination or permutation of decision variables (e.g., which products to sell and which projects to execute) in every conceivable way such that the objective is maximized (e.g., revenues and net income) or minimized (e.g., risk and costs) while still satisfying the constraints (e.g., budget and resources).

Optimization Settings

According to an embodiment of the present invention, the Options can be modeled as a portfolio and optimized to determine the best combination of projects for the portfolio in the Optimization Settings tab. Users select the decision variable type of Discrete Binary (chooses which Options to execute with a Go/No-Go binary 1/0 decision) or Continuous Budget Allocation (returns % of budget to allocate to each Option as long as the total portfolio is 100%); select the Objective (e.g., Max NPV, Min Risk, etc.); set up any Constraints (e.g., budget restrictions, number of projects restrictions, or create customized restrictions); select the Options to optimize/allocate/choose (default selection is all Options); and when completed, click Run Optimization. The software will then take users to the Optimization Results (FIG. 34).

Decision Variables

Decision variables are quantities over which users have control; for example, the amount of a product to make, the number of dollars to allocate among different investments, or which projects to select from among a limited set. As an example, portfolio optimization analysis includes a go or no-go decision on particular projects. In addition, the dollar or percentage budget allocation across multiple projects also can be structured as decision variables.

Constraints

Constraints describe relationships among decision variables that restrict the values of the decision variables. For example, a constraint might ensure that the total amount of money allocated among various investments cannot exceed a specified amount or, at most, one project from a certain group can be selected; budget constraints; timing restrictions; minimum returns; or risk tolerance levels.

Objective

According to an embodiment of the present invention, Objectives give a mathematical representation of the model's desired outcome, such as maximizing profit or minimizing cost, in terms of the decision variables. In financial analysis, for example, the objective may be to maximize returns while minimizing risks (maximizing the Sharpe's ratio or returns-to-risk ratio).

Optimization Results

According to an embodiment of the present invention, the Optimization Results tab returns the results from the portfolio optimization analysis. The main results are provided in the data grid (lower left corner), showing the final Objective function result, final Constraints, and the allocation, selection, or optimization across all individual Options within this optimized portfolio. The top left portion of the screen (FIG. 34) shows the textual details of the optimization algorithms applied, and the chart illustrates the final objective function (the chart will only show a single point for regular optimizations, whereas it will return an investment efficient frontier curve if the optional Efficient Frontier settings are set [min, max, step size] in the Optimization Settings tab).

Advanced Custom Optimization

According to an embodiment of the present invention, in the Advanced Custom Optimization tab (FIG. 35-38), users can create and solve their own optimization models. Knowledge of optimization modeling is required to set up models but users can click on Load Example and select a sample model to run. Users can use these sample models to learn how the Optimization routines can be set up. Clicking Run when done will execute the optimization routines and algorithms. The calculated results and charts will be presented on completion.

According to an embodiment of the present invention, when setting up an optimization model, it is recommended that the user go from one tab to another, starting with the Method (static, dynamic, or stochastic optimization); setting up the Decision Variables, Constraints, and Statistics (applicable only if simulation inputs have first been set up, and if dynamic or stochastic optimization is run); and setting the Objective function.

Method: Static Optimization

According to an embodiment of the present invention, in regard to the optimization, PEAT's Advanced Custom Optimization can be used to run a Static Optimization, that is, an optimization that is run on a static model, where no simulations are run. In other words, all the inputs in the model are static and unchanging. This optimization type is applicable when the model is assumed to be known and no uncertainties exist. Also, a discrete optimization can be first run to determine the optimal portfolio and its corresponding optimal allocation of decision variables before more advanced optimization procedures are applied. For instance, before running a stochastic optimization problem, a discrete optimization is first run to determine if there exist solutions to the optimization problem before a more protracted analysis is performed.

Method: Dynamic Optimization

According to an embodiment of the present invention, Dynamic Optimization is applied when Monte Carlo simulation is used together with optimization. Another name for such a procedure is Simulation-Optimization. That is, a simulation is first run, then the results of the simulation are applied back into the model, and then an optimization is applied to the simulated values. In other words, a simulation is run for N trials, and then an optimization process is run for M iterations until the optimal results are obtained or an infeasible set is found. Thus, using PEAT's optimization module, users can choose which forecast and assumption statistics to use and replace in the model after the simulation is run. Then, these forecast statistics can be applied in the optimization process. This approach is useful when users have a large model with many interacting assumptions and forecasts, and when some of the forecast statistics are required in the optimization. For example, if the standard deviation of an assumption or forecast is required in the optimization model (e.g., computing the Sharpe ratio in asset allocation and optimization problems where the mean is divided by standard deviation of the portfolio), then this approach should be used.

Method: Stochastic Optimization

The Stochastic Optimization process, in contrast, is similar to the dynamic optimization procedure with the exception that the entire dynamic optimization process is repeated T times. That is, a simulation with N trials is run, and then an optimization is run with M iterations to obtain the optimal results. Then the process is replicated T times. The results will be a forecast chart of each decision variable with T values. In other words, a simulation is run and the forecast or assumption statistics are used in the optimization model to find the optimal allocation of decision variables. Then, another simulation is run, generating different forecast statistics, and these new updated values are then optimized, and so forth. Hence, the final decision variables will each have their own forecast chart, indicating the range of the optimal decision variables. For instance, instead of obtaining single-point estimates in the dynamic optimization procedure, users can now obtain a distribution of the decision variables and, hence, a range of optimal values for each decision variable, also known as a stochastic optimization. Users should always run a Static Optimization prior to running any of the more advanced methods to test if the setup of the model is correct.

The Dynamic Optimization and Stochastic Optimization must first have simulation assumptions set. That is, both approaches require Monte Carlo Risk Simulation to be run prior to starting the optimization routines.

Decision Variables

Decision variables are quantities over which users have control; for example, the amount of a product to make, the number of dollars to allocate among different investments, or which projects to select from among a limited set. As an example, portfolio optimization analysis includes a go or no-go decision on particular projects. In addition, the dollar or percentage budget allocation across multiple projects also can be structured as decision variables.

According to an embodiment of the present invention, Users click Add to add a new Decision Variable. Users can also Change, Delete, or Duplicate an existing decision variable. Decision Variables can be set as Continuous (with lower and upper bounds), Integers (with lower and upper bounds), Binary (0 or 1), or a Discrete Range. The list of available variables is shown in the data grid, complete with their assumptions.

Constraints

Constraints describe relationships among decision variables that restrict the values of the decision variables. For example, a constraint might ensure that the total amount of money allocated among various investments cannot exceed a specified amount or, at most, one project from a certain group can be selected; budget constraints; timing restrictions; minimum returns; or risk tolerance levels.

According to an embodiment of present invention, Users click Add to add a new Constraint. Users can also Change or Delete an existing constraint.

According to an embodiment of the present invention, when users add a new constraint, the list of available Variables will be shown. By simply double-clicking on a desired variable, its variable syntax will be added to the Expression window. For example, double-clicking on a variable named "Return1" will create a syntax variable "$(Return1)$" in the window.

According to an embodiment of the present invention, users can enter their own constraint equations. For example, the following is a constraint: $(Asset1)$+$(Asset2)$+$(Asset3)$+$(Asset4)$=1, where the sum of all four decision variables must add up to 1. Users can keep adding as many constraints as needed, but they need to be aware that the higher the number of constraints, the longer the optimization will take, and the higher the probability of making an error or creating nonbinding constraints, or having constraints that violate another existing constraint (thereby introducing an error in the model).

Statistics

According to an embodiment of present invention, the Statistics subtab will be populated only if there are simulation assumptions set up. The Statistics window will only be populated if users have previously defined simulation assumptions available. If there are simulation assumptions set up, users can run Dynamic Optimization or Stochastic Optimization; otherwise users are restricted to running only Static Optimizations. In the window, users can click on the statistics individually to obtain a drop-down list. Here users can select the statistic to apply in the optimization process. The default is to return the Mean from the Monte Carlo Risk Simulation and replace the variable with the chosen statistic (in this case the average value), and Optimization will then be executed based on this statistic.

Objective

Objectives give a mathematical representation of the model's desired outcome, such as maximizing profit or minimizing cost, in terms of the decision variables. In financial analysis, for example, the objective may be to maximize returns while minimizing risks (maximizing the Sharpe's ratio or returns-to-risk ratio).

According to an embodiment of the present invention, Users can enter a customized Objective in the function window. The list of available variables is shown in the Variables window on the right. This list includes predefined decision variables and simulation assumptions. An example of an objective function equation looks something like: ($(Asset1)$*$(AS_Return1)$+$(Asset2)$*$(AS_Return2)$+$(Asset3)$*$(AS_Return3)$+$(As set4)$*$(AS_Return4)$)/sqrt($(AS_Risk1)$**2*$(Asset1)$2+$(AS_Risk2)$2*$(Asset2)$2+$(AS_Risk3)$2*$(Asset3)$2+$(AS_Risk4)$2*$(Asset4)$**2). Users can use some of the most common math operators such as +, −, *, /, **, where the latter is the function for "raised to the power of."

Appendix: Economic Results

Net Present Value

The net present value (NPV) method is simple and powerful: All future cash flows are discounted at the project's cost of capital and then summed. Complications include differing life spans and different rankings using IRR. The general rule is if NPV>0, accept the project; if NPV<0, reject the project; if NPV=0, you are indifferent (other qualitative variables need to be considered). The NPV is the sum of cash flows (CF) from time zero (t=0) to the final cash flow period (N) discounted as some discount rate (k), which is typically the weighted average cost of capital (WACC). Be aware that CF0 is usually a negative number as this may be an initial capital investment in the project.

$$NPV = CF_0 + \frac{CF_1}{(1+k)^1} + \frac{CF_2}{(1+k)^2} + \ldots + \frac{CF_N}{(1+k)^N} = \sum_{t=0}^{N} \frac{CF_t}{(1+k)^t}$$

$$NPV = CF_0 + \frac{CF_1}{(1+WACC)^1} + \frac{CF_2}{(1+WACC)^2} + \ldots + \frac{CF_N}{(1+WACC)^N} = \sum_{t=0}^{N} \frac{CF_t}{(1+WACC)^t}$$

NPV has a direct relationship between economic value added (EVA) and market value added (MVA). It is equal to the present value of the project's future EVA, and, hence, a positive NPV usually implies a positive EVA and MVA.

Internal Rate of Return

Internal rate of return (IRR) is the discount rate that equates the project's cost to the sum of the present cash flow of the project. That is, setting NPV=0 and solving for k in the NPV equation, where k is now called IRR. In other words, where:

$$NPV = \sum_{t=0}^{N} \frac{CF_t}{(1+IRR)^t} = 0$$

Note that there may exist multiple IRRs when the cash flow stream is erratic. Also, the IRR and NPV rankings may be dissimilar. The general rule is that when IRR>required rate of return or hurdle rate or cost of capital, accept the project. That is, if the IRR exceeds the cost of capital required to finance and pay for the project, a surplus remains after paying for the project, which is passed on to the shareholders. The NPV and IRR methods make the same accept/reject decisions for independent projects, but if projects are mutually exclusive, ranking conflicts can arise. If conflicts arise, the NPV method should be used. The NPV and IRR methods are both superior to the payback method, but NPV is superior to IRR. Conflicts may arise when the cash flow timing (most of the cash flows come in during the early years compared to later years in another project) and amounts (the cost of one project is significantly larger than another) are vastly different from one project to another. Finally, there sometimes can arise multiple IRR solutions in erratic cash flow streams such as large cash outflows occurring during or at the end of a project's life. In such situations, the NPV provides a more robust and accurate assessment of the project's value.

Modified Internal Rate of Return

The NPV method assumes that the project cash flows are reinvested at the cost of capital, whereas the IRR method assumes project cash flows are reinvested at the project's own IRR. The reinvestment rate at the cost of capital is the more correct approach in that this is the firm's opportunity cost of money (if funds were not available, then capital is raised at this cost).

The modified internal rate of return (MIRR) method is intended to overcome two IRR shortcomings by setting the cash flows to be reinvested at the cost of capital and not its own IRR, as well as preventing the occurrence of multiple IRRs, because only a single MIRR will exist for all cash flow scenarios. Also, NPV and MIRR will usually result in the same project selection when projects are of equal size (significant scale differences might still result in a conflict between MIRR and NPV ranking).

The MIRR is the discount rate that forces the present value of costs of cash outflows (COF) to be equal to the present value of the terminal value (the future value of cash inflows, or CIF, compounded at the project's cost of capital, k).

$$\sum_{t=0}^{n} \frac{COF_t}{(1+k)^t} = \sum_{t=0}^{n} \frac{CIF_t(1+k)^{n-t}}{(1+MIRR)^n}$$

$$\sum_{t=0}^{n} \frac{COF_t}{(1+WACC)^t} = \sum_{t=0}^{n} \frac{CIF_t(1+WACC)^{n-t}}{(1+MIRR)^n}$$

$$PV\ Costs = \frac{Terminal\ Value}{(1+MIRR)^n}$$

Profitability Index and Return on Investment

The profitability index (PI) is the ratio of the sum of the present value of cash flows to the initial cost of the project, which measures its relative profitability. A project is acceptable if PI>1, and the higher the PI, the higher the project ranks. PI is mathematically very similar to return on investment (ROI), but it is a relative measure whereas ROI is an absolute measure. In addition, PI returns a ratio (the ratio is an absolute value, ignoring the negative investment cost) while ROI is usually described as a percentage.

$$PI = \frac{\sum_{t=1}^{n} \frac{CF_t}{(1+k)^t}}{CF_0} = \frac{Benefit}{Cost} = \frac{PV\ Cash\ Flows}{Initial\ Cost}$$

-continued $$ROI = \frac{\sum_{t=1}^{n} \frac{CF_t}{(1+k)^t} - CF_0}{CF_0} = \frac{Benefit - Cost}{Cost} = PI - 1$$

Mathematically, NPV, IRR, MIRR, and PI should provide similar rankings although conflicts may sometimes arise, and all methods should be considered as each provides a different set of relevant information.

Payback Period

Simple but ineffective by itself, the payback period method calculates the time necessary to pay back the initial cost (i.e., a breakeven analysis). It does not take into account time valuation of money and it does not consider different life spans after the initial payback breakpoint and ignores the cost of capital. The payback period approach helps identify the project's liquidity in determining how long funds will be tied up in the project.

Payback=Year before full recovery+[unrecovered cost÷Cash Flow time t]

Discounted Payback Period

The discounted payback period method is similar to the payback period method but the cash flows used are in present values. This specification solves the issue of cost of capital, but the disadvantage of ignoring cash flows beyond the payback period still remains.

Discounted Payback=Year before full recovery+[unrecovered cost÷PV Cash Flow time $t$]

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer-implemented system to facilitate modeling and valuation of investment decisions utilizing a set of statistical and analytical tests of a user's existing set of input assumptions, the system comprising:
one or more application servers configured to electronically store information for use by a
projects economics analysis tool (PEAT) module;
a computing device in operable communication with said one or more application servers, the computing device comprising:
a processor;
a memory coupled to the processor, the memory containing instructions that when executed by the processor cause the system to:
instantiate said PEAT module;
provide a user, via said PEAT module, a user interface for integrated risk management and evaluating options;
present said user with a plurality of integrated risk management methodologies via said user interface, said plurality of integrated risk management methodologies comprising Monte Carlo risk simulation, Latin Hypercube simulation, strategic real options, stochastic and predictive forecasting, business analytics, business statistics, business intelligence, decision analysis, and portfolio optimization, and
receive a first input from said user via said user interface, said first input comprising a user selection of said one or more integrated risk management methodologies presented via said user interface;
receive, process and automatically analyze a second input from said user via said user interface, said second user input comprising a plurality of entries in a plurality of open fields of said user interface corresponding to said one or more user selected integrated risk management methodologies, wherein said second input entries correspond to said user's existing set of input assumptions,
wherein said integrated risk management methodologies are applied to project and portfolio economics and financial analysis, wherein said financial analysis comprises analysis of one or more options,
wherein said PEAT module user interface comprises three rows of tabular functions,
the first row comprising a plurality of user selectable functions, including: discounted cash flow, applied analytics, risk simulation, options strategies, options valuations, forecast prediction, portfolio optimization, and knowledge center,
the second row comprising functions for selecting one or more different options, portfolio analysis, or discount rates
wherein said portfolio analysis function displays side-by-side comparisons of main economic and financial indicators of all options simultaneously,
and the third row comprising sub-functions associated with said first row of functions and said one or more options,
wherein said PEAT module performs a scenario analysis to generate multiple scenarios in order to identify hotspots,
wherein said PEAT module compares multiple simulation output variables and displaying said variables in a graphical format.

2. The computer-implemented system of claim 1, wherein said user has the option to choose between a desired pre-programmed model or create a new model, wherein said new model is capable of being saved and uploaded.

3. The computer-implemented system of claim 1, wherein the third row comprises an escalation and depreciation function.

* * * * *